(12) United States Patent
Castillo et al.

(10) Patent No.: US 12,445,717 B2
(45) Date of Patent: Oct. 14, 2025

(54) TECHNIQUES FOR ENHANCED IMAGE CAPTURE USING A COMPUTER-VISION NETWORK

(71) Applicant: Hover Inc., San Francisco, CA (US)

(72) Inventors: William Castillo, Belmont, CA (US); Brandon Scott, New York, NY (US); Alrik Firl, San Francisco, CA (US); David Royston Cutts, San Francisco, CA (US); Jonathan Mark Igner, San Francisco, CA (US); Dario Rethage, Kendall Park, NJ (US); Domenico Curro, San Francisco, CA (US); Giridhar Murali, Sunnyvale, CA (US); Panfeng Li, San Francisco, CA (US)

(73) Assignee: Hover Inc., San Francisco, CA (US)

( * ) Notice: Subject to any disclaimer, the term of this patent is extended or adjusted under 35 U.S.C. 154(b) by 420 days.

(21) Appl. No.: 17/163,043

(22) Filed: Jan. 29, 2021

(65) Prior Publication Data

US 2021/0243362 A1 Aug. 5, 2021

Related U.S. Application Data

(60) Provisional application No. 63/140,716, filed on Jan. 22, 2021, provisional application No. 63/059,093, (Continued)

(51) Int. Cl.
*H04N 23/60* (2023.01)
*G06F 3/16* (2006.01)
(Continued)

(52) U.S. Cl.
CPC .............. *H04N 23/64* (2023.01); *G06T 7/11* (2017.01); *G06T 7/12* (2017.01); *G06T 7/174* (2017.01);
(Continued)

(58) Field of Classification Search
CPC ........ G06V 10/16; G06V 10/17; G06V 10/24; G06V 10/245; G06V 10/25; G06V 10/255;
(Continued)

(56) References Cited

U.S. PATENT DOCUMENTS 9,159,164 B2 10/2015 Ciarcia
9,531,957 B1 12/2016 George et al.
(Continued)

FOREIGN PATENT DOCUMENTS

EP 1981268 B1 1/2017

OTHER PUBLICATIONS

Badrinarayanan et al., "SegNet: A Deep Convolutional Encoder-Decoder Architecture for Image Segmentation", Dec. 2017, IEEE, IEEE Transactions on Pattern Analysis and Machine Intelligence, vol. 39, No. 12, p. 2481-2495. (Year: 2017).*
(Continued)

*Primary Examiner* — Vincent Rudolph
*Assistant Examiner* — Timothy Choi

(57) ABSTRACT

Disclosed are techniques for enhancing two-dimensional (2D) image capture of subjects (e.g., a physical structure, such as a residential building) to maximize the feature correspondences available for three-dimensional (3D) model reconstruction. More specifically, disclosed is a computer-vision network configured to provide viewfinder interfaces and analyses to guide the improved capture of an intended subject for specified purposes. Additionally, the computer-vision network can be configured to generate a metric representing a quality of feature correspondences between images of a complete set of images used for reconstructing a 3D model of a physical structure. The computer-vision network can also be configured to generate feedback at or before image capture time to guide improve-
(Continued)

ments to the quality of feature correspondences between a pair of images.

18 Claims, 59 Drawing Sheets

Related U.S. Application Data filed on Jul. 30, 2020, provisional application No. 62/968,977, filed on Jan. 31, 2020.

(51) Int. Cl.

| | | |
|---|---|---|
| *G06T 7/11* | (2017.01) | |
| *G06T 7/12* | (2017.01) | |
| *G06T 7/174* | (2017.01) | |
| *G06T 7/277* | (2017.01) | |
| *G06T 7/73* | (2017.01) | |
| *G06T 15/00* | (2011.01) | |
| *G06T 17/00* | (2006.01) | |
| *G06V 10/26* | (2022.01) | |
| *G06V 10/44* | (2022.01) | |
| *G06V 30/19* | (2022.01) | |
| *G06V 30/414* | (2022.01) | |
| *H04N 23/63* | (2023.01) | |

(52) U.S. Cl.
CPC ............... *G06T 7/277* (2017.01); *G06T 7/74* (2017.01); *G06T 17/00* (2013.01); *G06V 10/26* (2022.01); *G06V 10/44* (2022.01); *H04N 23/635* (2023.01); *G06F 3/167* (2013.01); *G06T 15/00* (2013.01); *G06T 2207/20072* (2013.01); *G06T 2207/20084* (2013.01); *G06T 2210/00* (2013.01); *G06V 30/19013* (2022.01); *G06V 30/19107* (2022.01); *G06V 30/414* (2022.01)

(58) Field of Classification Search
CPC . G06V 2201/12; G06T 2200/04; G06T 17/00; G06T 7/11; G06T 7/12; G06T 15/00; G06T 7/174; H04N 23/61; H04N 23/634; H04N 23/635; H04N 23/64; G06F 3/167
See application file for complete search history.

(56) References Cited

U.S. PATENT DOCUMENTS

| | | | |
|---|---|---|---|
| 9,716,826 B2 | 7/2017 | Wu et al. | |
| 9,721,177 B2 | 8/2017 | Lee et al. | |
| 9,826,145 B2 | 11/2017 | Malgimani et al. | |
| 10,038,838 B2 | 7/2018 | Castillo et al. | |
| 10,382,673 B2 | 8/2019 | Upendran et al. | |
| 2008/0089577 A1 | 4/2008 | Wang | |
| 2011/0157406 A1 | 6/2011 | Tauchi | |
| 2011/0285874 A1* | 11/2011 | Showering | H04N 1/00748 348/E5.062 |
| 2012/0105647 A1* | 5/2012 | Yoshizumi | H04N 23/611 348/169 |
| 2013/0129156 A1* | 5/2013 | Wang | G06T 7/12 382/107 |
| 2017/0094184 A1* | 3/2017 | Gao | G06T 7/337 |
| 2017/0208245 A1 | 7/2017 | Castillo et al. | |
| 2017/0310884 A1* | 10/2017 | Li | H04N 9/646 |
| 2018/0198976 A1* | 7/2018 | Upendran | H04N 23/661 |
| 2018/0198978 A1 | 7/2018 | Cho et al. | |
| 2018/0220066 A1* | 8/2018 | Kitamura | G06V 20/20 |
| 2018/0300855 A1 | 10/2018 | Tang et al. | |
| 2019/0174056 A1 | 6/2019 | Jung et al. | |
| 2019/0236394 A1* | 8/2019 | Price | G06V 10/945 |
| 2019/0311202 A1 | 10/2019 | Lee et al. | |
| 2019/0385026 A1* | 12/2019 | Richeimer | G06V 20/41 |
| 2020/0202533 A1 | 6/2020 | Cohen et al. | |
| 2021/0004648 A1 | 1/2021 | Ghosh et al. | |

OTHER PUBLICATIONS

PCT/US2021/015850, "International Search Report and Written Opinion", Jul. 12, 2021, 21 pages.
Hegarty, et al., "SAMATS—Triangle Grouping and Structure Recovery for 3D Building Modeling and Visualization", Technological University Dublin, Digital Media Centre, Jan. 12, 2005, 15 pages.
Wirtz, et al., "Semiautomatic Generation of Semantic Building Models From Image Series", Proceedings of SPIE—The International Society for Optical Engineering, Feb. 2011, 8 pages.
PCT/US2021/015850, "Invitation to Pay Additional Fees and, Where Applicable, Protest Fee", May 19, 2021, 5 pages.
PCT/US2021/015850, "International Preliminary Report on Patentability", Aug. 11, 2022, 16 pages.
U.S. Appl. No. 17/163,105, "Notice of Allowance", Jul. 26, 2023, 10 pages.
Bischke, et al., "Multi-Task Learning for Segmentation of Building Footprints with Deep Neural Networks", IEEE, 2019, pp. 1480-1484.
Brostow, et al., "Semantic Object Classes in Video: A High-Definition Ground Truth Database", Pattern Recognition Letters, vol. 30, No. 2, Jan. 15, 2009, pp. 88-97.
CA3163137, "Office Action", Aug. 8, 2023, 4 pages.
Huang, et al., "Building Extraction from Multi-Source Remote Sensing Images Via Deep Deconvolution Neural Networks", IEEE, Jul. 2016, pp. 1835-1838.
Kisantal, et al., "Augmentation for Small Object Detection", Available Online at: https://arxiv.org/pdf/1902.07296.pdf, Feb. 19, 2019, pp. 1-15.
Wu, et al., "Automatic Building Segmentation of Aerial Imagery using Multi-Constraint Fully Convolutional Networks", MDPI, Remote Sens., vol. 10, No. 3, Mar. 6, 2018, pp. 1-18.
Zhou, et al., "Building Segmentation from Airborne Vhr Images using Mask R-Cnn", ISPRS, Jun. 2019, pp. 155-161.
U.S. Appl. No. 18/495,336, "Notice of Allowance", May 30, 2024, 11 pages.
CA3163137, "Office Action", May 15, 2024, 4 pages.
Tarantino, et al., "Extracting Buildings from True Color Stereo Aerial Images Using a Decision Making Strategy", Remote Sensing, vol. 3, Issue 8, Jul. 25, 2011, pp. 1553-1567.
Wen, et al., "Automatic Building Extraction from Google Earth Images under Complex Backgrounds Based on Deep Instance Segmentation Network", Sensors, vol. 19, No. 2, Jan. 15, 2019, pp. 1-16.
EP24188777.7, "Extended European Search Report", Oct. 2, 2024, 10 pages.

\* cited by examiner

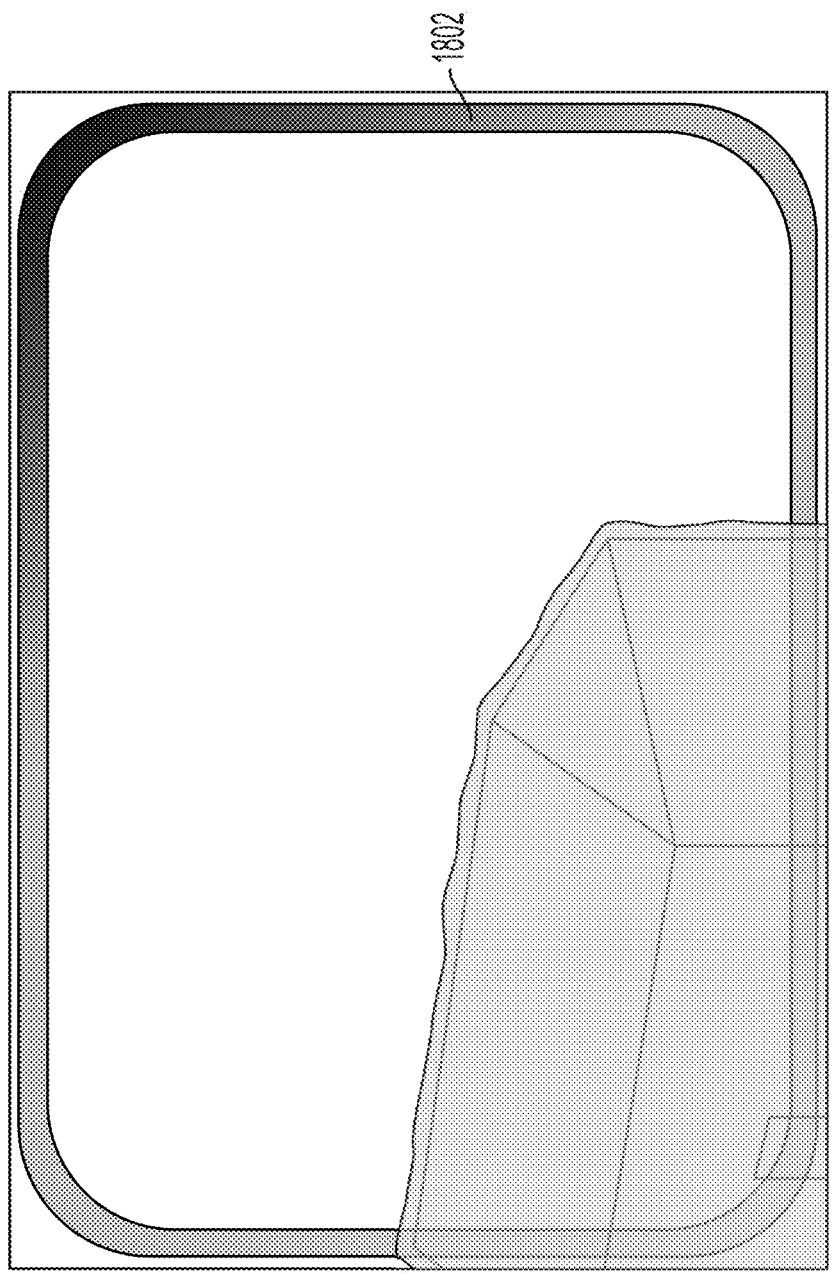

FIG. 28A

| Method | Threshold Value (rounded down) |
|---|---|
| Simple Average<br>-highest summation value = 5<br>-lowest summation value = 1 | 3 |
| Weighted Average<br># of pixels with summation value of 5: 138<br># of pixels with summation value of 4: 7<br># of pixels with summation value of 3: 29<br># of pixels with summation value of 2: 0<br># of pixels with summation value of 1: 22 | 4 |
| Median | 5 |

FIG. 28B

Accumulated mask

| Method | Threshold Value (rounded down) |
|---|---|
| Simple Average<br>-highest summation value = 8<br>-lowest summation value = 1 | 4 |
| Weighted Average<br># of pixels with summation value of 8: 4<br># of pixels with summation value of 7: 0<br># of pixels with summation value of 6: 0<br># of pixels with summation value of 5: 4<br># of pixels with summation value of 4: 20<br># of pixels with summation value of 3: 12<br># of pixels with summation value of 2: 0<br># of pixels with summation value of 1: 12 | 3 |
| Median (average of two middle values) | 3 |

FIG. 33

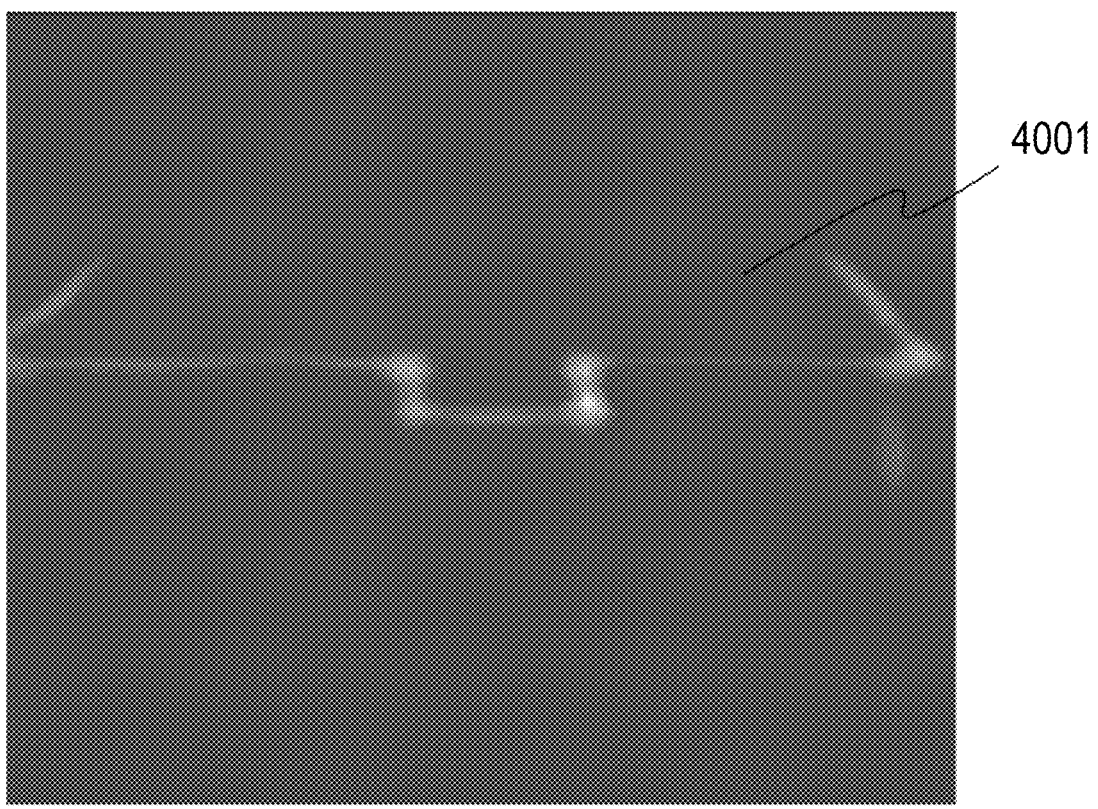
FIG. 40A

TECHNIQUES FOR ENHANCED IMAGE CAPTURE USING A COMPUTER-VISION NETWORK

CROSS-REFERENCE TO RELATED APPLICATIONS

This application claims the priority benefit of U.S. Provisional Patent Application Nos. 62/968,977, filed Jan. 31, 2020; 63/059,093, filed Jul. 30, 2020; and 63/140,716, filed Jan. 22, 2021; the disclosure of each of which is incorporated by reference herein in its entirety for all purposes.

This application is also related to co-owned U.S. patent application Ser. No. 15/348,038 titled, "DIRECTED IMAGE CAPTURE," filed on Nov. 10, 2016, now issued as U.S. Pat. No. 10,038,838, and co-owned U.S. patent application Ser. No. 15/404,044 titled, "AUTOMATED GUIDE FOR IMAGE CAPTURING FOR 3D MODEL CREATION," filed on Jan. 11, 2017, now issued as U.S. Pat. No. 10,382,673. The contents of each of the above listed patents are hereby incorporated by reference in their entirety for all purposes.

BACKGROUND OF THE INVENTION

A three-dimensional (3D) model of a physical structure can be generated by executing computer-vision techniques on two-dimensional (2D) images of the physical structure. The images can be captured from multiple viewpoints via aerial imagery, specialized camera-equipped vehicles, or by a user holding a camera at ground level. The 3D model can be a digital representation of the real-world physical structure in a 3D space. While computer-vision techniques and capabilities continue to improve, a limiting factor in any computer-vision pipeline is the input image itself. Low resolution photos, blur, occlusion, subjects out of frame, and no feature correspondences between images all limit the full scope of analyses that computer-vision techniques can provide.

SUMMARY OF THE INVENTION

Certain aspects of the present disclosure relate to a computer-implemented method. The computer-implemented method can include capturing a set of pixels representing a scene visible to an image capturing device including a display. The set of pixels can include a plurality of border pixels. Each border pixel of the plurality of border pixels can be located at or within a defined range of a boundary of the set of pixels. The computer-implemented method can include detecting a physical structure depicted within the set of pixels. The physical structure can be represented by a subset of the set of pixels. The computer-implemented method can include generating a segmentation mask associated with the physical structure depicted within the set of pixels. The segmentation mask can include one or more segmentation pixels. The computer-implemented method can include determining a pixel value for each border pixel of the plurality of border pixels, generating an indicator based on the pixel value of one or more border pixels of the plurality of border pixels, and presenting the indicator. For example, the indicator can represent an instruction for framing the physical structure within the display. Other embodiments of this aspect include corresponding computer systems, apparatus, and computer programs recorded on one or more computer storage devices, each configured to perform the actions of the methods.

Implementations may include one or more of the following features. The computer-implemented method can also include detecting that the one or more border pixels of the plurality of border pixels includes a segmentation pixel of the one or more segmentation pixels. The plurality of border pixels can includes one or more left edge border pixels located at a left edge of the set of pixels; one or more or more top edge border pixels located at a top edge of the set of pixels; one or more right edge border pixels located at a right edge of the set of pixels; and one or more bottom edge border pixels located at a bottom edge of the set of pixels. When a left edge border pixel of the one or more left edge border pixels includes a segmentation pixel, the instruction represented by the indicator can instruct a user viewing the display to move the image capturing device in a leftward direction. When a top edge border pixel of the one or more top edge border pixels includes a segmentation pixel, the instruction represented by the indicator can instruct the user viewing the display to move the image capturing device in an upward direction. When a right edge border pixel of the one or more right edge border pixels includes a segmentation pixel, the instruction represented by the indicator can instruct the user viewing the display to move the image capturing device in a rightward direction. When a bottom edge border pixel of the one or more bottom edge border pixels includes a segmentation pixel, the instruction represented by the indicator can instruct the user viewing the display to move the image capturing device in a downward direction. When each of a left edge border pixel, a top edge border pixel, a right edge border pixel, and a bottom edge border pixel includes a segmentation pixel, the instruction represented by the indicator can instruct a user viewing the display to move backward. When none of the one or more left edge border pixels, the one or more top edge border pixels, the one or more right edge border pixels, and the one or more bottom edge border pixels includes a segmentation pixel, the instruction represented by the indicator can instruct a user viewing the display to zoom in to frame the physical structure. In some implementations, the segmentation mask can be a bounding box surrounding the subset of pixels that represent the physical structure. Presenting the indicator can includes displaying the indicator on the display of the image capturing device; or audibly presenting the indicator to a user operating the image capturing device. Implementations of the described techniques may include hardware, a method or process, or computer software on a computer-accessible medium.

Certain aspects of the present disclosure also relate to another computer-implemented method. The computer-implemented method can include receiving a first set of pixels of a first image frame representing a scene visible to an image capturing device, and detecting a physical structure depicted within the first set of pixels. The physical structure can be represented by a subset of the first set of pixels. The computer-implemented method can also include generating a first segmentation mask associated with the physical structure depicted within the first set of pixels of the first image frame. The first segmentation mask can include one or more first segmentation pixels. The computer-implemented method can include receiving a second set of pixels of a second image frame representing the scene visible to the image capturing device, and detecting the physical structure depicted within the second set of pixels. The physical structure can be represented by a subset of the second set of pixels. The computer-implemented method can include generating a second segmentation mask associated with the physical structure depicted within the second set of pixels of the second image frame. The second segmentation mask can include one or more second segmentation pixels. At least one first segmentation pixel can be different from at least one second segmentation pixel. The computer-implemented method can include generating an aggregated segmentation mask based on the first segmentation mask and the second segmentation mask. The aggregated segmentation mask can be generated to encompass the physical structure depicted in a third image frame captured by the image capturing device. The computer-implemented method can include generating a feedback signal using the aggregated segmentation mask. The feedback signal can correspond to an instruction to change a position or orientation of the image capturing device to include the physical structure within the third image frame. Other embodiments of this aspect can include corresponding computer systems, apparatus, and computer programs recorded on one or more computer storage devices, each configured to perform the actions of the methods.

Implementations can include one or more of the following features. The computer-implemented method can also include aggregating the one or more first segmentation pixels and the one or more second segmentation pixels. Generating the aggregated segmentation mask can further include predicting a location of the physical structure in the third image frame using a Kalman filter. The computer-implemented method can also include detecting that the physical structure depicted in the first set of pixels of the first image frame is occluded by an object. The object can separate the depicted physical structure into a first non-contiguous part and a second non-contiguous part. The computer-implemented method can include generating a first partial segmentation mask to encompass the first non-contiguous part of the depicted physical structure, and generating a second partial segmentation mask to encompass the second non-contiguous part of the depicted physical structure. The computer-implemented method can include selecting one of the first partial segmentation mask and the second partial segmentation mask as the first segmentation mask. In some implementations, selecting the one of the first partial segmentation mask and the second partial segmentation mask can include selecting a largest of the first segmentation mask and the second partial segmentation mask. In other implementations, selecting the one of the first partial segmentation mask and the second partial segmentation mask can include selecting one of the first partial segmentation mask and the second partial segmentation mask based on a previous segmentation mask selected in a previous image frame. In other implementations, selecting the one of the first partial segmentation mask and the second partial segmentation mask can include determining a first location of a first centroid of the first partial segmentation mask, determining a second location of a second centroid of the second partial segmentation mask, and selecting one of the first partial segmentation mask and the second partial segmentation mask based on a distance between the first location of the first centroid or the second location of the second centroid and a center of a display of the image capturing device. Implementations of the described techniques may include hardware, a method or process, or computer software on a computer-accessible medium.

Certain aspects of the present disclosure also relate to yet another computer-implemented method. The computer-implemented method can include capturing a set of two-dimensional (2D) images of a physical structure. For example, each 2D image of the set of 2D images can depict the physical structure from an angle. The computer-implemented method can include generating a three-dimensional (3D) coverage metric for the set of 2D images. Generating the 3D coverage metric can include detecting, for each pair of images within the set of 2D images, one or more feature matches between a first 2D image and a second 2D image of the pair of images. Each feature match (or otherwise referred to as feature correspondence) of the one or more feature matches indicates that a first 3D position associated with a first pixel of the first 2D image matches a second 3D position associated with a second pixel of the second 2D image. Generating the 3D coverage metric can also include transforming the set of 2D images into a graph based on a result of the detection. The graph can include a plurality of nodes and a plurality of edges. Each node of the plurality of nodes can represent a 2D image of the set of 2D images. Each edge of the plurality of edges can connect two nodes together and can represent an existence of at least one feature match between two images associated with the two nodes. Generating the 3D coverage metric can also include performing a clustering operation on the graph. The clustering operation can form one or more clusters of nodes of the plurality of nodes. Generating the 3D coverage metric can include generating the 3D coverage metric based on a result of performing the clustering operation. The computer-implemented method can also include generating, based on the 3D coverage metric, a feedback signal in response to capturing the set of 2D images. For example, the feedback signal can indicate an instruction to capture one or more additional 2D images to add to the set of 2D images. The computer-implemented method can include capturing the one or more additional 2D images. The computer-implemented method can include forming an updated set of 2D images including the set of 2D images and the one or more additional 2D images. Other embodiments of this aspect include corresponding computer systems, apparatus, and computer programs recorded on one or more computer storage devices, each configured to perform the actions of the methods.

Implementations may include one or more of the following features. The computer-implemented method can further include modifying the graph by removing one or more edges of the plurality of edges. The removal of each edge of the one or more edges being based on a comparison between a weight value associated with the edge and a threshold. The computer-implemented method can include forming the one or more clusters based on the modified graph. For each edge of the plurality of edges, the weight value can be determined based on a combination of a number of feature matches between the two images of the two nodes associated with the edge and a confidence value of each feature match of the number of feature matches. In some implementations, the clustering operation can be a graph clustering operation. Performing the clustering operation can further include training a graph-convolutional neural network (graph-CNN) using a plurality of previously-captured sets of 2D images. Each node of the plurality of nodes can be associated with a feature embedding that represents one or more features of the 2D image of the node. The computer-implemented method can include performing a node clustering task on or using the graph-CNN. Generating the 3D coverage metric can further include identifying a number of clusters formed after performing the clustering operation, and generating the 3D coverage metric using the number of clusters formed. The location range associated with each cluster of the one or more clusters may not include the angular range. The feedback signal can represent a recommendation to capture one or more additional images of the physical structure from within the angular range. Implementations of the described techniques may include hardware, a method or process, or computer software on a computer-accessible medium.

Certain aspects of the present disclosure relate to yet another computer-implemented method. The computer-implemented method can include initiating an image capture session using an image capturing device including a display. During the image capture session, the computer-implemented method can include capturing a first 2D image of a physical structure from a first pose. The first 2D image can include a first pixel associated with a 3D position on the physical structure. The computer-implemented method can include capturing a second 2D image depicting the physical structure from a second pose. The second 2D image can include a second pixel associated with a second 3D position on the physical structure. The first pose (e.g., a first location) can be different from the second pose (e.g., a second location). The computer-implemented method can include detecting one or more feature matches between the first 2D image and the second 2D image. For example, a feature match (otherwise referred to as a feature correspondence) of the one or more feature matches can indicate that the first 3D position associated with the first pixel of the first 2D image matches the second 3D position associated with the second pixel of the second 2D image. The computer-implemented method can include determining a 3D reconstruction condition based on the one or more feature matches between the first 2D image and the second 2D image. Other embodiments of this aspect include corresponding computer systems, apparatus, and computer programs recorded on one or more computer storage devices, each configured to perform the actions of the methods.

Implementations may include one or more of the following features. The computer-implemented method can further include triangulating a location of the physical structure, the first pose of the first 2D image, and the second pose of the second 2D image. The computer-implemented method can include determining a third pose based on a result of the triangulation. The third pose can be different from each of the first pose and the second pose. The computer-implemented method can include generating the feedback notification to include an instruction guiding a user towards the third pose to capture a third 2D image of the physical structure. The computer-implemented method can further include determining, for each feature match of the one or more feature matches, a confidence value representing a degree to which the first 3D position associated with the first pixel of the first 2D image is predicted to match the second 3D position associated with the second pixel of the second 2D image. The computer-implemented method can include generating a combined feature value representing a combination of a number of the one or more feature matches and a confidence value of each feature match. The computer-implemented method can include comparing the combined feature value to a threshold, and determining whether or not to store the second 2D image in a set of 2D images based on a result of the comparison. The set of 2D images can include the first 2D image. The set of 2D images can be used to generate a 3D model of the physical structure. The computer-implemented method can include displaying the feedback notification by displaying a feedback notification on the display of the image capturing device. The feedback notification can include an instruction to re-capture the second 2D image from a different position. The computer-implemented method can further include generating a visual representation of the physical structure; displaying the visual representation of the physical structure on the display of the image capturing device; and displaying a feature match indicator on the visual representation for each feature match of the one or more feature matches between the first 2D image and the second 2D image. During the image capture session, the computer-implemented method can include generating a set of first pixels using the image capturing device, and inputting the set of first pixels into a trained machine-learning model stored locally on the image capturing device. The computer-implemented method can include generating, based on the inputted set of first pixels, a first output classifying a subset of the set of first pixels as the physical structure. In response to classifying the subset of the set of first pixels as the physical structure, the computer-implemented method can include automatically capturing the first 2D image, generating a set of second pixels using the image capturing device, inputting the set of second pixels into the trained machine-learning model; generating, based on the inputted set of second pixels, a second output classifying a subset of the set of second pixels as the physical structure; and determining whether the subset of the set of second pixels shares a threshold number of feature matches with the first 2D image. In response to determining that the subset of the set of second pixels shares the threshold number of feature matches with the first 2D image, the computer-implemented method can include automatically capturing the second 2D image. The identified angle can satisfy an optimal angle condition. In response to determining that the identified angle satisfies the optimal angle condition, the computer-implemented method can include storing the 2D image as part of a set of 2D images. In response to determining that the identified angle does not satisfy the optimal angle condition, the computer-implemented method can include generating an instructive prompt requesting that the image be recaptured. Implementations of the described techniques may include hardware, a method or process, or computer software on a computer-accessible medium.

Certain aspects of the present disclosure can include a computer-program product tangibly embodied in a non-transitory machine-readable storage medium, including instructions configured to cause a processing apparatus to perform operations including the methods described above and herein.

Certain aspects of the present disclosure can include a system. The system may comprise: one or more processors; and a non-transitory computer-readable storage medium containing instructions which, when executed on the one or more processors, cause the one or more processors to perform operations including the methods described above and herein.

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

BRIEF DESCRIPTION OF THE DRAWINGS

FIGS. 18A-18E illustrate examples of progress bar status indicators for subject positioning in a display, according to certain aspects of the present disclosure.

FIGS. 28A-28B illustrate an example of an accumulated mask valuation and threshold value for filtering, according to certain aspects of the present disclosure.

FIGS. 30-35 illustrate an example of segmentation mask smoothing for a dynamic object, according to certain aspects of the present disclosure.

FIGS. 39A-40B illustrate scene understanding for images, according to certain aspects of the present disclosure.

DETAILED DESCRIPTION OF THE INVENTION

Figure 1:
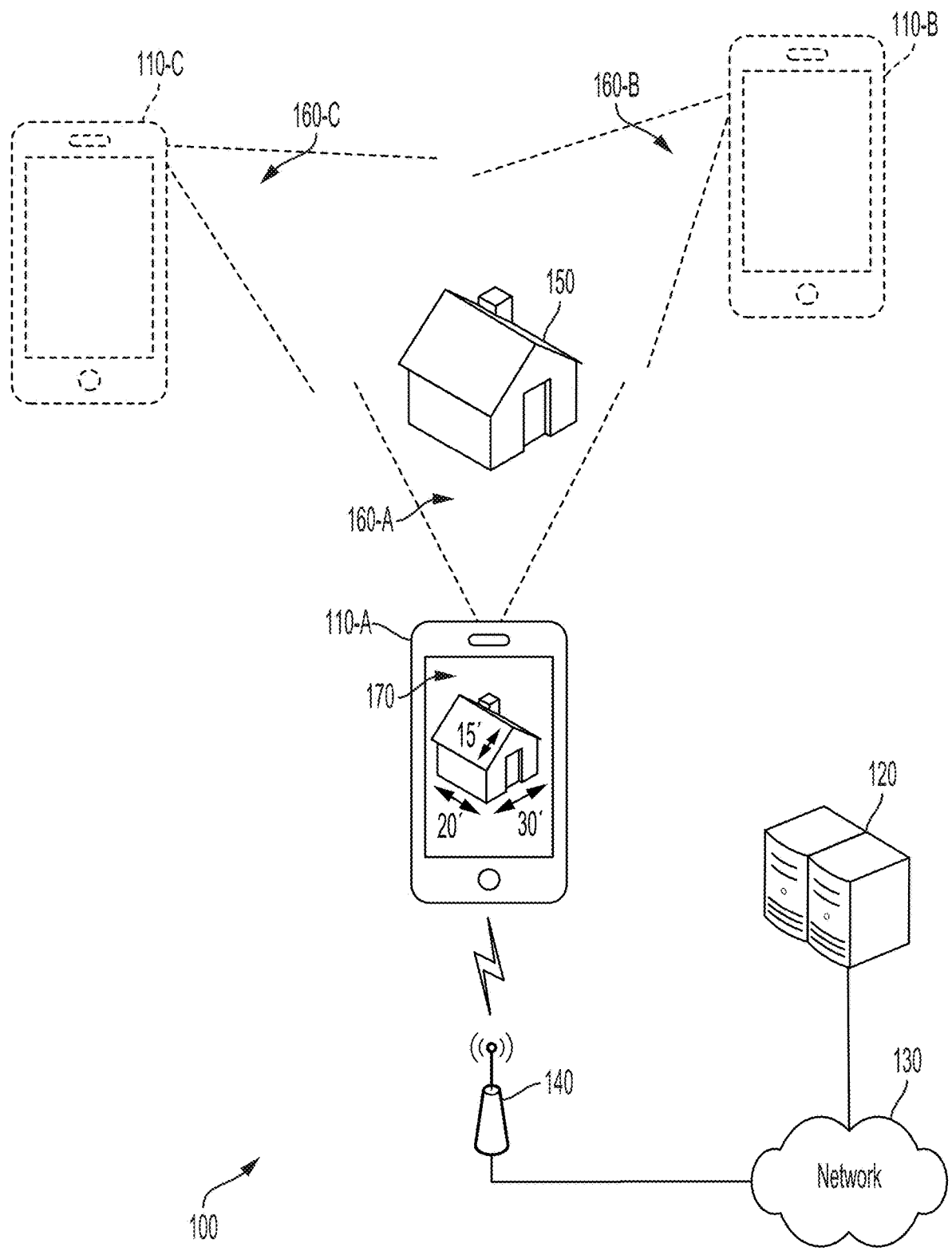
FIG. 1 is a block diagram illustrating an example of a network environment, according to certain aspects of the present disclosure.

Computer-vision techniques can be executed to classify pixels of a 2D image into various classes in a process called image segmentation. The accuracy of pixel classification by the computer-vision techniques can be impacted by several factors, including lighting and ambient conditions, contrast within the image, quality of the classifier or the imager and its sensors, computational resources, frame rate, occlusions and motions of the camera. For stationary objects, other factors being equal, pixel variation can largely be attributed to camera motion. For example, a user holding a camera will invariably impart some degree of motion into the camera because no human is rigid. Even in cameras stabilized with tools, such as tripods, slight scene motions like moving leaves near a house or flags waving due to the wind or the other aforementioned factors will introduce image noise. During image segmentation, the image noise can reduce the utility of the computer-vision techniques.

Further, modeling a physical structure in a 3D space using computer-vision techniques can involve capturing a set of 2D images of the physical structure from various viewpoints. The ability of computer-vision techniques to reconstruct a 3D model of the physical structure is impacted by the number and quality of feature correspondences between pairs of images within the set of images. For example, when a set of images is deficient in feature correspondences between pairs of images, the computer-vision techniques face technical challenges in reconstructing a 3D model. Often, however, it is difficult to recapture a new set of images to improve the number and quality of feature correspondences because, for instance, a user who captured the original set of images is no longer near the physical structure. At the time of capturing the set of images, any deficiency in number or quality of feature correspondences between pairs of images is often goes undetected, which reduces the utility of the computer-vision techniques.

The present disclosure provides a technical solution to the technical challenges described above. For instance, the present disclosure generally relates to techniques for enhancing two-dimensional (2D) image capture of subjects (e.g., a physical structure, such as a residential building) to maximize the feature correspondences available for three-dimensional (3D) model reconstruction. More specifically, the present disclosure is related to a computer-vision network configured to provide viewfinder interfaces and analyses to guide the improved capture of an intended subject for specified purposes. Additionally, the computer-vision network can be configured to generate a metric representing a quality of feature correspondences between images of a complete set of images used for reconstructing a 3D model of a physical structure. The computer-vision network can also be configured to generate feedback at or before image capture time to guide improvements to the quality of feature correspondences between a pair of images.

Certain aspects and features of the present disclosure relate to a computer-vision network configured to maximize feature correspondences between images of a physical structure to improve the reconstruction of a 3D model of that physical structure. The computer-vision network can detect features of a physical structure within each individual image of a set of images that capture the physical structure from multiple viewpoints. For example, a feature of the physical structure can be a 2D line (e.g., a fascia line), point (e.g., a roof apex), corner, or curvature point detected in a 2D image. The computer-vision network can also detect correspondences between features detected in one image and other features detected in another image (herein after referred to as "feature correspondence" or interchangeably with "feature match"). A feature correspondence can represent that one feature detected in one image is located at the same 3D position as a feature detected in another image. Computer-vision techniques can be executed to reconstruct a 3D model of the physical structure using the feature correspondences detected between images of the set of images of the physical structure. The number and quality (e.g., confidence) of feature correspondences between images, however, can impact a quality of the reconstructed 3D model or potentially can impact the ability of computer-vision techniques to reconstruct a 3D model at all.

Accordingly, certain aspects and features of the present disclosure relate to techniques for maximizing the number and quality of features detected within an individual image and/or maximizing the number and quality of feature correspondences between images of an image pair to improve the scope of analyses that computer-vision techniques can provide with respect to reconstructing a 3D model of a physical structure.

In some implementations, the computer-vision network can include an intra-image parameter evaluation system configured to guide a user to improve a framing of a physical structure captured within a viewfinder of the user device. The intra-image parameter evaluation system can automatically detect instances in which a target physical structure is out of the frame of a display of a user device (e.g., a mobile device embedded with an image capturing device, such as a camera), and in response, can generate instructive prompts that guide the user to re-frame the physical structure. Framing the physical structure within a display before capturing the image can maximize the number and quality of features detected within the captured image. In some implementations, the intra-image parameter evaluation system can be configured to generate temporally smoothed bounding boxes to fit segmentation masks associated with a target physical structure that mitigate segmentation model noise or image noise caused by unavoidable user motion.

In some implementations, the intra-image parameter evaluation system can be configured to detect whether a point on a surface of the physical structure is suitable for 3D model reconstruction. This may be calculated as an angular perspective score derived from an angle between a line or ray from the focal point of the camera to the point and the orientation of the surface or feature on which the point lies. The angle between the focal point of the camera and the surface of the physical structure informs a degree of depth information that can be extracted from the resulting captured image. For example, an angle of 45 degrees between the focal point of the camera and the surface of a physical structure can provide optimal image data for extracting depth information, which improves the use of computer-vision techniques to reconstruct a 3D model of the physical structure. Accordingly, the intra-image parameter evaluation system can be configured to detect the angle between the focal point of the camera and the surface of the physical structure within the camera's field of view, and generate a metric that represents the degree to which the detected angle is suitable for 3D model reconstruction. As an illustrative example, an image that is captured, such that the camera's image plane is flat with or parallel to a surface of the physical structure, may not capture image data that can provide extractable depth information, and thus, the resulting metric for points on that surface may be zero or near-zero. Conversely, an image that captures points with an angle of 45 degrees between a focal point of the camera and a surface of the physical structure (on which the points lie) may capture an optimal amount of image data that can be used to extract depth information, and thus, the result metric may be much higher (e.g., "1" on a scale of "0" to "1"), indicating a suitable data capture for the purpose of 3D model reconstruction. The intra-image parameter evaluation system can generate an instructive prompt while a user is framing the physical structure within a viewfinder of the user device (e.g., camera) based on the metric, thereby guiding the user to capture images with an optimal angle relative to the surface of the physical structure. In some implementations, a native application executing on a user device provides a coarse augmented reality (AR) output and a subtended angle check. For instance, camera poses surrounding the physical structure generated by AR systems can provide early feedback as to both the surface orientation metric mentioned previously, as well as feature correspondence matches with previous images. In some embodiments, the imager's field of view is used as a subtended angle for capture of points, and the AR pose output can predict whether the instant pose and subtended angle provides any overlap with features relative to a previous pose and subtended angle. Accordingly, without performing a feature correspondence detection between images, at certain distances between poses or subtended angles between poses, the intra-image parameter evaluation system may not qualify or evaluate the captured image. Instead, the intra-image parameter evaluation system prompt the user to adjust the pose (either by translation or rotation or both) to meet the coarse AR check before evaluating the image within the display. These implementations can improve the quality of depth information that can be extracted from the captured image.

In some implementations, the computer-vision network can also include an inter-image parameter evaluation system configured to maximize the number and quality of feature correspondences between a pair of images captured during an image capture session. The computer-vision network can be executed using a native application running on a user device, such as a smartphone. The native application can initiate an image capture session that enables a user to capture a set of images of a target physical structure from multiple viewpoints. For example, the native application can initiate the image capture session, and the user can walk in a loop around a perimeter of the physical structure, while periodically capturing an image of the physical structure. In some implementations, each image captured during the image capture session can be stored at the user device and evaluated in real time. In other implementations, each image can be stored after capture and immediately transmitted to a cloud server for evaluation. The inter-image parameter evaluation system can evaluate the complete set of images captured by the user as the user completed the loop around the perimeter of the physical structure. In some implementations, evaluating the complete set of images can include generating a 3D coverage metric that represents a degree to which the feature correspondences between each pair of images in the set of images share a sufficient number or quality of feature correspondences. A quality of a feature correspondence can represent a confidence associated with the feature correspondence, co-planarity, collinearity, covariance, gauge freedom, trifocal tensor, and loop closure metric associated with the feature correspondence. For example, if the set of images captured by the user does not include an image of a south-facing side of the physical structure, then there may be an insufficient feature correspondence between an image of the west-facing side of the physical structure and the east-facing side of the physical structure, if the user walked in a clockwise loop around the perimeter of the physical structure. The 3D coverage metric can be evaluated by the native application before the set of images is transmitted to a cloud server for 3D model reconstruction to determine whether any additional images need to be captured to fill in the gaps left by uncovered areas of the physical structure in the original set of images.

In some implementations, the inter-image parameter evaluation system can be configured to detect, in real time, whether an immediately captured image satisfies a 3D reconstruction condition with respect to a preceding image captured. For example, the 3D reconstruction condition can be a condition that requires a pair of images to have a threshold number of feature correspondences. As another example, the 3D reconstruction condition can be a condition that requires a pair of images to have features correspondences that are not located on the same plane or line (e.g. regardless of the number of feature correspondences). The present disclosure is not limited to these examples, and any quality attribute (e.g., covariance, gauge freedom, trifocal tensor, and loop closure metric) of a feature correspondence can be used in association with the 3D reconstruction condition. As each image is captured during the image capture session, the inter-image parameter evaluation system can detect in real time whether that captured image satisfies the 3D reconstruction condition with respect to a preceding captured image. If the 3D reconstruction condition is satisfied, then the native application can generate a feedback notification on the display of the user device to guide the user to continue capturing images to complete the set of images. If the 3D reconstruction condition is not satisfied, then the native application can generate a feedback notification on the display of the user device to guide the user to recapture that image (either from that location or from another location). In some implementations, the native application can triangulate a location of a preceding image with the location of the physical structure to predict a new location for the user to walk to for recapturing the image. The native application can guide the user to walk to the new location by indicating an action (e.g., "Please walk back 5 steps") in the feedback notification.

FIG. 1 is block diagram illustrating an example of a network environment 100, according to certain aspects of the present disclosure. Network environment 100 may include user device 110 and server 120. User device 110 may be any portable (e.g., mobile devices, such as smartphones, tablets, laptops, application specific integrated circuits (ASICs), and the like) or non-portable computing device (e.g., desktop computer, electronic kiosk, and the like). User device 110 may be connected to gateway 140 (e.g., a Wi-Fi access point), which provides access to network 130. Network 130 may be any public network (e.g., Internet), private network (e.g., Intranet), or cloud network (e.g., a private or public virtual cloud). User device 110 may communicate with server 120 through network 130.

A native or web application may be executing on user device 110. The native or web application may be configured to perform various functions relating to analyzing an image or a set of images of a physical structure, such as a house. As an illustrative example, the native or web application may be configured to perform a function that captures a set of images of house 150 and transmits the set of images to server 120 to execute computer-vision techniques, such as reconstructing a 3D model from the set of images. A user may operate user device 110 to capture the set of images by capturing an image of house 150 from positions A, B, and C. The user may operate user device 110 to capture an image of house 150 within a field of view 160-A at position A (indicated by user device 110-A as shown in FIG. 1). The user may operate user device 110 to capture an image of house 150 within a field of view 160-B at position B (indicated by user device 110-B as shown in FIG. 1). The user may also operate user device 110 to capture an image of house 150 within a field of view 160-C at position C (indicated by user device 110-C as shown in FIG. 1). The user may walk around house 150 from position A to position B to position C to capture a complete set of images.

In some implementations, the native or web application can be configured to execute computer-vision techniques to detect if the complete set of images leaves any uncovered areas of house 150. An uncovered area of house 150 can indicate a side or edge of house 150 that is not captured by an image in the set of images. Further, uncovered areas of house 150 create technical challenges when user device 110 or server 120 reconstructs a 3D model using the set of images because user device 110 or server 120 may not have sufficient image data from which reconstruct the 3D model of house 150.

Additionally, in some implementations, the native or web application can be configured to execute computer-vision techniques to detect if a given image satisfies a 3D reconstruction condition with respect to the previous image captured. As an illustrative example, a 3D reconstruction condition may be a condition requiring that two images are to share a threshold number of feature correspondences between the two images and/or a threshold number of different planes or lines on which the feature correspondences are detected. If the features are matched on a single plane or line, then server 120 may not have sufficient information to reconstruct the 3D model of house 150. A feature can represent a structural intersection of house 150 (e.g., a keypoint or a front apex of a roof). A feature correspondence can represent a feature in one image that is associated with the same 3D point as a feature in another image. The native or web application can detect whether each captured image satisfies the 3D reconstruction condition with respect to a preceding image. If server 120 determines that two images satisfy the 3D reconstruction condition, then the native or web application enables the user to capture the next image in the set of images. If, however, server 120 determines that a second image of two images does not satisfy the 3D reconstruction condition with respect to a first image of the two images, then the native or web application can generate feedback to notify the user that the second image was not captured or stored and guide the user to a different location for recapturing a second image that does satisfy the 3D reconstruction condition with respect to the first image. If a series of images are taken, server 120 may select images that satisfy the 3D reconstruction condition, despite native or web application hosting additional images of house 150.

The present disclosure is not limited to performing the above-described functionality on server 120. The functionality can be entirely performed on user device 110 without the need for server 120. Additionally, the present disclosure is not limited to the use of a native or web application executing on user device 110. Any executable code (whether or not the code is a native or web application) can be configured to perform at least a part of the functionality.

The native or web application can transmit the complete set of images (e.g., captured from positions A, B, and C) to server 120 for analysis. Server 120 can analyze the complete set of 2D images to automatically detect or compute the 3D dimensions of house 150 by evaluating the feature correspondences detected between images of the set of images. For example, in response to receiving the set of images capturing various angles of house 150 from user device 110, the native or web application may display a final image 170, which is a visualization of a reconstructed 3D model of house 150. In some examples, the final image 170 can be presented over the image of house 150 on a display of user device 110.

Figure 2:
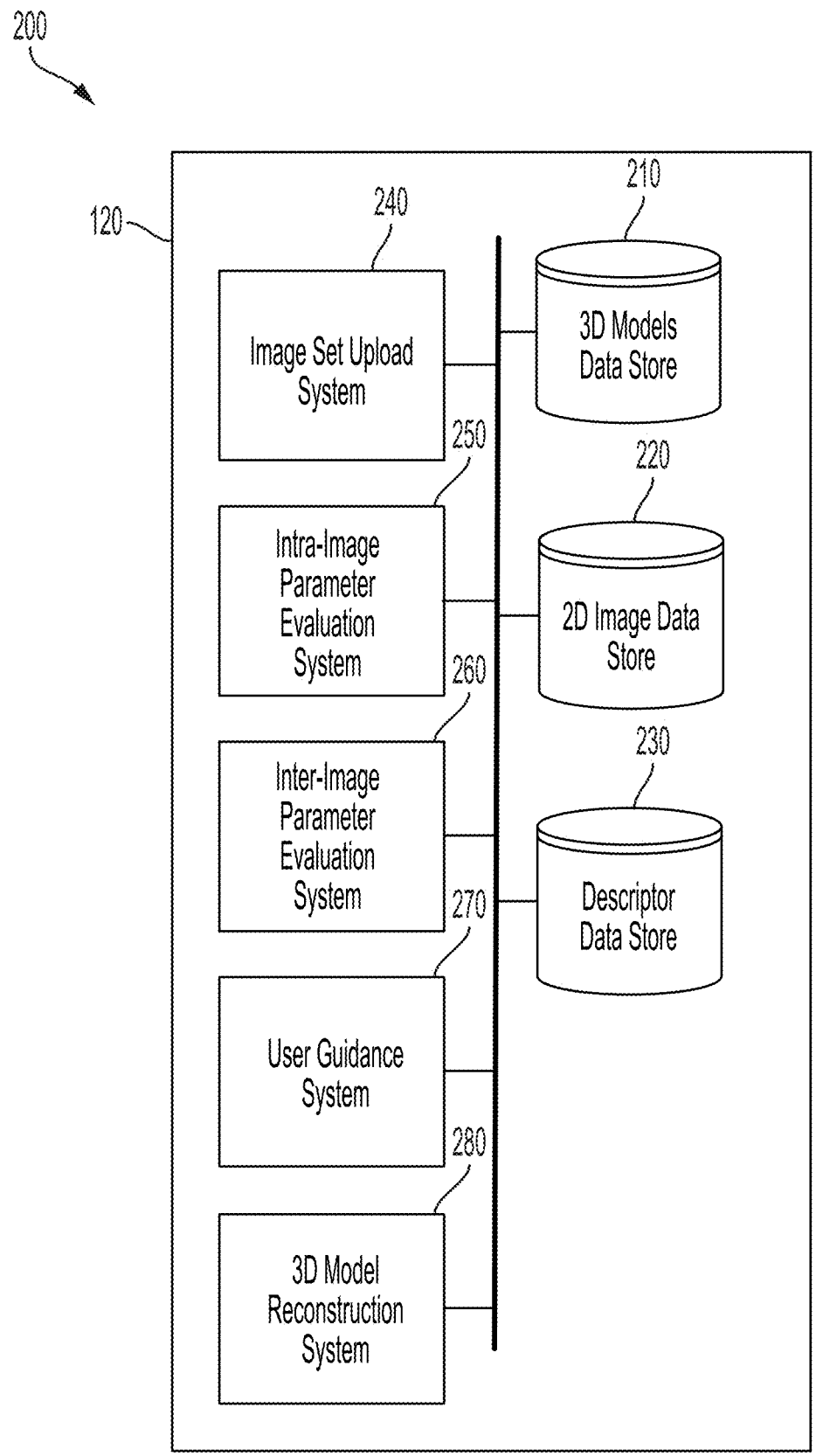
FIG. 2 is a block diagram illustrating another example of a network environment, according to certain aspects of the present disclosure.

FIG. 2 is a block diagram illustrating components of server 120, according to certain aspects of the present disclosure. In some implementations, server 120 may include several components, including 3D model data store 210, 2D image data store 220, and descriptor data store 230. Server 120 may be one or more processors or processing apparatuses (e.g., a stack of servers at a data center) configured to execute executable code that performs various functions, according to certain implementations described herein. The executable code may be stored in a memory (not shown) associated with server 120. Server 120 may be used to train and/or execute artificial-intelligence (AI) models of a computer-vision network, according to certain implementations described herein. In some implementations, one or more components of server 120 can be included in or executable by a native application running on a user device. In this case, the image evaluation can be performed directly on a user device, rather than at server 120.

3D model data store 210 may be configured to include a data structure that stores one or more existing 3D models of physical structures. Non-limiting examples of a 3D model of a physical structure include a CAD model, a 3D shape of a cuboid with an angled roof, a pseudo-voxelized volumetric representation, mesh geometric representation, a graphical representation, a 3D point cloud, or any other suitable 3D model of a virtual or physical structure. The 3D models of physical structures may be generated by a professional or may be automatically generated (e.g., a 3D point cloud may be generated from a 3D camera).

2D image data store 220 may store 2D images of physical structures. The 2D images may be captured by professionals or users of the native or web application, or may be generated automatically by a computer (e.g., a virtual image). Referring to the example illustrated in FIG. 1, the images of house 150, which is captured by user device 110 at position A, B, and C, may be transmitted to server 120 and stored in 2D image data store 220. The images stored in 2D image data store 220 may also be stored in association with metadata, such as the focal length of the camera that was used to capture the image, a resolution of the image, or a date and/or time that the image was captured. In some implementations, the images stored in 2D image data store 220 may depict top-down views of physical structures (e.g., aerial images or drone-captured images). In other implementations, the 2D image data store 220 may store images depicting ground-level views of houses, which can be evaluated using the computer-vision network described in certain implementations herein. Server 120 may process the images to generate descriptors, for example, by detecting a set of 14 keypoints within an image.

The images stored in 2D image data store 220 and/or the 3D models stored in 3D model data store 210 may serve as inputs to machine-learning or artificial-intelligence models. The images and/or the 3D models may be used as training data to train the machine-learning or artificial-intelligence models or as test data to generate predictive outputs. Machine-learning or artificial-intelligence models may include supervised, unsupervised, or semi-supervised machine-learning models.

Image set upload system 240 can be configured to open an intermediate image capture session, which can create a progressive image transmission link between user device 110 and server 120. As the user operates user device 110 to capture images for a set of images (that will be transmitted to server 120 for 3D reconstruction), the captured images are individually uploaded to server 120 using the image transmission link established by the intermediate image capture session. For example, the images can be uploaded to server 120 and stored in 2D image data store 220. If user device 110 loses connectivity to server 120 before the set of images is complete, then the images that have been captured prior to the loss of connectivity are preserved at server 120. Server 120 can perform 3D model reconstruction techniques using the available images stored at server 120. In some implementations, the native or web application running on user device 110 can selectively subsample one or more images of the set of images. The subsampling of the one or more images of the set of images can reduce the resolution of the one or more images, and thus, reduces the total amount of bandwidth needed to upload the images to server 120 for 3D model reconstruction and reduces the amount of time needed to upload the set of images from user device 110 to server 120 for 3D model reconstruction. In some implementations, image set upload system 240 can enable a 3D model of a physical structure to be reconstructed, at least in part, as each image is received during the intermediate image capture session. Image set upload system 240 can evaluate the received images to recognize any gaps in coverage of the physical structure. In some implementations, image set upload system 240 can determine a complexity of the physical structure being captured and whether additional images are needed to complete or facilitate the 3D model reconstruction of the physical structure. Image set upload system 240 can also generate a confirmation that the received images, which are received so far, provide a sufficient number and quality of feature correspondences to enable a 3D model to be reconstructed from the image data received. Image set upload system 240 can also evaluate each received image individually to determine whether the image is of a poor quality (e.g., poor lighting conditions, house not framed properly, etc.).

Intra-image parameter evaluation system 250 can be configured to perform an evaluation on each individual image as it is being captured or after it is captured. In some implementations, the evaluation can include detecting a target physical structure within a camera's viewfinder or display (hereinafter either may be referred to simply as a "display"). Detecting the target physical structure can include performing one or more image segmentation techniques, which include inputting a 2D image into a trained classifier to detect pixels relating to the target physical structure, such as a house. When the target physical structure is detected, the intra-image parameter evaluation system 250 can determine the dimensions of a bounding box and render the bounding box around the target physical structure. The bounding box may be a convex hull or quadrilateral otherwise that contains the image data of target physical structure. A pixel evaluator at the display's border may use a logic tool to determine whether display pixels at the display's boundary (or within a range of the boundary) include the bounding box or not. A pixel value at the display boundary held by the bounding box can indicate that the target physical structure is not fully in the camera's field of view. Corrective instructions can be displayed to the user, preferably concurrent with the camera's position, but in some implementations, subsequent to a pixel evaluation at a given camera position, based on the pixel evaluation. For example, if the pixel evaluator detects bounding box values on the top border of the display, an instructive prompt to pan the camera upwards (either by translating or rotating or both) is displayed. If the pixel evaluator detects bounding box values at the upper and lower borders, then a prompt for the camera user to back up and increase distance between the subject and the camera is displayed.

In some implementations, intra-image parameter evaluation system 250 can generate a segmentation mask, and then apply the segmentation mask to the display image. The segmentation mask may be trained separately to detect certain objects in an image. The segmentation mask may be overlaid on the image, and a pixel evaluator determines whether a segmentation pixel is present at the border of the display. In some implementations, intra-image parameter evaluation system 250 can display corrective instructions based on a threshold number of pixels from a border of the display. In some implementations, the threshold number can be a percentage of boundary pixels that are associated with a segmentation mask pixel relative to all other pixels along the boundary. In some implementations, the threshold number can be a function of a related pixel dimension of the segmented subject and the number of segmented pixels present at the display border.

Inter-image parameter evaluation system 260 can be configured to perform an evaluation of a complete set of 2D images, for example, which was captured during an image capture session. A complete set of 2D images can represent a plurality of 2D images that capture a physical structure from multiple angles. For example, continuing with the example illustrated in FIG. 1, as the user walks around house 150, the user operates user device 110 to capture the set of images, including an image at position A, another image at position B, and yet another image at position C. The set of images is completed when the user returns to a starting position (e.g., position A) and completes the loop around the perimeter of the physical structure. The native or web application executing on user device 110 can initiate the image capture session, which enables the user to begin capturing images of the physical structure from various angles, and which then stores each captured image. In some implementations, the image capture session can be the intermediate image capture session initiated by the image set upload system 240, described above.

Inter-image parameter evaluation system 260 can generate a 3D coverage metric for the complete set of 2D images, which was captured during the image capture session. The 3D coverage metric can be any value (e.g., a text string, a category, a numerical score, etc.) that represents a degree to which the set of 2D images is suitable for 3D model reconstruction. For example, the degree to which a set of 2D images is suitable for 3D model reconstruction can be inversely proportional to the degree to which uncovered areas of the physical structure remain after the complete set of 2D images has been captured. An uncovered area of the physical structure can be an edge or side of the physical structure that is not captured in pixels of any 2D image of the complete set of 2D image. The inter-image parameter evaluation system 260 can detect uncovered areas of the physical structure from the complete set of 2D images using techniques described herein (e.g., with respect to FIGS. 44-50). Further, inter-image parameter evaluation system 260 can reflect the degree to which there are uncovered areas of the physical structure in the 3D coverage metric.

In some implementations, inter-image parameter evaluation system 260 can evaluate the complete set of images to determine a difficulty with respect to reconstructing a 3D model using the set of images. For example, a difficulty of reconstructing the 3D model from the set of images can be informed by the angles formed by a point's position on a surface of a house in an image back to the imager (e.g., from the focal point of the camera). As an illustrative example, inter-image parameter evaluation system 260 can generate or retrieve an orthogonal view of a top of a target physical structure, and then can determine a plurality of points along the edges of the physical structure as viewed orthogonally. Each point can be assigned a value representing an angle relative to the imager at which that point was captured in an image of the set of images. The angle can be calculated between lines from the focal point of the camera to the point and the surface that point falls on. The various points can then be projected on a unit circle. The unit circle can be segmented into even segments (e.g., 8 even segments or slices). The arc of each segment can be associated with the angular perspective score of the plurality of points associated with such segment. For the points associated with each segment (e.g., the points on the arc of each segment), inter-image parameter evaluation system 260 can determine a median of the values of the plurality of points associated with that arc. The result can be a unit circle divided into multiple segments, such that each segment is associated with a single value. Further, the resulting unit circle with each segment associated with a single value can represent a difficulty of the 3D model reconstruction, or where additional images should be obtained to improve the angular perspective score for that region of the unit circle. The various outputs (individual points score or arc in a unit score), indicate the degree that an image was captured with minimal angle (e.g., an image plane was parallel to a surface orientation of the physical structure) relative to the surface of the physical structure, which reflects difficulty in 3D reconstruction.

User guidance system 270 can be configured to generate a feedback notification in real-time after an image is captured during the image capture session. The feedback notification can represent whether or not the captured image satisfies a 3D reconstruction condition with respect to a preceding captured image, for example, the immediately preceding image frame that was captured. If the 3D reconstruction condition is satisfied, then user guidance system 270 can generate a feedback notification indicating that the image has been captured and stored in association with the image capture session. If, however, the 3D reconstruction condition is not satisfied, then user guidance system 270 can generate a feedback notification indicating that the image was not stored in association with the image capture session. In some implementations, user guidance system 270 can also determine a new location to which the user should walk to re-capture an image that does satisfy the 3D reconstruction condition. As only a non-limiting example, the 3D reconstruction condition can be a condition that the most-recently captured image and the immediately preceding image share a threshold number of feature correspondences (e.g., a keypoint match) and that the feature correspondences are associated with a threshold number of different planes or lines. Two images that satisfy the 3D reconstruction condition can provide a sufficient number of feature correspondences to enable a 3D modeling system to reconstruct a 3D model of the physical structure.

3D model reconstruction system 280 can be configured to construct a 3D representation of a physical structure (e.g., residential building) using the complete set of images of the physical structure. The complete set of 2D images of the physical structure includes images depicting the physical structure from various angles, such as from a smart phone, to capture various geometries and features of the building. 3D model reconstruction system 280 can be configured to detect corresponding features between two or more images to reconstruct the physical structure in a 3D space based on those corresponding features. In some implementations, 3D model reconstruction system 280 can be configured to execute multi-image triangulation techniques to facilitate reconstructing a 3D model of a target subject (e.g., of a real-world residential building) from a set of 2D images of the target subject. 3D model reconstruction system 280 can detect a correspondence between a feature of one image to another feature of another one or more images, and then triangulate camera poses associated with those features to reconstruct the 3D model. For example, a feature can be a 2D line, point, corner, or curvature point detected in a 2D image. Then, 3D model reconstruction system 280 can establish the correspondence of these features between any pair of images. 3D model reconstruction system 280 can triangulate these 2D correspondences to reconstruct the 3D model of the physical structure.

Figure 3:
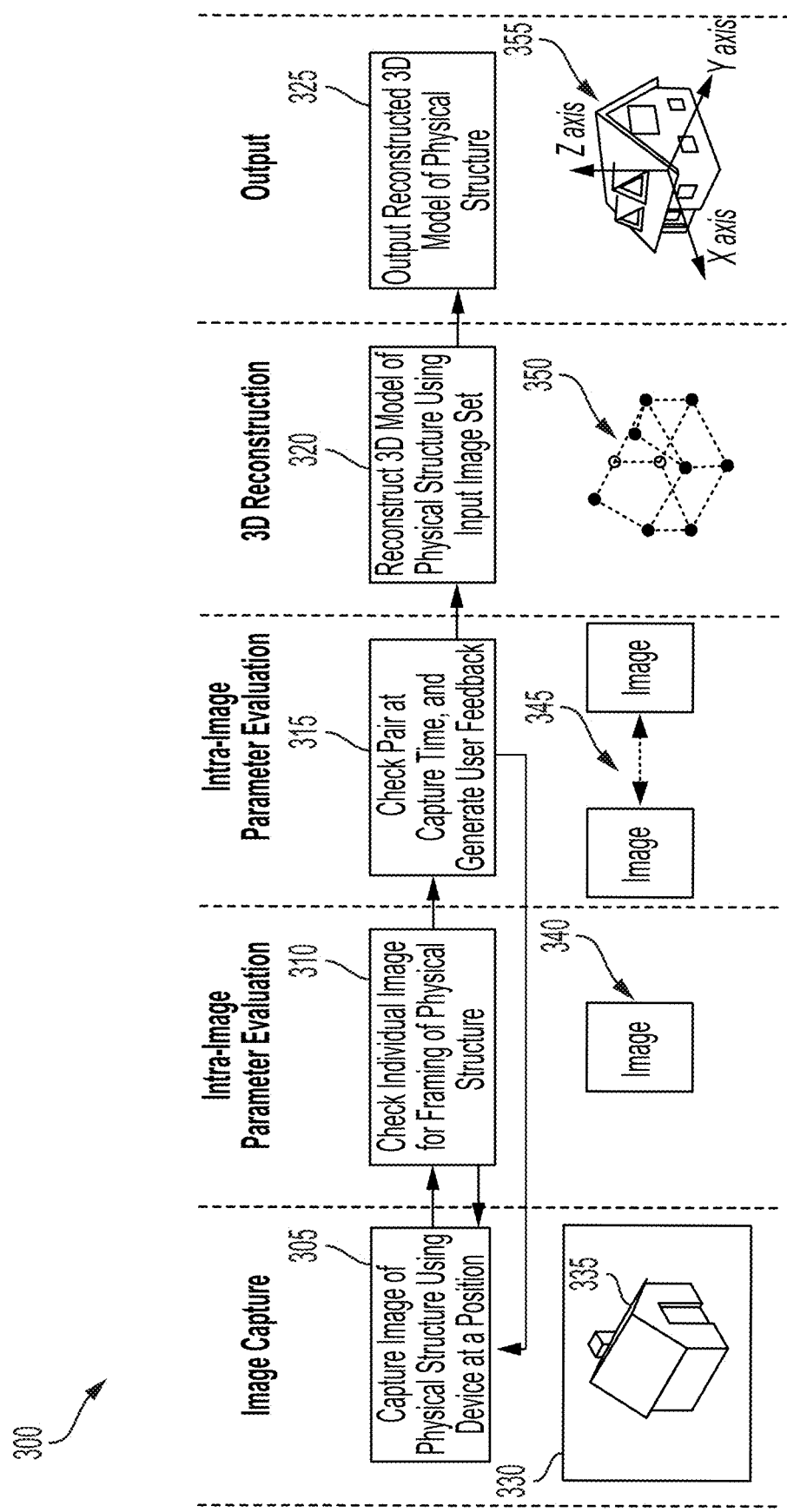
FIG. 3 is a diagram illustrating an example of a process flow for capturing a set of images for 3D model reconstruction, according to certain aspects of the present disclosure.

FIG. 3 is a diagram illustrating an example of a process flow for maximizing feature correspondences detected or captured in a set of 2D images to improve 3D model reconstruction, according to certain aspects of the present disclosure. Process flow 300 may represent certain operations performed by a computer-vision network for maximizing feature correspondences captured in 2D images for the purpose of constructing a 3D model of a house 335 captured in a set of 2D images, including 2D image 330. Process flow 300 may be performed, at least in part, by any of the components illustrated in FIGS. 1-2, such as user device 110, server 120 (or any of its components illustrated in FIG. 2), 2D image data store 220, and 3D model data store 210. Further, process flow 300 may be performed using a single network or multiple networks to evaluate each individual image captured during an image capture session and/or each pair of images to improve the quality of image data provided to 3D model reconstruction system 280 for 3D model reconstruction.

At block 305, user device 110 can execute a native application configured to capture a set of 2D images for the purpose of reconstructing a 3D model of a physical structure. The native application can initiate an image capture session that enables a user to capture multiple images of a physical structure. The image capture session can store each individual image captured (e.g., at user device 110 or at server 120 using a cloud network) and evaluate the captured image individually and in relation to one or more other images (e.g., any immediately preceding images captured in a set of images).

At block 310, intra-image parameter evaluation system 250 can evaluate each individual image as the image is being captured or after the image is captured. For example, as described in greater detail with respect to FIGS. 4-20, intra-image parameter evaluation system 250 can generate a guiding indicator on a display of user device 110 to guide the user to frame a physical structure within the display before capturing image 340. The guiding indicator can guide the user to capture as many features as possible per image, thereby maximizing the opportunity that at least one feature in an image will have a correspondence with another feature in another image and allowing that maximized feature correspondences to be used for reconstructing a 3D model of the physical structure in a 3D space. For example, while the user is attempting to capture an image of the physical structure, the native application can detect whether the physical structure is framed properly. If the physical structure is not framed properly, the native application can display a guiding indicator, which can visually (or audibly, in some implementations) guide the user to frame the physical structure within the display to maximize detectable features within the image data depicting the physical structure. Other aspects of image 340 can be evaluated in addition to or in lieu of the evaluation of the framing of the physical structure. In some implementations, if the entirety of the physical structure cannot fit within a viewfinder of user device 110, then intra-image parameter evaluation system 250 can detect whether a sub-structure of the physical structure is properly framed within the display (as described with respect to FIGS. 36-43B).

At block 315, inter-image parameter evaluation system 260 can evaluate each pair of images 345 while the image capture session is active (e.g., actively capturing and storing images associated with the session). Upon capturing an image, the inter-image parameter evaluation system 260 can evaluate the captured image with respect to a preceding image captured during the image capture session to determine if the pair of images 345 satisfies a 3D reconstruction condition. For example, inter-image parameter evaluation system 260 can determine whether a captured image shares sufficient feature correspondences with respect to a preceding captured image to maximize the number of feature correspondences available between the pair of images 345, thereby ensuring the image data has sufficient inputs available for reconstructing the 3D model. In some implementations, a sufficiency of feature correspondences can be determined by comparing a number of feature correspondences between the pair of images 345 to a threshold value. If the number of feature correspondences is equal to or above the threshold value, then inter-image parameter evaluation system 315 can determine that the feature correspondence between the pair of images 345 is sufficient. In some implementations, a sufficiency of feature correspondences can be determined by identifying a number of different planes and/or lines, on which the feature correspondences between the pair of images 345 are detected. If the number of different planes or lines associated with the detected feature correspondences is equal to or above a threshold, then inter-image parameter evaluation system 260 can determine that the pair of images 345 provides a diversity of planes or lines to allow the 3D model of the physical structure to be reconstructed. For instance, if many feature correspondences are detected between the pair of images 345, but the feature correspondences are detected on the same plane, then 3D model reconstruction system 280 may not have sufficient image data to reconstruct the 3D model of the physical structure. However, if fewer feature correspondences are detected, but the feature correspondences are detected on different planes, then 3D model reconstruction system 280 may have sufficient image data to reconstruct the 3D model of the physical structure. Any quality metric (e.g., a confidence associated with the feature correspondence, co-planarity, collinearity, covariance, gauge freedom, trifocal tensor, and loop closure metric) of a feature correspondence can be used for as a condition for the 3D reconstruction condition. If inter-image parameter evaluation system 260 determines that the pair of images 345 does not satisfy the 3D reconstruction condition, then the native application can generate a feedback notification that notifies the user that the image was not capture (or was not stored in association with the image capture session) and potentially guides the user to a new location to re-capture the image in a manner that does or is expected to satisfy the 3D reconstruction condition.

In some implementations, inter-image parameter evaluation system 260 can evaluate a complete set of 2D images after the image capture session has terminated. For example, the native application can terminate the image capture session if the user has completed a perimeter of the physical structure. Terminating the image capture session can include storing each captured image of the set of captured images and evaluating the set of captured images using user device 110. In some implementations, the set of captured images is not evaluated on user device 110, but rather is transmitted to server 120 for reconstructing the 3D model of the physical structure. Evaluating the complete set of 2D images can include generating a 3D coverage metric that represents a degree to which the set of 2D images is missing pixels that represent areas of the physical structure (e.g., a degree to which there are uncovered areas of the physical structure). In some implementations, if the 3D coverage metric is below a threshold value, then the native application can generate a feedback notification that indicates to the user that the set of 2D images captured during the image capture session does not provide sufficient feature correspondences for reconstructing a 3D model of the physical structure. The feedback notification can also indicate that a new set of 2D images needs to be captured. In some implementations, inter-image parameter evaluation system 260 can determine which areas of the physical structure are not depicted in the original set of 2D images, triangulate a location of user device 110 and the uncovered areas of the physical structure, and identify new candidate locations for the camera to re-capture one or more images. In these implementations, the user may only need to recapture one or more images to add image data to the original set of 2D images, and thus, would not need to recapture the entire set of 2D images.

At block 320, 3D model reconstruction system 280 can evaluate the image data included in the completed set of 2D images captured during the image capture session and reconstruct a 3D model 350 of the physical structure in a 3D space using one or more 3D model reconstruction techniques. The 3D model reconstruction performed by 3D model reconstruction system 280 can be improved due to the implementations described herein because these implementations guide a user to capture images that maximize the detected features in each individual image and maximize the detected feature correspondences between image pairs, such as successive images, which improves the ability of 3D model reconstruction system 280 to reconstruct the 3D model. At block 325, the computer-vision network may output a reconstructed 3D model 355 (potentially including one or more textures or colors rendered over the 3D model) representing a 3D model of the physical structure 335.

Described herein are various methods executable by intra-image parameter evaluation system 250. Intra-image parameter evaluation system 250 can be configured to analyze viewfinder or display contents to direct adjustment of a camera parameter (such as rotational pose) or preprocess a display contents before computer vision techniques are applied.

Though the field of photography may broadly utilize the techniques described herein, specific discussion will be made using residential homes as the exemplary subject of an image capture, and photogrammetry and digital reconstruction the illustrative use cases.

Though image analysis techniques can produce a vast amount of information, for example classifying objects within a frame or extracting elements like lines within a structure, they are nonetheless limited by the quality of the original image. Images in low light conditions or poorly framed subjects may omit valuable information and preclude full exploitation of data in the image. Simple techniques such as zooming or cropping may correct for some framing errors, but not all, and editing effects such as simulated exposure settings may adjust pixels values to enhance certain aspects of an image, but such enhancement does not replace pixels that were never captured (for example, glare or contrast differentials).

Specific image processing techniques may require specific image inputs, it is therefore desirable to prompt capture of a subject in a way that maximizes the potential to capture those inputs rather than rely on editing techniques in pre- or post-processing steps.

In three-dimensional (3D) modeling especially, two-dimensional (2D) images of a to-be-modeled subject can be of varying utility. For example, to construct a 3D representation of a residential building, a series of 2D images of the building can be taken from various angles, such as from a smart phone, to capture various geometries and features of the building. Identifying corresponding features between images is critical to understand how the images relate to one another and to reconstruct the subject in 3D space based on those corresponding features.

This problem is compounded for ground level images, as opposed to aerial or oblique images taken from a position above a subject. Ground level images, such as ones captured by a smartphone without ancillary equipment like ladders or booms, are those with an optical axis from the imager to the subject that is substantially parallel to the ground surface. With such imagery, successive photos of a subject are prone to wide baseline rotation changes, and correspondences between images are less frequent.

Figure 4:
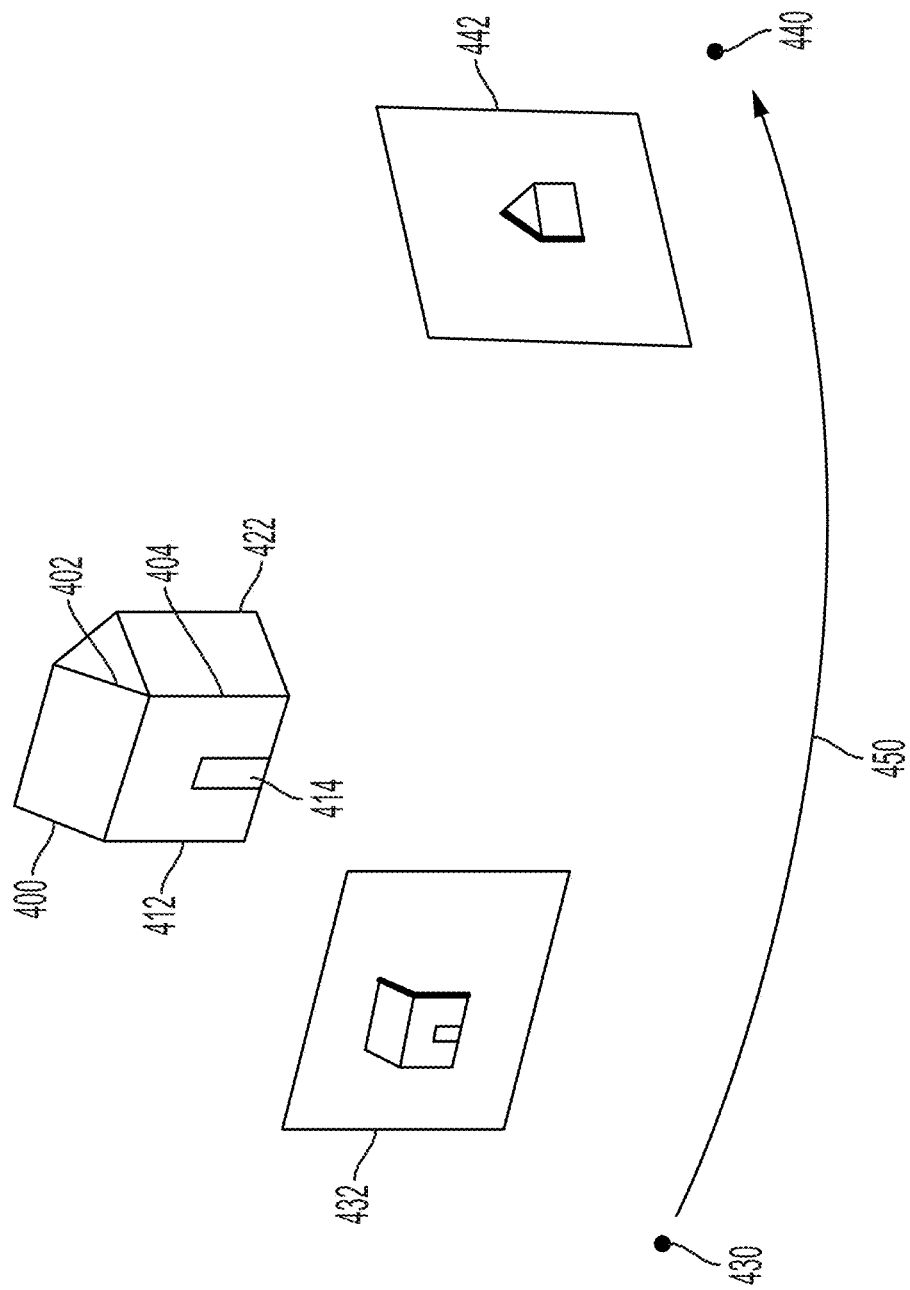
FIG. 4 illustrates an example of changes in features across ground-level camera views of a subject from different positions.

FIG. 4 illustrates this technical challenge for ground based images in 3D reconstruction. Subject 400 has multiple geometric features such as post 412, door 414, post 404, rake 402, and post 422. Each of these geometric features as captured in images represents useful data to understand how the subject is to be reconstructed. Not all of the features, however, are viewable from all camera positions. Camera position 430 views subject 400 through an image plane 432, and camera position 440 views subject 400 through an image plane 442. The rotation 450 between positions 430 and 440 forfeits many of the features viewable by both positions, shrinking the set of eligible correspondences to features 402 and 404 only.

Figure 5:
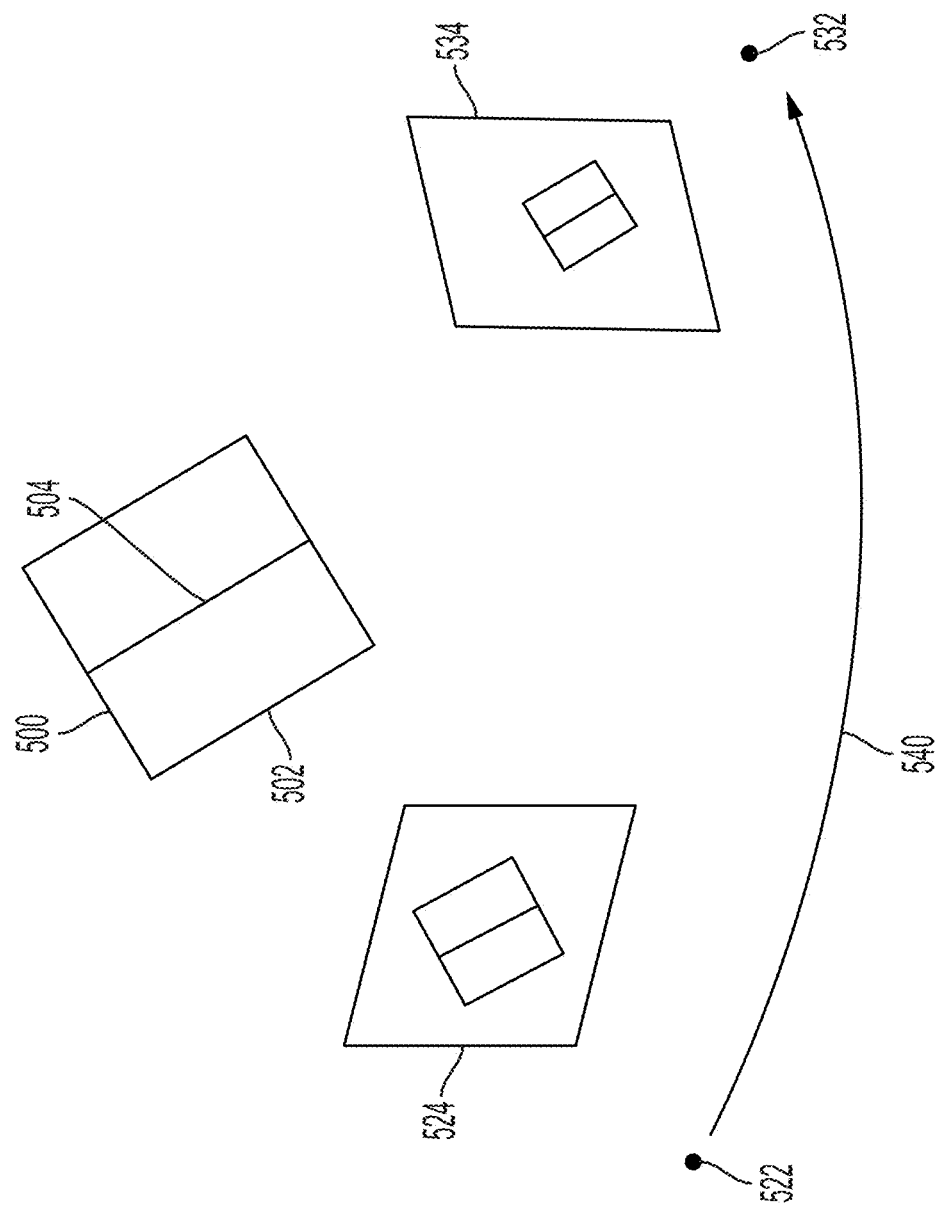
FIG. 5 illustrates an example of feature consistency across multiple aerial images.

This contrasts with aerial imagery that has an optical axis vector that will always have a common direction: towards the ground rather than parallel with. Because of this optical axis consistency in aerial imagery (or oblique imagery) whether from a satellite platform, high altitude aircraft, or low altitude drone, the wide baseline rotation problem of ground level images is obviated. Aerial and oblique images enjoy common correspondences across images as the subject consistently displays a common surface to the camera. In the case of building structures, this common surface is the roof. FIG. 5 illustrates this for subject roof 500 having features roofline 502 and ridgeline 504. FIG. 5 is a top plan view, meaning the imager is directly above the subject but one of skill in the art will appreciate that the principles illustrated by FIG. 5 apply to oblique images as well, wherein the imager is still above the subject but the optical axis is not directly down as in a top plan view. Because the view of aerial imagery is from above, the viewable portion of subject 502 appears only as an outline of the roof as opposed to the richer data of subject 400 for ground level images. As aerial camera position changes from position 522 to 532 by rotation 540, the view of subject roof 500 through either viewing pane 524 or 534 produces observation of the same features for correspondences.

It is critical then for 2D image inputs from ground level images to maximize the amount of data related to a subject, at least to facilitate correspondence generation for 3D reconstruction. In particular, proper framing of the subject to capture as many features as possible per image will maximize the opportunity that at least one feature in an image will have a correspondence in another image and allow that feature to be used for reconstructing the subject in 3D space.

In some embodiments, a target subject is identified within a camera's viewfinder or display (hereinafter referred to simply as a "display," and a bounding box is rendered around the subject. The bounding box may be a convex hull or quadrilateral otherwise that contains the subject. A pixel evaluator at the display's border may use a logic tool to determine whether pixels at or proximate to the display's boundary comprises the bounding box or not. A pixel value at the display boundary held by the bounding box indicates the subject is not fully in the camera's field of view. Corrective instructions can be displayed to the user, preferably concurrent with the camera's position but in some embodiments subsequent to a pixel evaluation at a given camera position, based on the pixel evaluation. For example, if the pixel evaluator detects bounding box values on the top border of the display, an instructive prompt to pan the camera upwards (either by translating or rotating or both) is displayed. If the pixel evaluator detects bounding box values at the upper and lower borders, then a prompt for the camera user to back up is displayed.

In some embodiments, a segmentation mask is applied to the display image. The segmentation mask may be trained separately to detect certain objects in an image. The segmentation mask may be overlaid on the image, and a pixel evaluator determines whether a segmentation pixel is present at the border of the display. In some embodiments, the pixel evaluator displays corrective instructions based on a threshold number of pixels. In some embodiments, the threshold number is a percentage of boundary pixels with a segmentation mask pixel relative to all other pixels along the boundary. In some embodiments, the threshold number is a function of a related pixel dimension of the segmented subject and the number of segmented pixels present at the display border.

These and other embodiments, and the benefits they provide, are described more fully with reference to the figures and detailed description.

Figure 6:
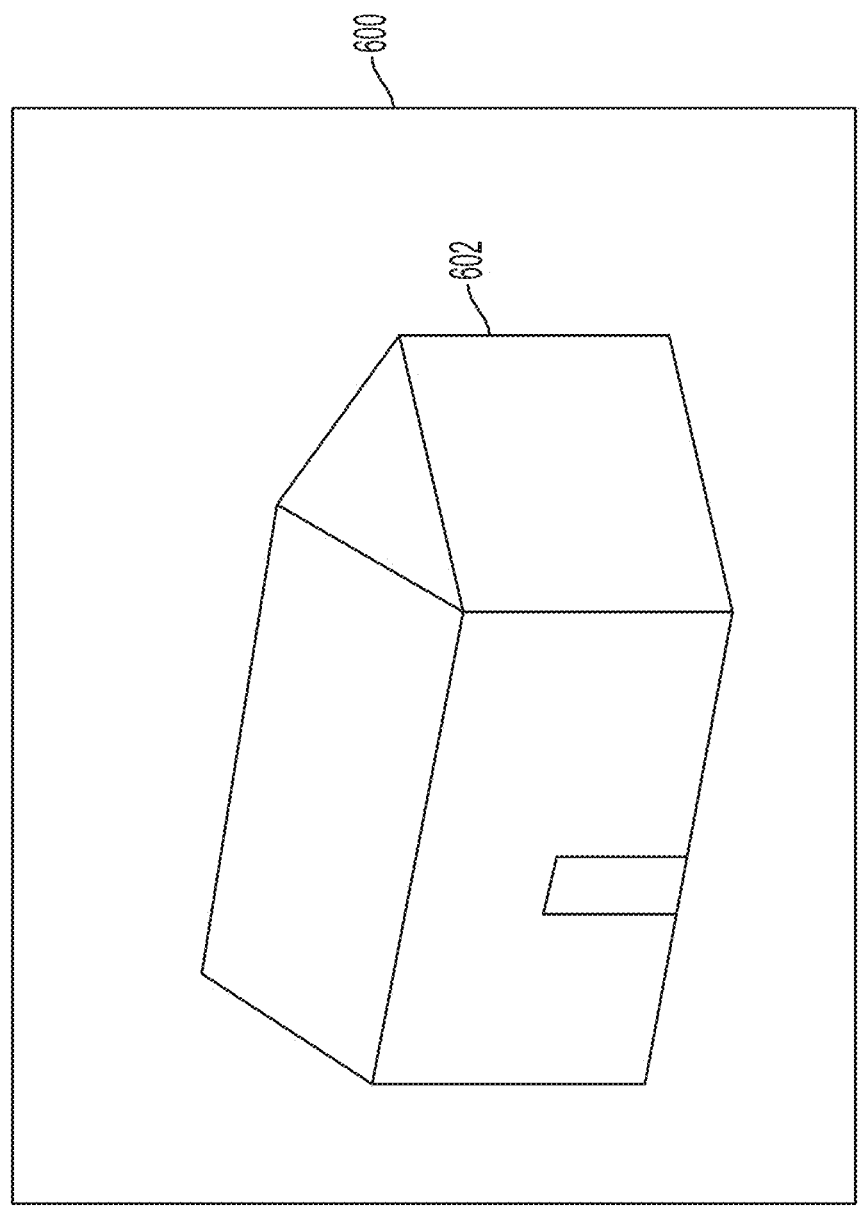
FIG. 6 illustrates an example of a framed subject in a camera display, according to certain aspects of the present disclosure.

FIG. 6 depicts display 600 with an image of subject 602 within. Display 600, in some embodiments, is digital display having a resolution of a number of pixels in a first dimension and a number of pixels in a second dimension. Display 600 may be a smartphone display, a desktop computer display or other display apparatuses. Digital imaging systems themselves typically use CMOS sensors, and a display coupled to the CMOS sensor visually represents the data collected on the sensor. When a capture event is triggered (such as through a user interface, or automatic capture at certain timestamps or events) the data displayed at the time of the trigger is stored as the captured image.

As discussed above, captured images vary in degree of utility for certain use cases. Techniques described herein provide displayed image processing and feedback to facilitate capturing and storing captured images with rich data sets.

In some embodiments, an image based condition analysis is conducted. Preferably this analysis is conducted concurrent with rendering the subject on the display of the image capture device, but in some embodiments may be conducted subsequent to image capture.

Figure 7:
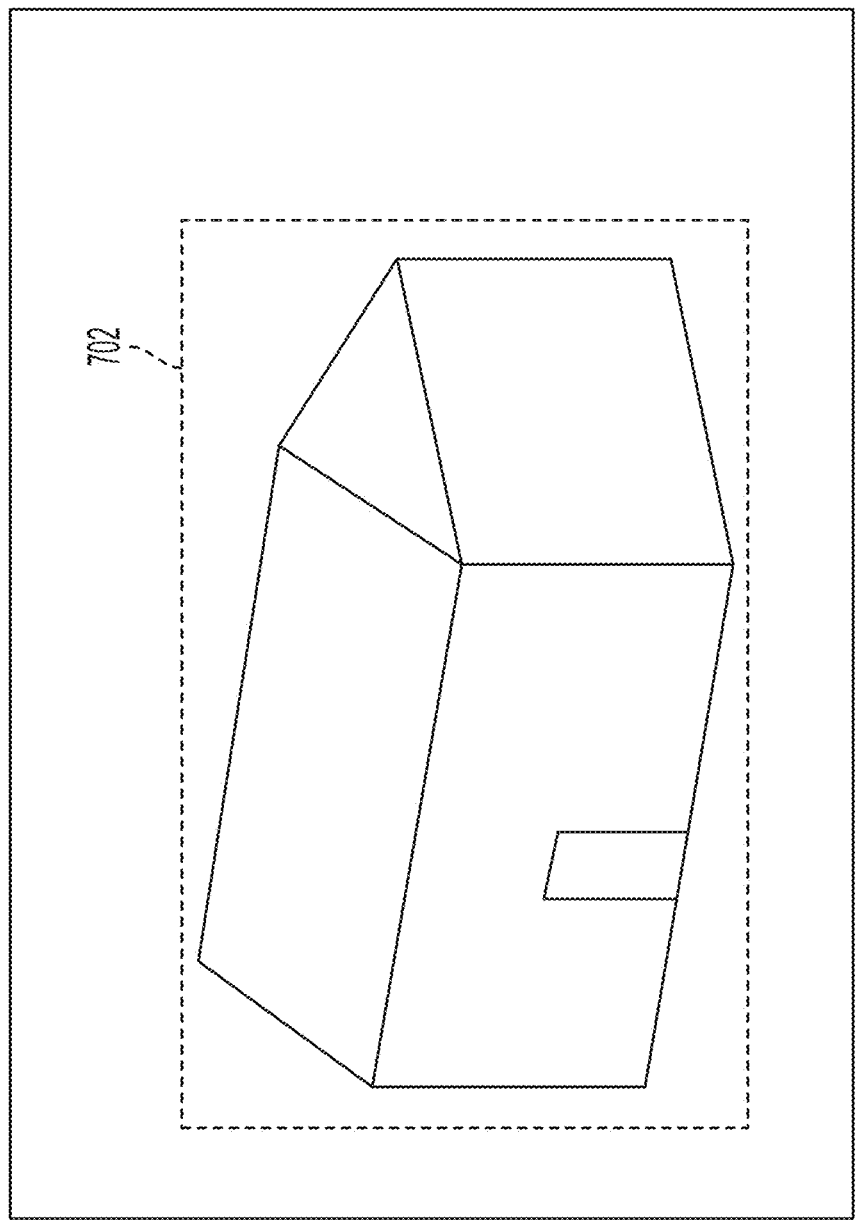
FIG. 7 illustrates an example of a bounding box disposed around a subject in a display, according to certain aspects of the present disclosure.

FIG. 7 illustrates the same display 600 and subject 602, but with a bounding box 702 overlaid on subject 602. In some implementations, bounding box 702 is generated about the pixels of subject 602 using tensor product transformations, such as a finite element convex function or Delaunay triangulation. In some implementations, the bounding box is projected after a target location function is performed to identify the location of the subject in the display.

A bounding box is a polygon outline that contains at least all pixels of a subject within. In some embodiments, the bounding box is a convex hull. In some embodiments, and as illustrated in the figures, the bounding box is a simplified quadrilateral. In some embodiments, the bounding box is shown on display 600 as a line (bounding box 702 is a dashed representation for ease of distinction with other aspects in the figures; other visual cues of representations are within the scope of the invention). In some embodiments, the bounding box is rendered by the display but not shown, in other words the bounding box lines have a pixel value, but display 600 does not project these values.

Figure 8:
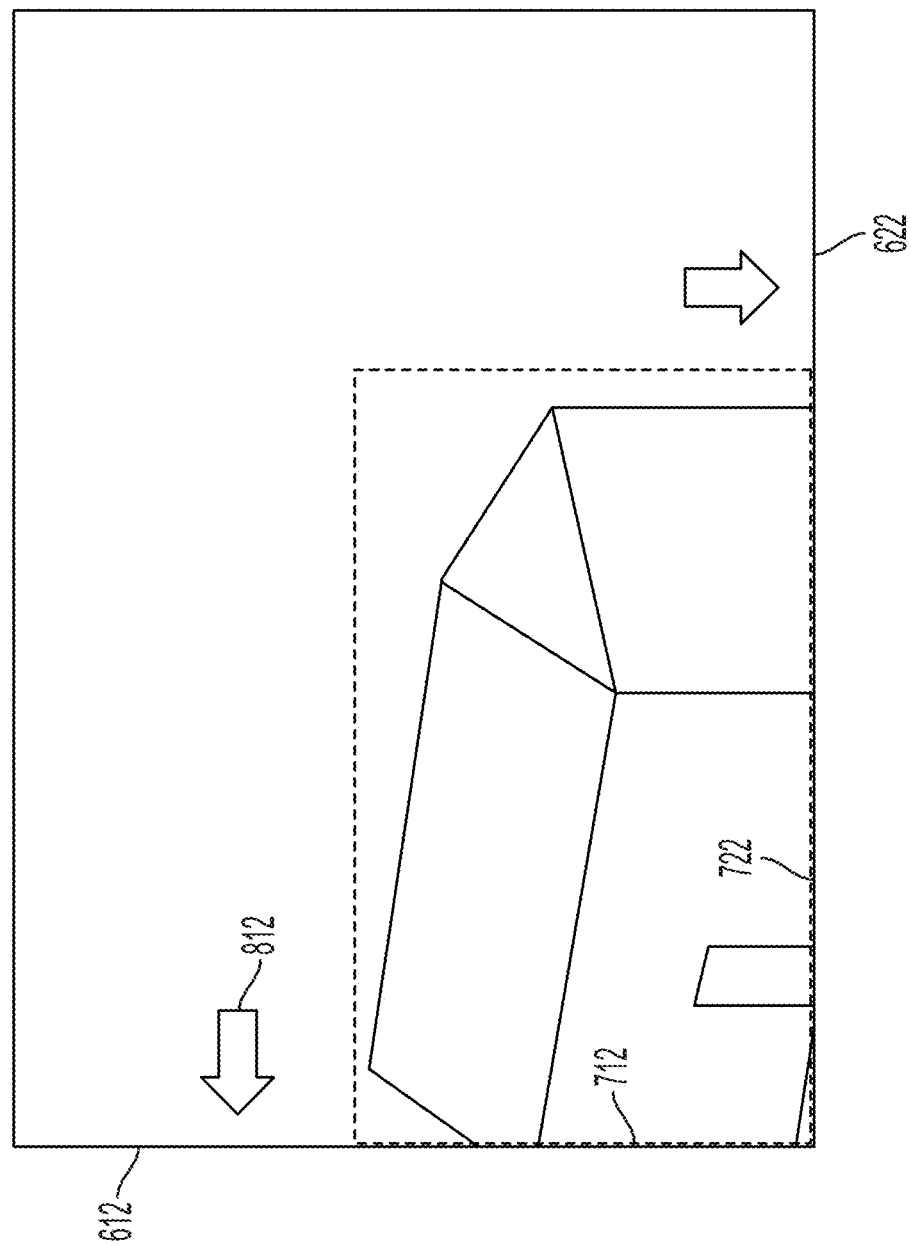
FIG. 8 illustrates an example of a subject that is not framed in a camera display, according to certain aspects of the present disclosure.

In FIG. 8, subject 602 is not centered in display 600. As such, certain features would not be captured in the image if the trigger event were to occur, and less than the full data potential would be stored. Bounding box 702 is still overlaid, but because the subject extends out of the display's boundaries, bounding box sides 712 and 722 coincide with display boundaries 612 and 622 respectively.

In some implementations, a border pixel evaluator runs a discretized analysis of a pixel value at the display 600 boundary. In the discretized analysis, the border pixel evaluator determines if a pixel value has a value held by the bounding box. In some embodiments, the display 600 rendering engine stores color values for a pixel (e.g. RGB) and other representation data such as bounding box values. If the border pixel evaluator determines there is a bounding box value at a border pixel, a framing condition is flagged and an instructive prompt is displayed in response to the location of the boundary pixel with the bounding box value.

For example, if the framing condition is flagged in response to a left border pixel containing a bounding box value, an instructive prompt to pan the camera to the left is displayed. Such instructive prompt may take the form of an arrow, such as arrow 812 in FIG. 8, or other visual cues that indicate attention to the particular direction for the camera to move. Panning in this sense could mean a rotation of the camera about an axis, a translation of the camera position in a plane, or both. In some embodiments, the instructive prompt is displayed concurrent with a border pixel value containing a bounding box value. In some embodiments, multiple instructive prompts are displayed. FIG. 8 illustrates a situation where the left display border 612 and bottom display border 622 have pixels that contain a bounding box value and have instructive prompts responsively displayed to position the camera such that the subject within the bounding box is repositioned in the display and no bounding box pixels are present at a display border.

In some implementations, a single bounding box pixel (or segmentation mask pixel as described below) at a boundary pixel location will not flag for instructive prompt. A string of adjacent bounding box or segmentation pixels is required to initiate a condition flag. In some embodiments, a string of at least eight consecutive boundary pixels with a bounding box or segmentation mask value will initiate a flag for an instructive prompt.

Figure 9:
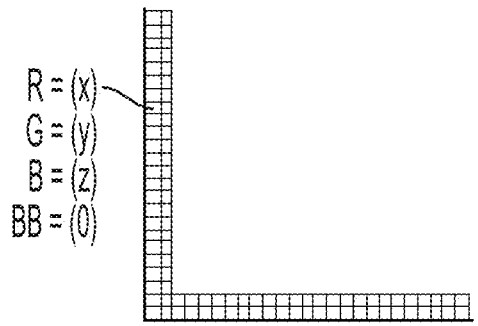
FIGS. 9-11 illustrate examples of boundary pixel relationships for instructive panning prompts on a display, according to certain aspects of the present disclosure.
Figure 10:
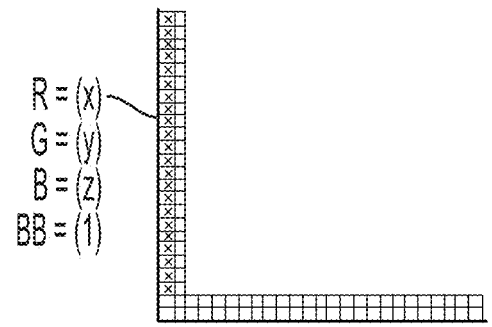
Figure 11:
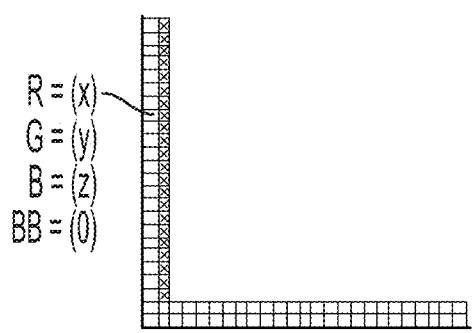

FIGS. 9-11 illustrates select rows and columns of display pixels adjacent a display border. A pixel value is depicted conveying the image information (RGB values as shown), as well as a field for a bounding box value. For exemplary purposes only, a "zero" value indicates the bounding box does not occupy the pixel. FIGS. 9-11 show only the first two lines of pixels adjacent the display border for ease of description. FIG. 10 illustrates a situation where a bounding box occupies pixels at the boundary of a display (as illustrated by the grayscale fill of the pixels, one of skill in the art will appreciate that image data such as RGB values may also populate the pixel). As shown, the bounding box value for the border pixel evaluator is "one." In some embodiments, the presence of a bounding box value of one at a display border pixel causes the corresponding instructive prompt, and the prompt persists in the display as long as a border pixel or string of border pixels has a "one" value for the bounding box.

In some implementations, even when the border pixel value is "zero" the instructive prompt may display if there is a bounding box value in a pixel proximate to the border pixels. For example, in FIG. 11 the display pixels immediately adjacent to the border have a zero value for bounding box presence, but the next row of pixels comprise bounding box values. This may result from noisy input for the bounding box that may preclude precise pixel placement for the bounding box, or camera resolution may be so fine that slight camera motions could place a bounding box practically at the border, despite border pixels not explicitly holding a bounding box value. In some embodiments the instructive prompt will display if there is a bounding box value of "one" proximate to display boundary as in FIG. 11. In some embodiments the pixel separation for being proximate to a display boundary is less than two pixels, in some embodiments it is less than five pixels, in some embodiments it is less than ten pixels; in some embodiments, the threshold value is a percentage of the total display size. For example, if the display is x pixels wide, then the border pixels for evaluation is x/100 pixels and any bounding box value of "one" within that x/100 pixel area will trigger display of the instructive prompt.

Figure 12:
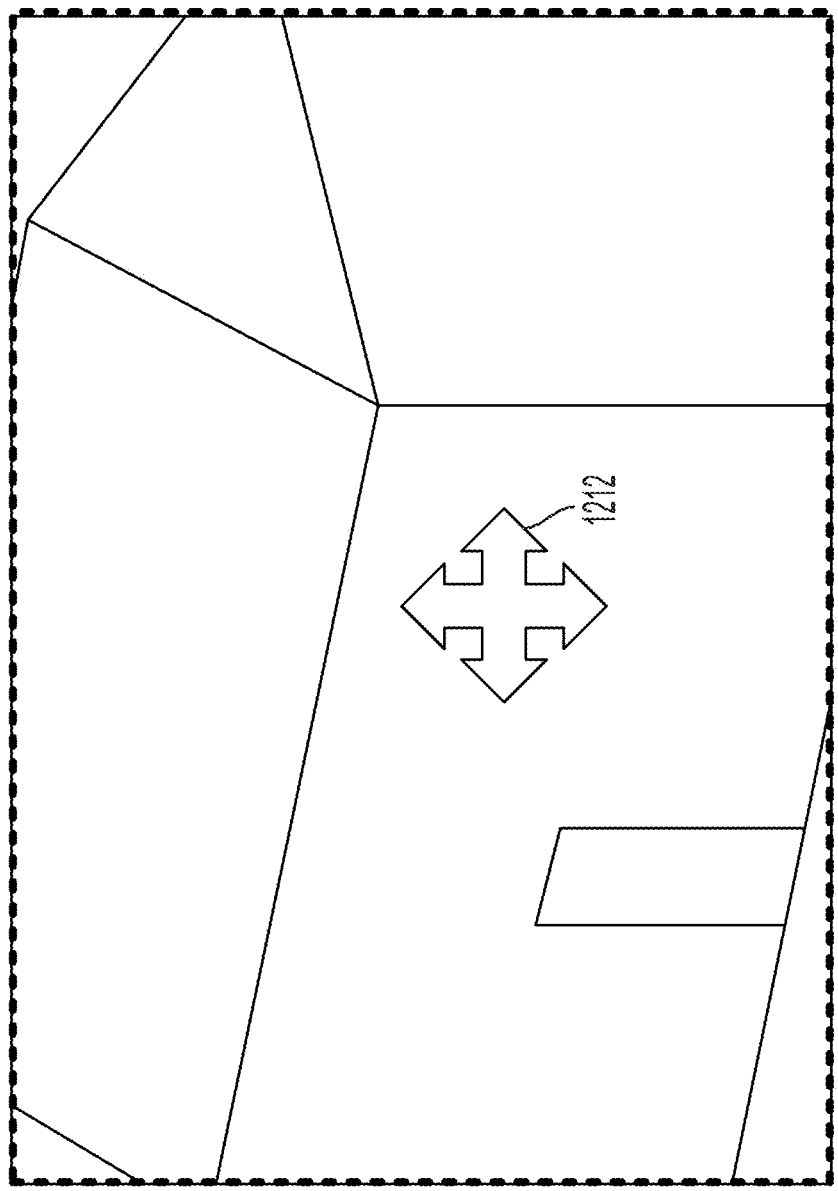
FIGS. 12-13 illustrate examples of instructive prompts for moving along an optical axis, according to certain aspects of the present disclosure.
Figure 13:
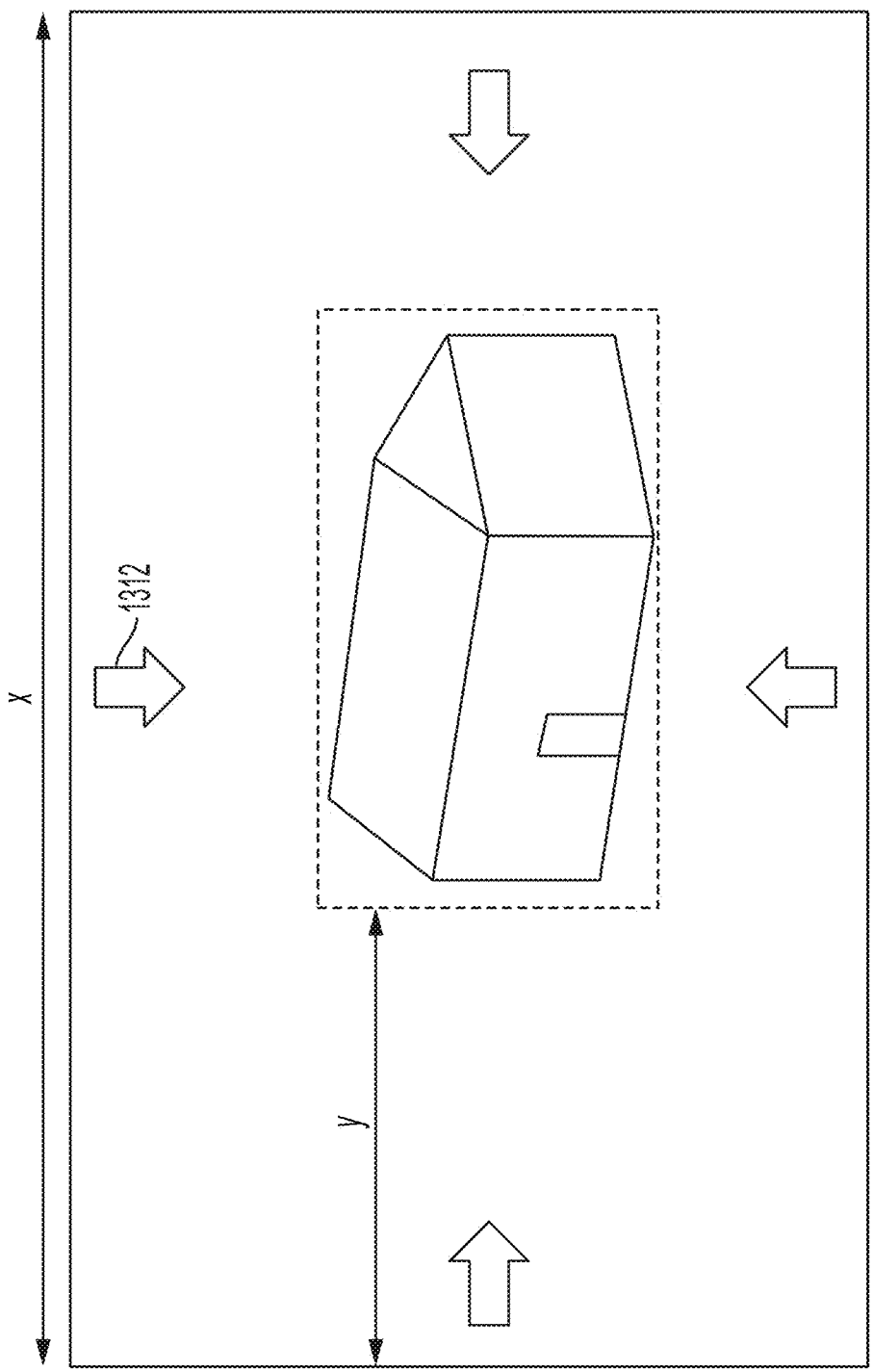

FIG. 12 illustrates a situation when the bounding box occupies all boundary pixel values, suggesting the camera is too close to the subject. Instructive prompt 1212 indicates the user should back up, though text commands or verbal commands are enabled as well. Conversely, FIG. 13 depicts a scenario where the bounding box occupies pixels far from the boundary and instructive prompts 1312 are directed to bringing the camera closer to the subject or to zoom the image closer. In determining whether a subject is too far from the camera, a relative distance of a bounding box value and a border pixel is calculated. For example, for a display x pixels wide, and a bounding box value around a subject occurs y pixels from a display boundary, a ratio of x:y is calculated. Smaller ratios, such as less than 5:1 (i.e. for a 1064 pixel wide display, the bounding box displays less than 213 pixels from a display border) would not trigger instructive prompt 1312 for a closer subject capture. Various other sensitivities could apply, such that larger or smaller ratios to achieve the intended purpose for the particular use or camera are enabled. Unlike depth of field adjustments in photography, which prompts camera position changes to position subjects in a camera's (or cameras) focal plane, placement prompts as described herein relate to changes to position the subject in the camera's display.

The interaction between a closer subject capture as described in relation to FIG. 13 and a border threshold as described in FIG. 12 should also be considered. An overly large border threshold would prompt the user or camera to back up (as the bounding box is more likely to abut a larger buffer region around the display boundaries), perhaps so far that it triggers the closer subject prompts to simultaneously instruct the user or camera to get closer. In some embodiments, a mutual threshold value for the display is calculated. In some embodiments, the mutual threshold value is a qualitative score of how close a bounding box is to boundary separation threshold. The closer subject prompt then projects a feedback for how close a bounding box edge is to the separation threshold; the separation threshold value, then, is an objective metric for the closer subject prompt to measure against.

Figure 14:
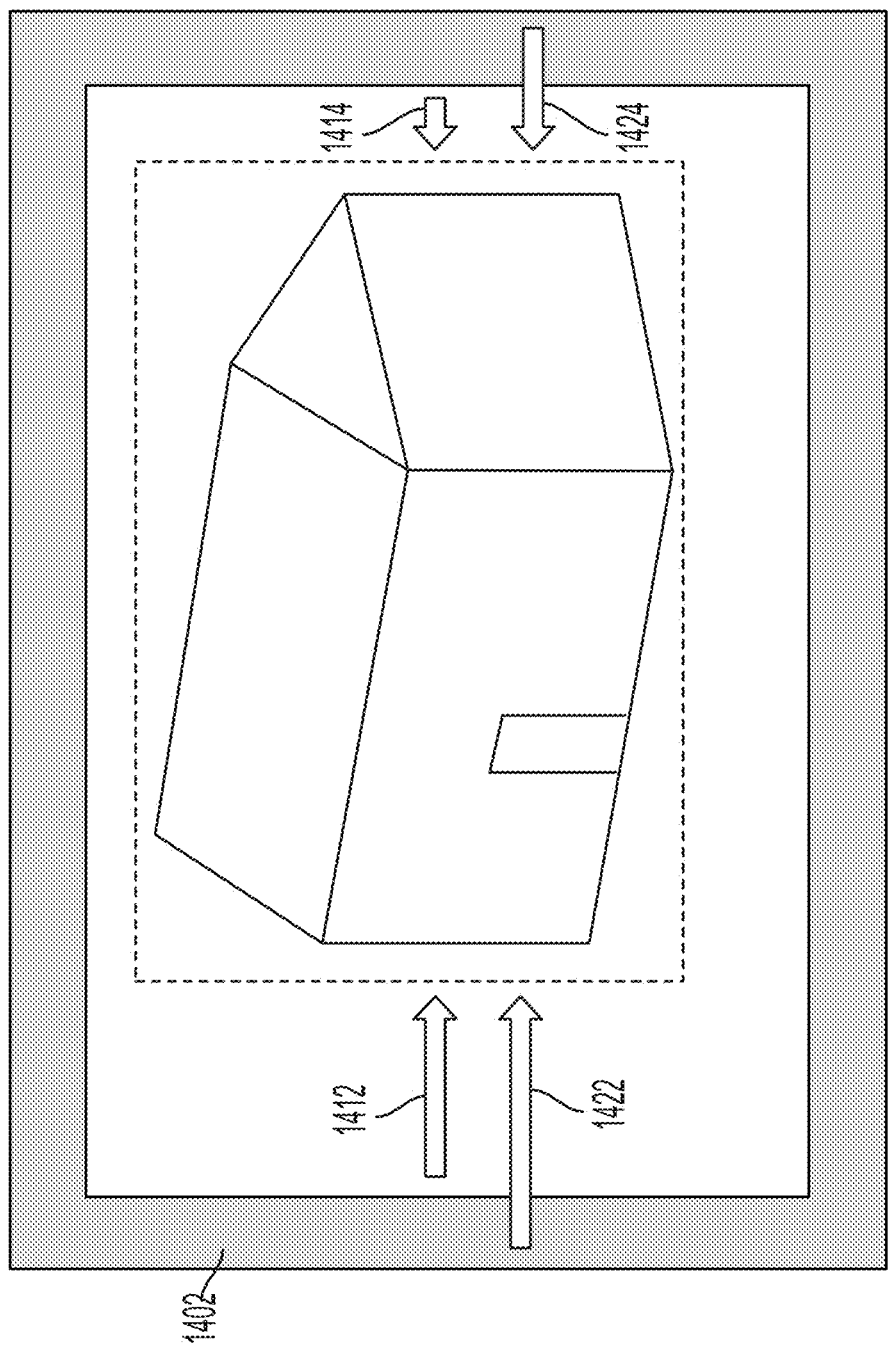
FIG. 14 illustrates an example of a boundary threshold relationship with a subject framing, according to certain aspects of the present disclosure.

FIG. 14 illustrates a sample display balancing the close and far competing distances with a mutual threshold value. FIG. 14 depicts boundary threshold region 1402, indicating that any bounding box values at pixels within the region 1402 implies the camera is too close to the subject and needs to be distanced farther to bring the subject farther from the display borders. In some embodiments, an instructive prompt 1412 or 1414 indicates the distance of a bounding box value to the threshold region 1402, and ratios as discussed with reference to FIG. 13 are made as to the display area within threshold region 1402 and not the overall display size. Similarly, in some embodiments there is no threshold region and the prompts 1422 and 1424 indicate the degree the camera should be adjusted to bring the subject more within the display boundaries directly. It will be appreciated that prompts 1412, 1414, 1422 and 1424 are dynamic in some embodiments, and may adjust in size or color to indicate suitability for the subject within the display. Though not pictured, status bars ranging from red (the bounding box is far from a boundary or threshold region) or green (the bounding box is near or at the display boundary or threshold region) are within the scope of invention, and not just the arrows as illustrated in FIG. 14.

In the context of "close" and "far," in some embodiments, a bounding box within five percent (as measured against the display's overall pixel dimension in a given direction) from the boundary or threshold region may be "close" while distances over twenty percent may be "far," with intermediate indicators for ranges in between.

Figure 15:
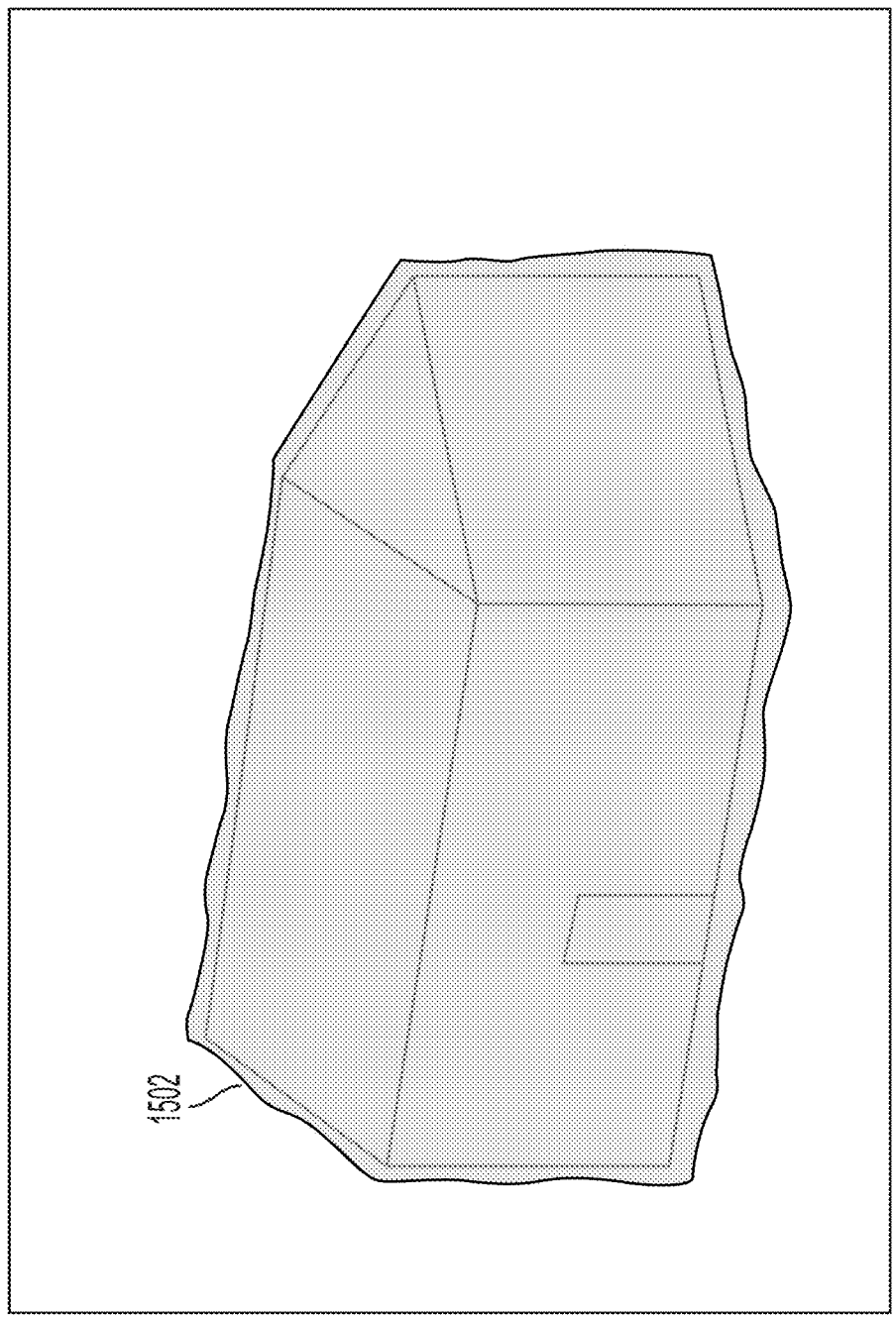
FIG. 15 illustrates an example of a segmentation mask overlaid on a subject, according to some embodiments.

While bounding boxes are a simple and straightforward tool for analyzing an image position within a display, segmentation masks may provide more direct actionable feedback. FIG. 15 illustrates a segmentation mask 1502 overlaid on subject 602. Segmentation mask 1502 may be generated by a classifier or object identification module of an image capture device; MobileNet is an example of a classifier that runs on small devices. The classifier may be trained separately to identify specific objects within an image and provide a mask to that object. The contours of a segmentation mask are typically irregular at the pixel determination for where an object begins and the rest of the scene ends and can be noisy. As such, mask 1502 need not be, and rarely is, a perfect overlay of subject 602.

This noisy overlay still provides a better approximation of the subject's true presence in the display. While a bounding box ensures all pixels of a subject are within, there are still many pixels within a bounding box geometry that do not depict the subject.

Figure 16:
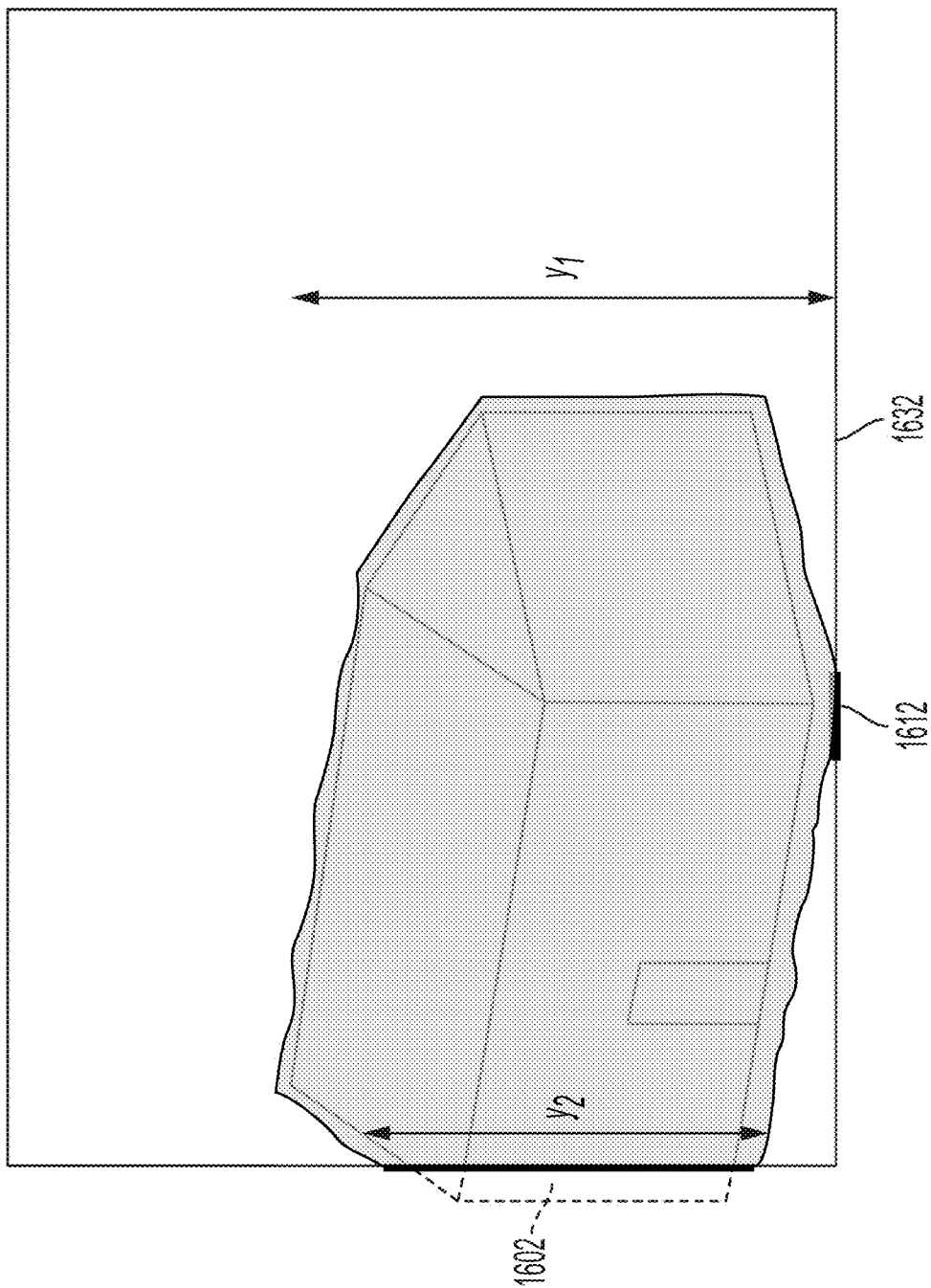
FIG. 16 illustrates an example of a subject with a segmentation mask extending outside the boundary of a display, according to certain aspects of the present disclosure.

For example, in FIG. 16, only a small portion 1602 of subject 602 is outside the left boundary, and only a mask portion 1612 is at the lower boundary (the subject geometry is actually within the display). In some embodiments, a pixel evaluator may use the segmentation values elsewhere in the image to determine whether to generate instructive prompts.

For example, as in FIG. 16, if the mask portion 1612 that is along display border 1632 is only twenty pixels long and the entire display width is 1064 pixels, then no instructive prompts need to be displayed as the minimal information in the portion outside of the display is unlikely to generate additional robust data. In some embodiments, this percentage tolerance is less than 1% of display pixel dimensions, in some embodiments it is less than 5%, in some embodiments it is less than 10%.

Looking to the left boundary, where portion 1602 is outside the display boundary, additional image analysis determinations can indicate whether instructive prompts are appropriate. A pixel evaluator can determine a height of the segmentation mask, such as in pixel height $y_1$ depicted in FIG. 16. The pixel evaluator can similarly calculate the dimension of portion 1602 that is along a border, depicted in FIG. 16 as $y_2$. A relationship between $y_1$ and $y_2$ indicates whether camera adjustments are appropriate to capture more of subject 602. While percentage of pixels relative to the entire display, such as described in relation to mask portion 1612 above are helpful, percentage of pixels relative to the subject can be utilized information as well.

In some embodiments, a ratio of subject dimension $y_1$ and boundary portion $y_2$ are compared. In some embodiments, a ratio of less than 5:1 (meaning subject height is more than five times the height of the portion at the display boundary) then no instructive prompts are displayed. Use cases and camera resolutions may dictate alternative ratios.

Figure 17:
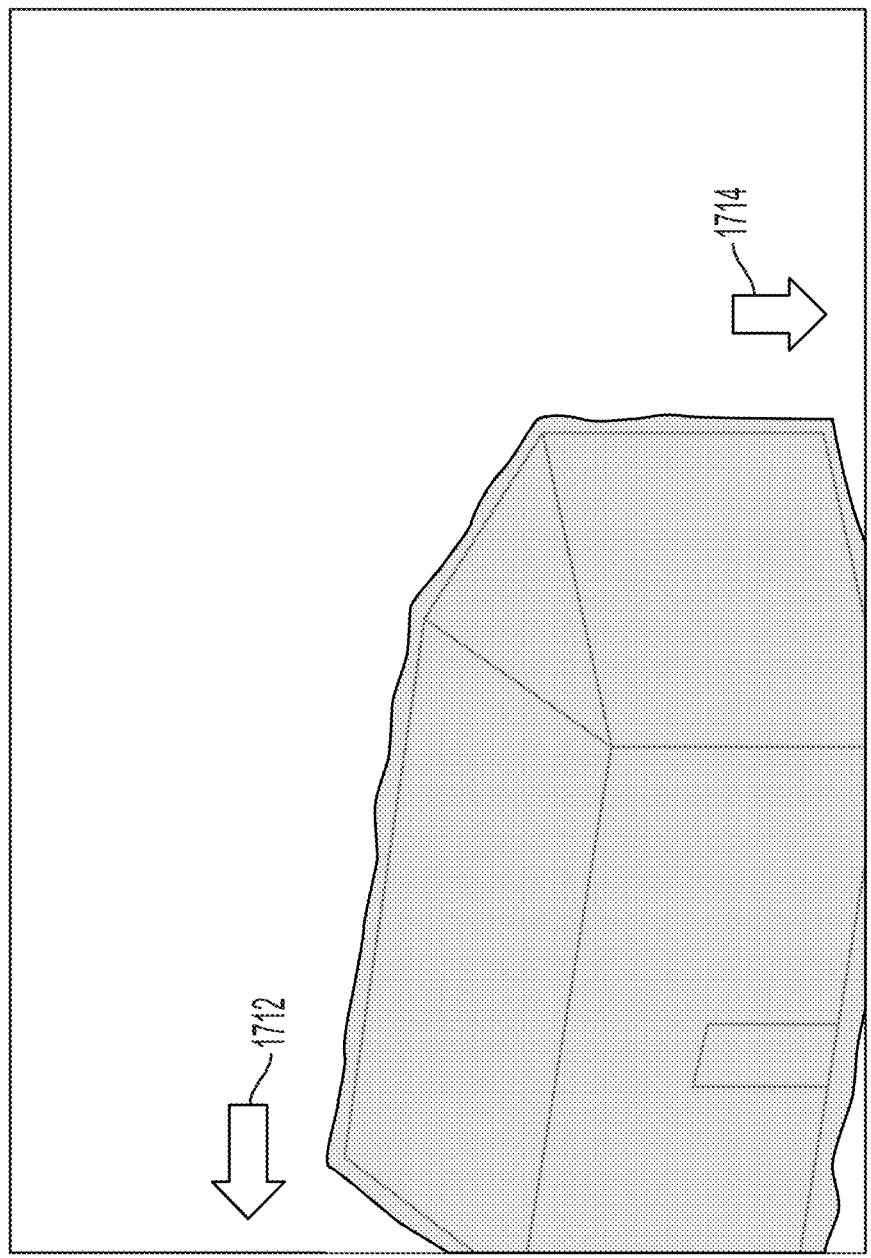
FIG. 17 illustrates an example of an instructive panning prompts on a display, according to certain aspects of the present disclosure.

FIG. 17 illustrates similar instructive prompts for directing camera positions as described for bounding box calculations in FIG. 8. Segmentation mask pixels along a left display boundary generate instructive prompt 1712 to pan the camera to the left, and segmentation mask pixels along the lower display boundary generate instructive prompt 1714 to pan the camera down. Though arrows are shown, other instructive prompts such as status bars, circular graphs, audible instructions, and text instructions are also possible.

In some embodiments, whether instructive prompts for bounding boxes or segmentation masks, they are presented on the display as long as a boundary pixel value contains a segmentation or bounding box value. In some embodiments, the prompt is transient, only displaying for a time interval so as not to clutter the display with information other than the subject and its framing. In some embodiments, the prompt is displayed after image capture, and instead of the pixel evaluator working upon the display pixels it performs similar functions as described herein for captured image pixels. In such embodiments, prompts are then presented on the display to direct a subsequent image capture. This way, the system captures at least some data from the first image, even if less than ideal. Not all camera positions are possible, for example if backing up to place a subject in frame requires the user to enter areas that are not accessible (e.g. private property, busy streets) then it is better to have a stored image with at least some data rather than continually prompt camera positions that cannot be achieved and generate no data as a result.

Figure 18B:
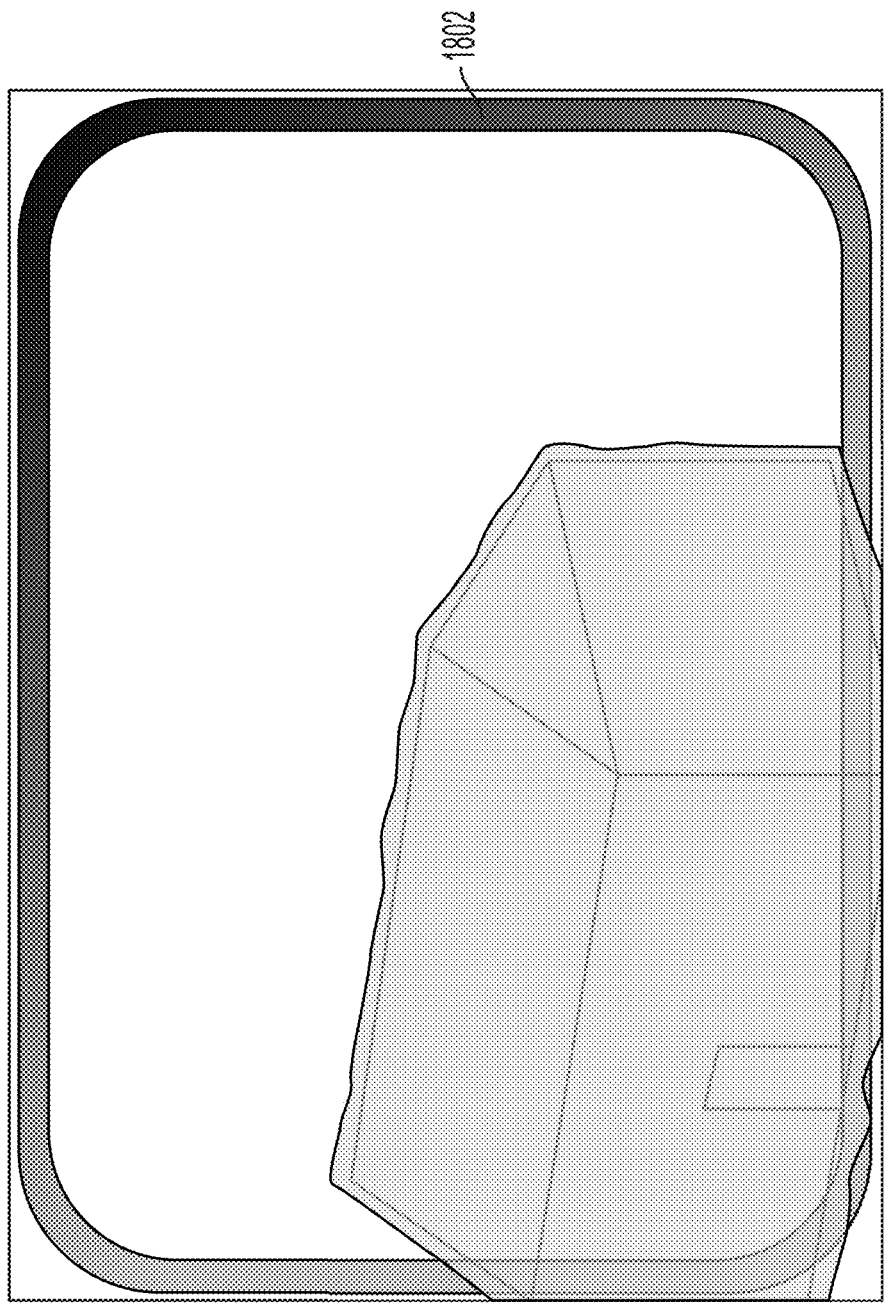
Figure 18C:
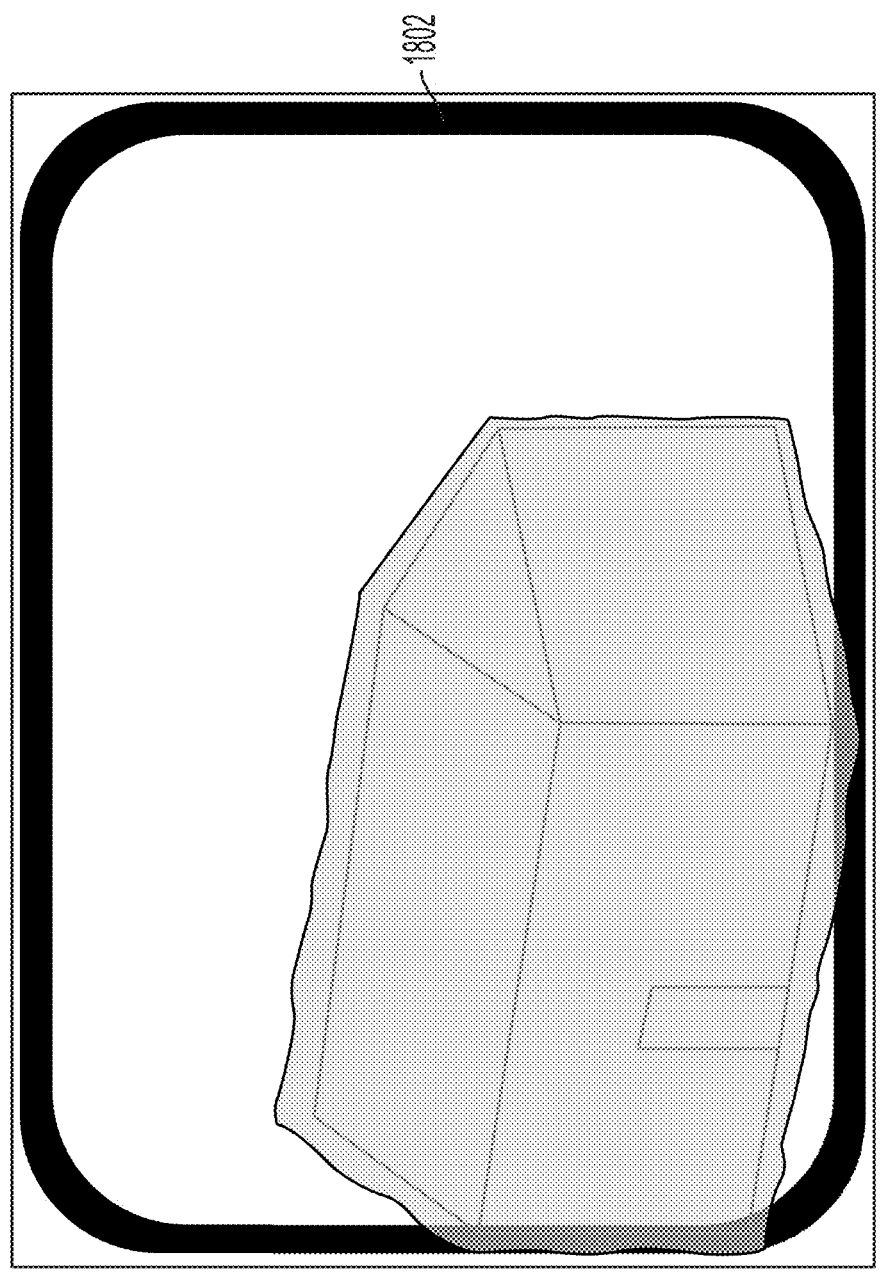

FIGS. 18A-18C illustrate an alternative instructive prompt, though this and the arrows depicted in previous figures are no way limiting on the scope of feedback prompts. FIGS. 18A-18C show progressive changes in a feedback status bar 1802. In FIG. 18A, subject 602 is in the lower left corner. Status bar 1802 is a gradient bar, with the lower and left portions not filled as the camera position needs to pan down and to the left. As the camera position changes, in FIG. 18B, the status bar fills in to indicate the positional changes are increasing the status bar metrics until the well positioned camera display in FIG. 18C has all pixels of subject 602 and the status bar is filled. Note that while FIGS. 18A-18C depict instructive prompt relative to a segmentation mask for a subject, this prompt is equally applicable to bounding box techniques as well.

Figure 18D:
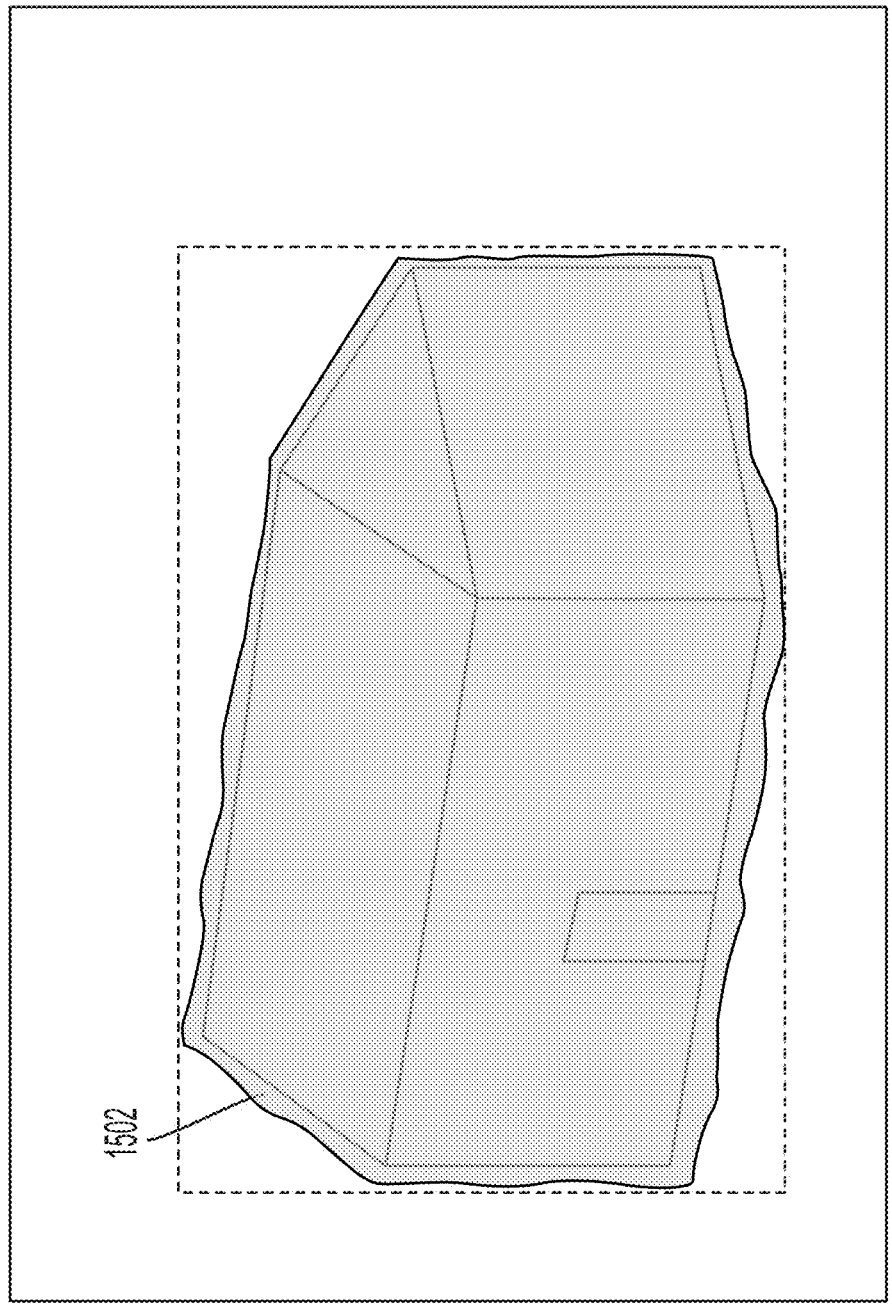

In some embodiments, the segmentation mask is used to determine a bounding box size, but only the bounding box is displayed. An uppermost, lowermost, leftmost, and rightmost pixel, relative to the display pixel arrangement is identified and a bounding box drawn such that the lines tangentially intersect the respective pixels. FIG. 18D illustrates such an envelope bounding box, depicted as a quadrilateral, though other shapes and sizes are possible. In some embodiments, therefore, envelope bounding boxes are dynamically sized in response to the segmentation mask for the object in the display. This contrasts with fixed envelope bounding boxes for a predetermined objects with known sizes and proportions. FIG. 18D depicts both a segmentation mask and bounding box for illustrative purposes; in some embodiments only one or the other of the segmentation mask or bounding box are displayed. In some embodiments, both the segmentation mask and bounding box are displayed.

Figure 18E:
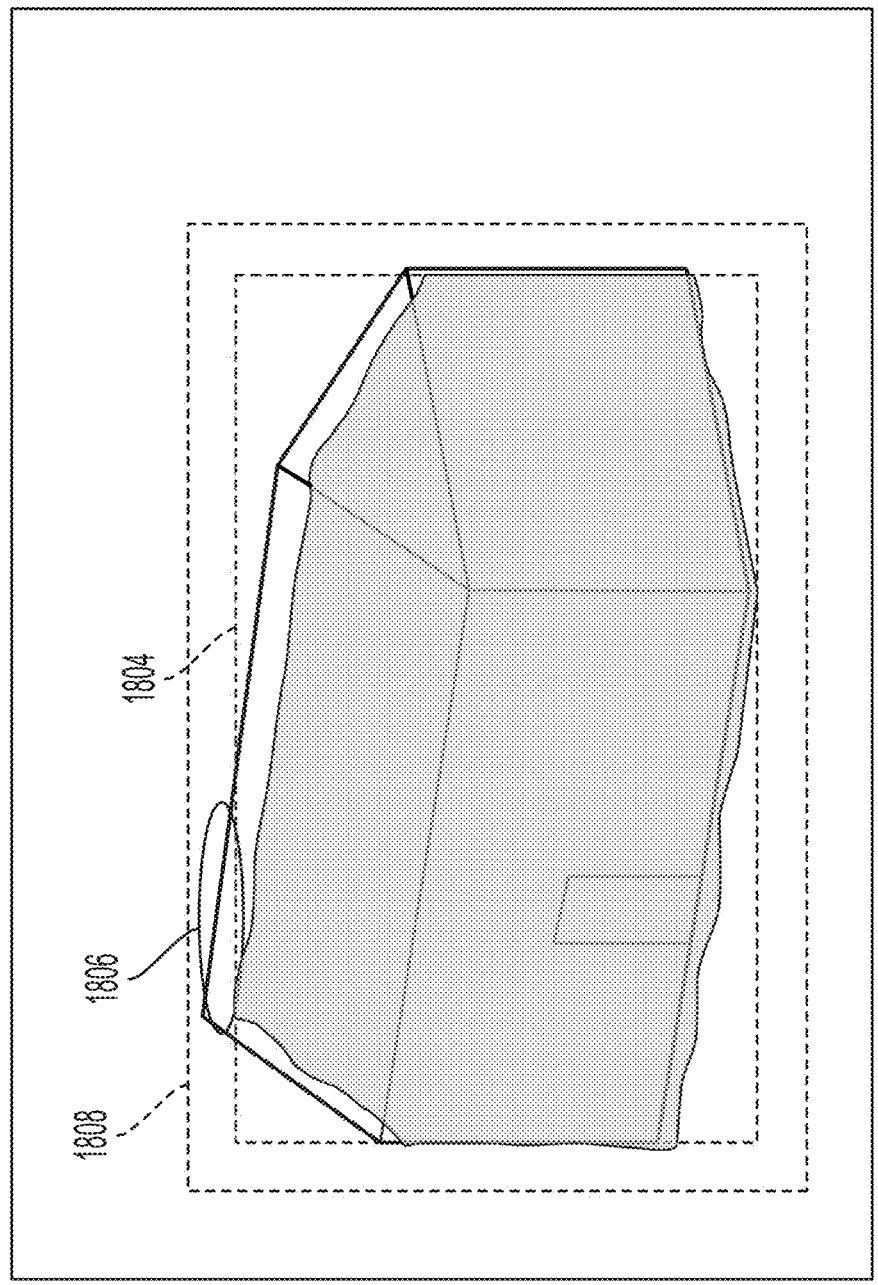

In some embodiments, a bounding box envelope fit to a segmentation mask includes a buffer portion, such that the bounding box does not tangentially touch a segmentation mask pixel. This reduces the impact that a noisy mask may have on accurately fitting a bounding box to the intended structure. FIG. 18E illustrates such a principle. Bounding box envelope 1804 is fit to the segmentation mask pixel contours to minimize the amount of area within that is not a segmented pixel. In doing so, region 1806 of the house is outside the bounding box. Framing optimizations for the entire home may fail in such a scenario: it is possible for region 1806 to be outside of the display, but the bounding box indicates that the subject is properly positioned. To prevent this, an overfit envelope 1808 is fit to the segmentation mask, such that the height and width of the bounding box envelope is larger than the height and width of the segmentation mask to minimize the impact of noise in the mask. In some embodiments, the overfit envelope is ten percent larger than the segmentation mask. In some embodiments the overfit envelope is twenty percent larger than the segmentation mask.

Figure 19:
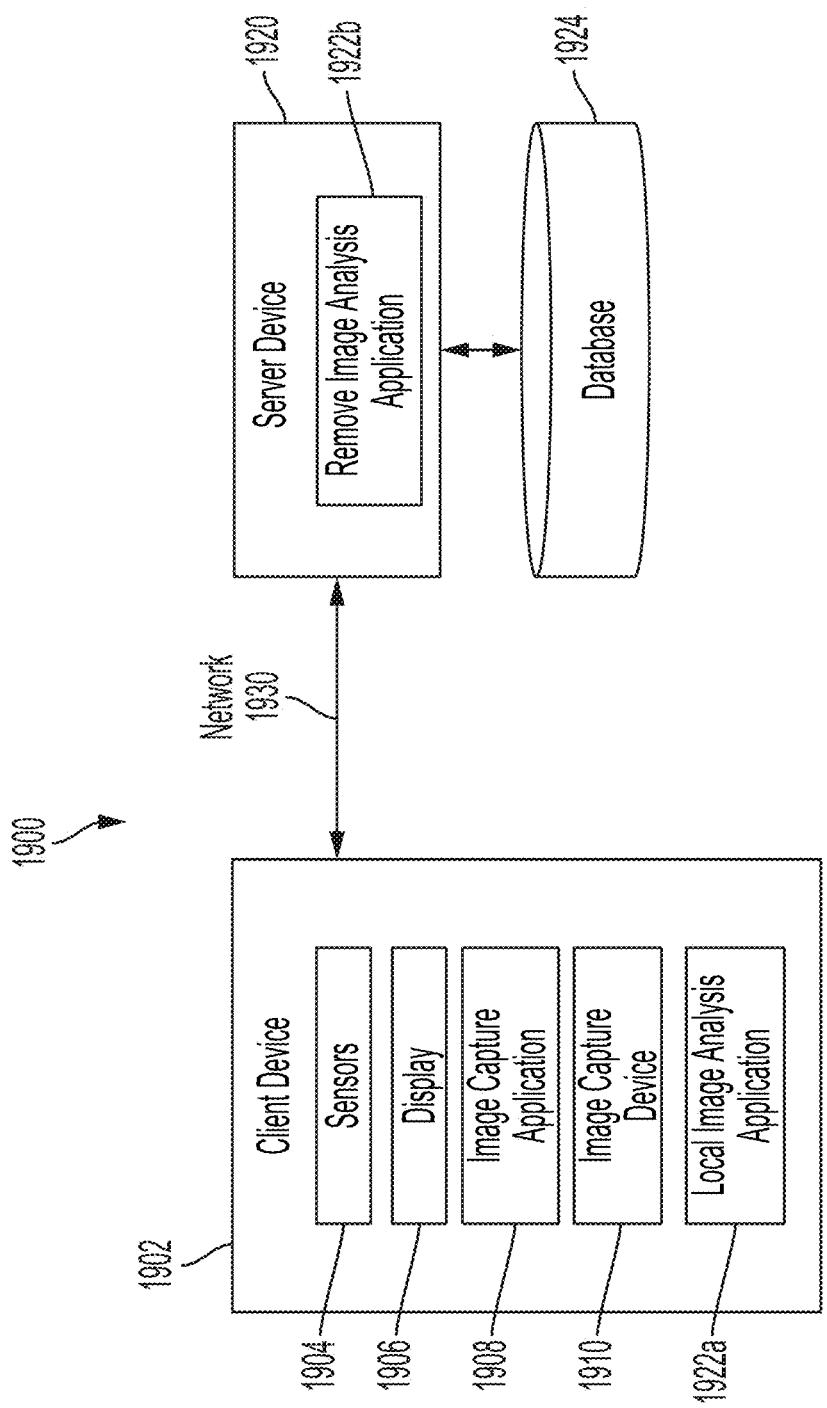
FIG. 19 illustrates an example of a guided image capture system configuration, according to certain aspects of the present disclosure.

FIG. 19 illustrates an example system 1900 for capturing images for use in creating 3D models. System 1900 comprises a client device 1902 and a server device 1920 communicatively coupled via a network 1930. Server device 1920 is also communicatively coupled to a database 1924. Example system 1900 may include other devices, including client devices, server devices, and display devices, according to embodiments. For example, a plurality of client devices may be communicatively coupled to server device 1920. As another example, one or more of the services attributed to server device 1920 herein may run on other server devices that are communicatively coupled to network 1930.

Client device 1902 may be implemented by any type of computing device that is communicatively connected to network 1930. Example implementations of client device 1902 include, but is not limited to, workstations, personal computers, laptops, hand-held computer, wearable computers, cellular or mobile phones, portable digital assistants (PDA), tablet computers, digital cameras, and any other type of computing device. Although a single client device is depicted in FIG. 19, any number of client devices may be present.

In FIG. 19, client device 1902 comprises sensors 1904, display 1906, image capture application 1908, image capture device 1910, and local image analysis application 1922a. Client device 1902 is communicatively coupled to display 1906 for displaying data captured through a lens of image capture device 1910. Display 1906 may be configured to render and display data to be captured by image capture device 1910. Example implementations of a display device include a monitor, a screen, a touch screen, a projector, a light display, a display of a smartphone, tablet computer or mobile device, a television, and etc.

Image capture device 1910 may be any device that can capture or record images and videos. For example, image capture device 1310 may be a built-in camera of client device 1902 or a digital camera communicatively coupled to client device 1902.

According to some embodiments, client device 1902 monitors and receives output generated by sensors 1904. Sensors 1904 may comprise one or more sensors communicatively coupled to client device 1902. Example sensors include, but are not limited to CMOS imaging sensors, accelerometers, altimeters, gyroscopes, magnetometers, temperature sensors, light sensors, and proximity sensors. In an embodiment, one or more sensors of sensor 1904 are sensors relating to the status of client device 1902. For example, an accelerometer may sense whether computing device 1902 is in motion.

One or more sensors of sensors 1904 may be sensors relating to the status of image capture device 1910. For example, a gyroscope may sense whether image capture device 1910 is tilted, or a pixel evaluator indicating the value of pixels in the display at certain locations.

Local image analysis application 1922a comprises modules and instructions for conducting bounding box creation, segmentation mask generation, and pixel evaluation of the subject, bounding box or display boundaries. Local image analysis application 1922a is communicatively coupled to display 1906 to evaluate pixels rendered for projection.

Image capture application 1908 comprises instructions for receiving input from image capture device 1910 and transmitting a captured image to server device 1920. Image capture application 1908 may also provide prompts to the user while the user captures an image or video, and receives data from local image analysis application 1922a or remote image analysis application 1922b. For example, image capture application 1308 may provide an indication on display 1306 of whether a pixel value boundary condition is satisfied based on an output of local image analysis application 1922a. Server device 1920 may perform additional operations upon data received, such as storing in database 1924 or providing post-capture image analysis information back to image capture application 1908.

In some embodiments, local or remote image analysis application 1922a or 1922b are run on Core ML, as provided by iOS or Android equivalents; in some embodiments local or remote image analysis application 1922a or 1922b are run on TensorFlow.

Figure 20:
FIG. 20 illustrates an example of classification data applied to a captured image, according to certain aspects of the present disclosure.

Referring to FIG. 20, an image subject to a directed capture process is shown having undergone additional segmentation classification steps. With the image capture device able to capture more of the subject in a single frame, that single frame enable additional labeling data. In the example shown, second order details such as soffit, fascia and trim of a subject home are identified. Poorly framed images do not provide sufficient input to such classifiers, and limit the scope of information that may be displayed to a user.

Figure 21A:
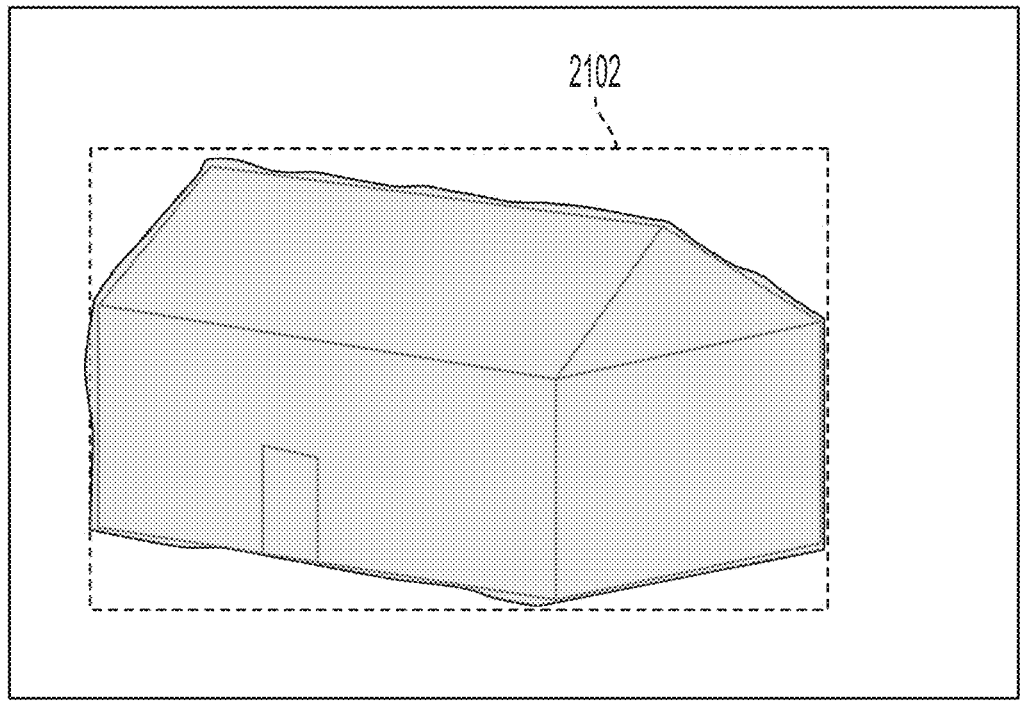
FIGS. 21A-21B illustrate an example of a bounding box envelope changes incident to segmentation mask changes, according to certain aspects of the present disclosure.

FIG. 21A illustrates the bounding box envelope around a segmentation mask as previously displayed in FIG. 18D. The bounding box 2102 is sized such that the segmentation mask fits within its contours. Segmentation is a process of evaluating pixels for association with a particular class. In segmenting images in a camera display, several factors may impact the ability of a classifier to properly segment a pixel; lighting and ambient conditions, contrast within the image, quality of the classifier or the imager and its sensors, computational resources, frame rate, occlusions, and motions of the camera are among the common factors affecting a classifier's ability to segment pixels.

For stationary objects, other factors being equal, pixel variation can largely be attributed to camera motion. For example, a user holding a camera will invariably impart some degree of motion into the camera (no human is rigid). Even in cameras stabilized with tools such as tripods or the like, slight scene motions such as moving leaves near the house or flags waving or the other aforementioned factors will introduce image "noise" in predicting pixel values of stationary objects.

Figure 21B:
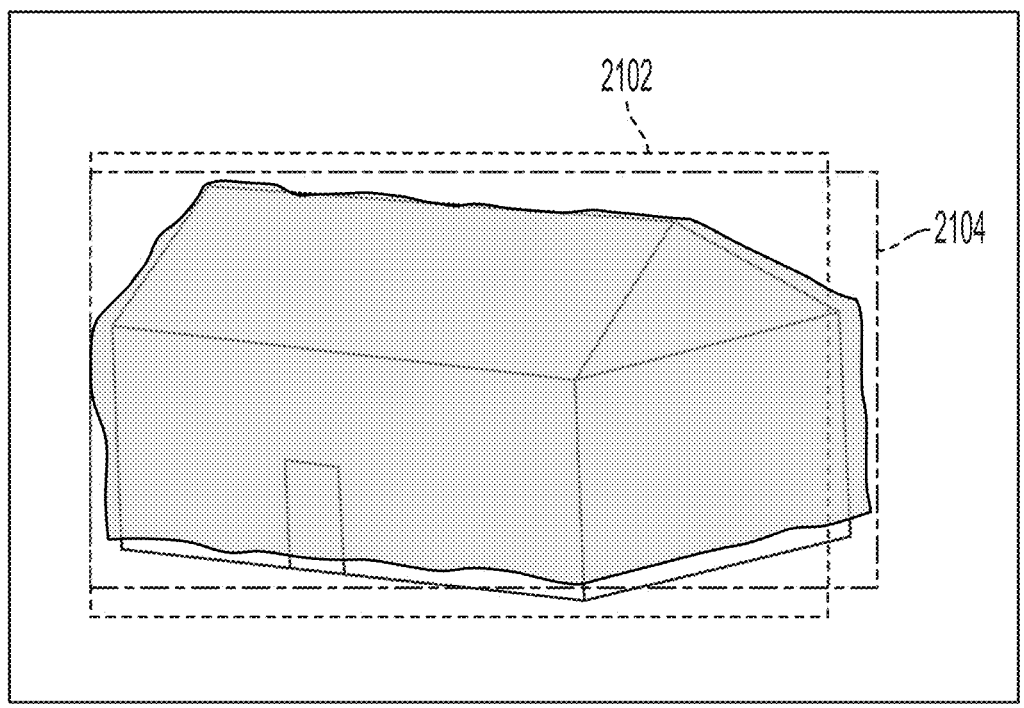
Figure 22:
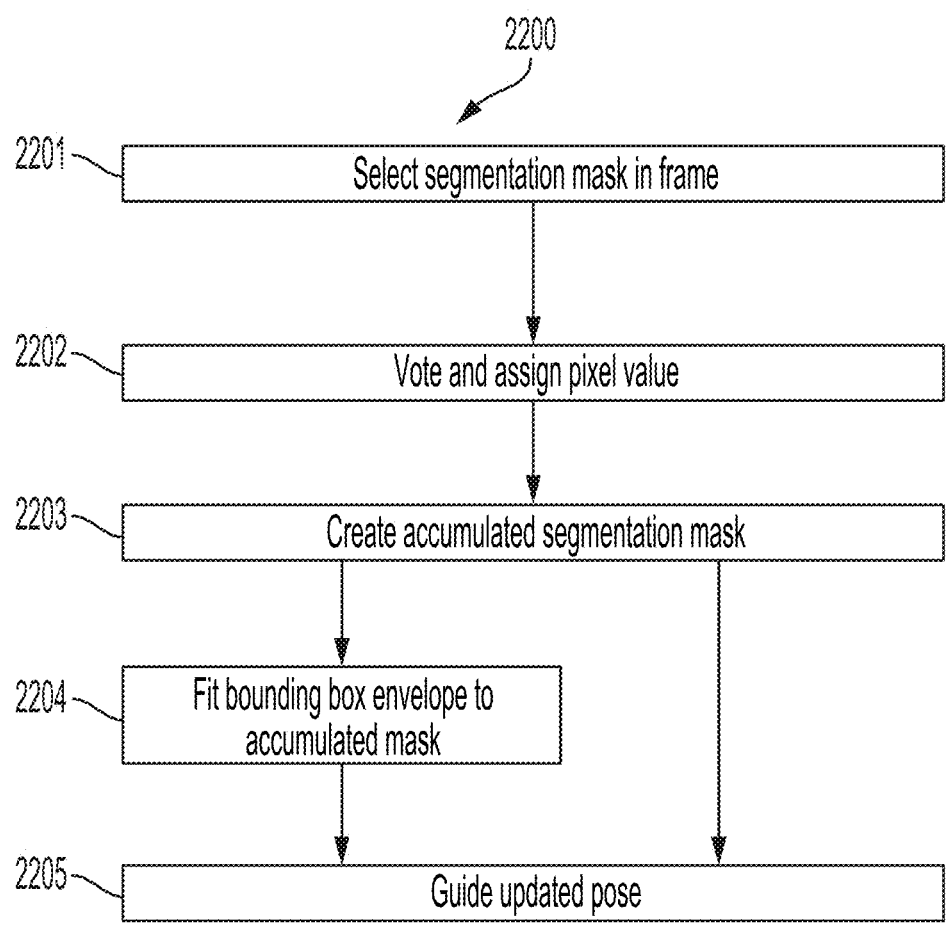
FIG. 22 illustrates an exemplary method for smoothing a segmentation mask for stable bounding box envelope fitting and guiding instructive prompts, according to certain aspects of the present disclosure.

FIG. 21B illustrates such a change in segmentation mask output relative to that in FIG. 21A. In FIG. 21B, whether from camera motion inducing a slight change in the object house's position, scene noise, or model latency, or otherwise, the pixels at the edges of the house silhouette are not perfectly aligned with the pixels of the mask. The model predicts a pixel value inconsistent with the true value in that frame. This results in a new bounding box envelope 2104 for the same object house. If the envelopes 2102 and 2104 are displayed in successive frames, for example, it manifests as "jitter" and may lead to confusion as to whether the bounding box is actually or accurately associated with the house as intended.

In addition to user confusion, erratic pixels or spurious outliers in segmentation mask predictions impose additional computational resources to perform computer vision processes upon; denoising a segmentation mask over a temporal window of frames improves model operation, especially on mobile platforms that typically employ lightweight networks with limited bandwidth.

Further, instruction prompts for improved camera position are diminished with spatially drifting or shape-shifting segmentation masks or bounding boxes fit to those masks. For example, a pixel mis-classification near a display border may prompt an envelope bounding box to extend to the edge of the display, in turn prompting an erroneous instruction to move the camera to accommodate the incorrect boundary. Similarly, as described in relation to FIG. 12 and classified pixels present in embodiments where the bounding box is not the guidance element, erroneously segmented pixels at or near a display border may directly trigger incorrect instructive prompts even without a bounding box. Temporally stable segmentation masks (e.g., smoothed and denoised segmentation masks) and temporally stable bounding box fit for the target object associated with such masks, despite segmentation model noise or user motion are therefore desired.

Method 2200 illustrates an exemplary method for generating a smoothed segmentation mask or bounding box to an object in a camera display over a series of frames, thereby differentiating between segmented pixels that more accurately represent the classified object and those that only reflect spurious or transient segmentation. Though the examples provided are intended for a fixed position object, the techniques are applicable for moving objects (or moving imagers) and specific alternatives for such situations are described when appropriate.

At block 2201, an initial segmentation mask is identified or selected. This may be selection of the only mask in the frame, or selection among several candidate masks.

Figure 23A:
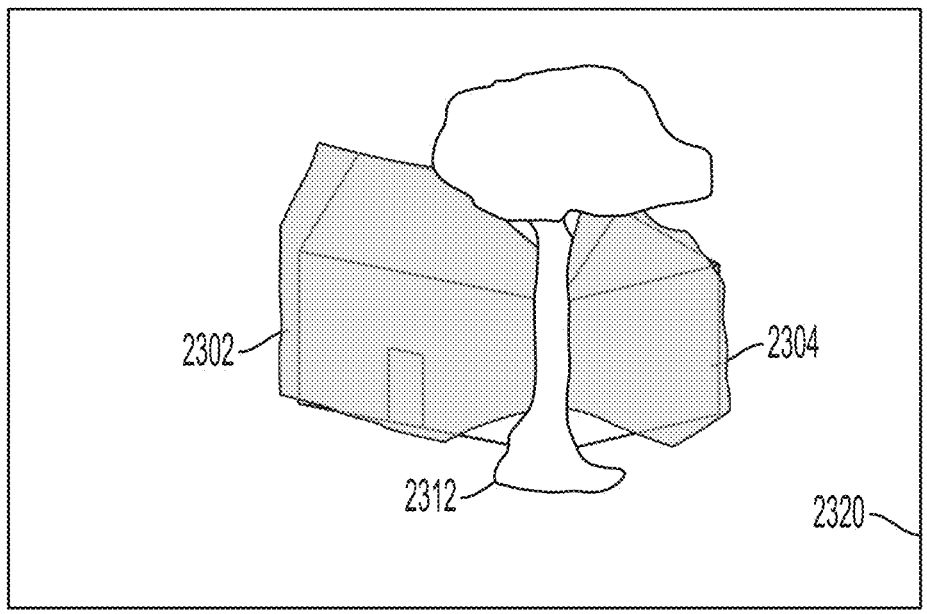
FIGS. 23A-23B illustrate an example of a small neighbor segmentation mask noise, according to certain aspects of the present disclosure.

In some embodiments, selection of a mask is based on position and size in a display. For example, even when there is only a single classified object in a display, a segmentation model can still produce several segmentation masks for that single object, such as from an occluding object dividing the mask into non-contiguous clusters. FIG. 23A illustrates this scenario, with two masks 2302 and 2304 both present for the single house in the frame, divided by occluding object tree 2312. These masks 2302 and 2304 may be referred to as "small neighbor" masks. In some embodiments, at block 2401, the largest segmentation mask among a plurality of small neighbors in the frame is selected. In some embodiments, the segmentation mask with a centroid closest to the center of the display is selected. Referring to FIG. 23A, neighbor mask 2302 is likely to be selected as the initial segmentation mask as its pixel area is larger compared to neighbor mask 2304, and its centroid is closer to the center of display 2320.

Figure 23B:
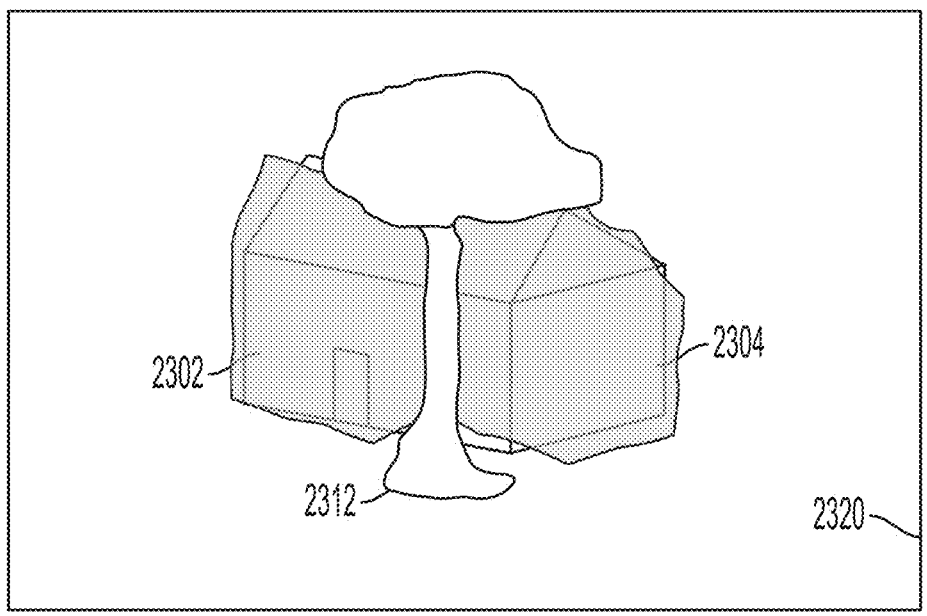

In some embodiments, selection of a mask is based on data from a previous frame. A segmentation mask, even a smallest neighbor mask, is selected based on presence or persistence frame-to-frame. In FIG. 23B, the image and camera display 2320 are in a subsequent position relative to that of FIG. 23A, producing a new perspective on the same scene due to the new pose. In FIG. 23B, occluding object 2312 still divides the house's segmentation into two neighbor masks, but now mask 2304 is larger and has a centroid closer to the center of display 2320. In some embodiments, the past historical prevalence of mask 2302, such as depicted in the hypothetical frame of FIG. 23A, will lead to its selection at block 2201 despite the instant frame prominence of mask 2304.

In some embodiments, relative position to other masks in a frame is used to identify relevant masks for selection in later frames. For example, mask 2302 falls on the left of mask 2304 within the display of FIGS. 23A and 23B. Relative position over frames indicates which frame to select; for example if mask 2302 is the dominant mask in FIG. 23A and falls on the left of mask 2304, then selection of a mask in a subsequent frame will automatically select the mask to the left of mask 2304

In some embodiments, shape consistency over frames is used to select masks in a frame. Classified objects can be predicted to have a certain silhouette; a segmentation mask for a car is unlikely to resemble a segmentation mask for a house. The system can pre-store expected mask shapes and select the mask, such as by a least squares error minimization, in a frame that most closely resembles that expected mask. In some embodiments, a mask shape that persists over multiple frames (does not change or wobble) is selected over masks that deform over a series of frames.

In some embodiments, mask selection is based on accumulated or prior frame persistence. For example, a mask in the frame at $t_0$ that is similarly in the display frames at $t_1$ and $t_2$ may be favored over masks present in the frame only at $t_2$.

It should be noted that the term "mask" may apply to an entire segmentation for a classified object (i.e. a cluster or group of pixels for that classification) or a single segmented pixel.

Figure 26:
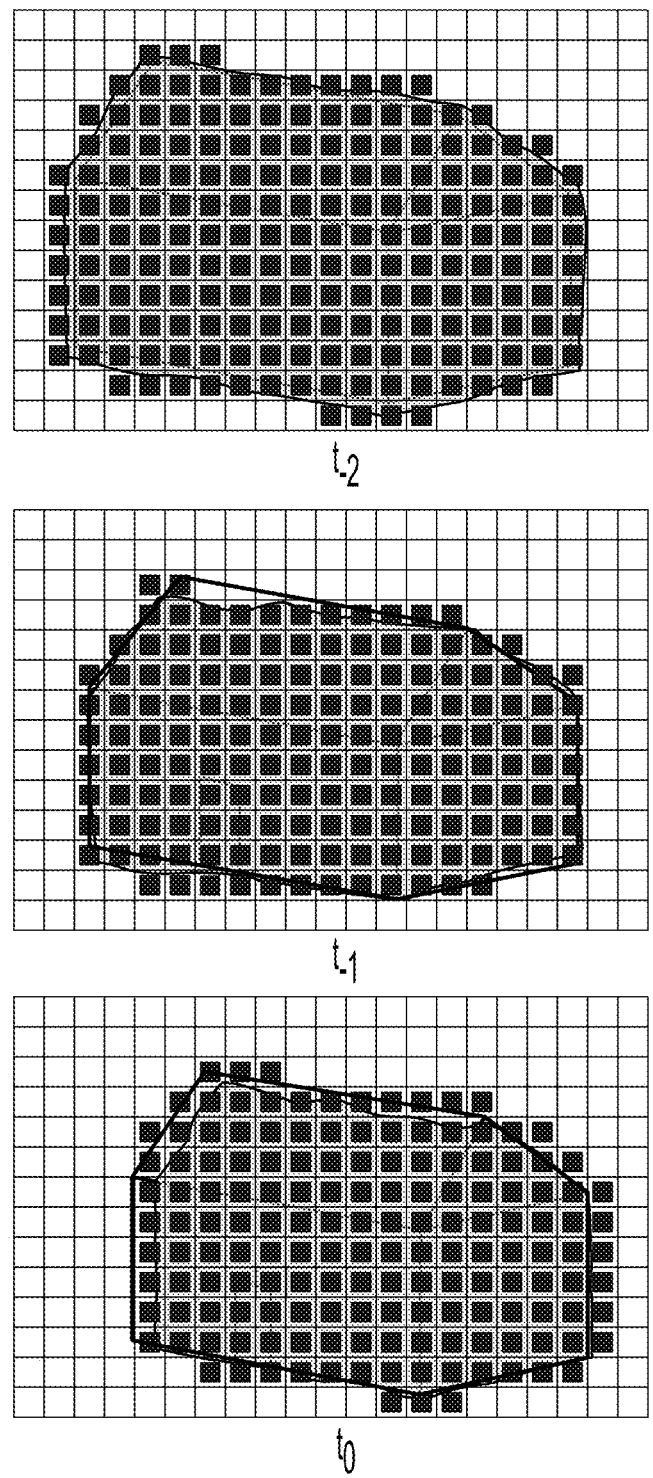
FIG. 26 illustrates an example of display pixel voting, according to certain aspects of the present disclosure.

At block 2202, display pixels are voted. Pixel voting discerns whether a display's pixel comprises a segmentation mask value or not. FIG. 26 illustrates pixel voting, using exaggerated pixel size for ease of illustration, to show designation of pixels comprising a segmentation mask for an underlying object house over a series of frames.

Stationary objects are stable, or can be assumed to be stable, over a period of frames; as a camera changes position, it is unlikely that the stationary object is in a different position of a display for reasons other than camera motion. The most recent frame, then, is more likely to represent a stationary object's presence and continued presence. In some embodiments, the pixel vote of more recent frames is weighted higher than a previous frame's pixel voted value. By contrast, for moving objects in a display, frame temporal relevance is reduced; an object is not as likely to persist in a same location in a subsequent frame and may be as likely to move to a new position, such as one in a previous frame. A bounding box to predict the presence of a dynamic object over a series of frames should be larger, or at least have a stronger association to past positions and past frames in voting or predicting current pixel relevance.

In some embodiments, however, camera motion may not simply be implied or incidental by natural human unsteadiness. Drone-acquired or aerial imagery necessarily assumes a camera is in motion during a capture session. Though a target object is still stationary, the relative motion of the camera imparts the effect on a stationary object as a moving object would have on a stationary imager. In such embodiments, the pixel vote values are not weighted to give a mask value of any particular frame any greater vote relevance.

Figure 24A:
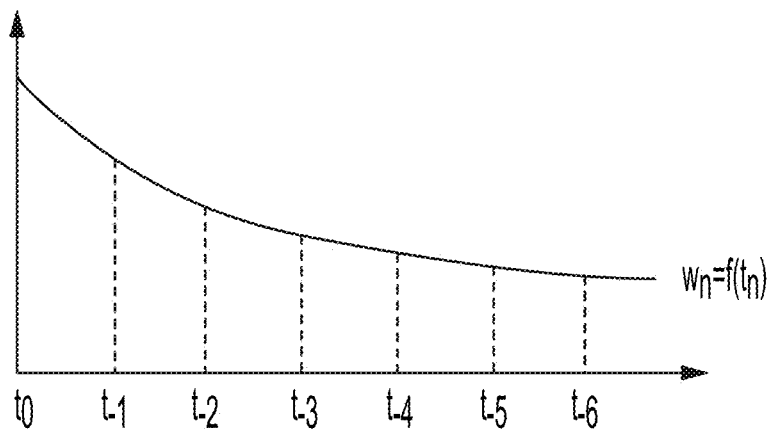
FIGS. 24A-24B illustrate examples of functions for weighted pixel voting values, according to certain aspects of the present disclosure.

To adequately reflect the spatial-temporal relationship for an object over time, pixel voting weights are applied, in some embodiments, on frame relationship. FIG. 24A illustrates a weighting relation based on frame time, wherein the pixel values of more recent frames (e.g. $t_0$ or $t_{-1}$) are weighted higher relative to earlier frame (e.g. $t_{-6}$ or $t_{-5}$). As depicted, the more recent frames are closer to the axis, and older frames extend along the x axis.

Figure 24B:
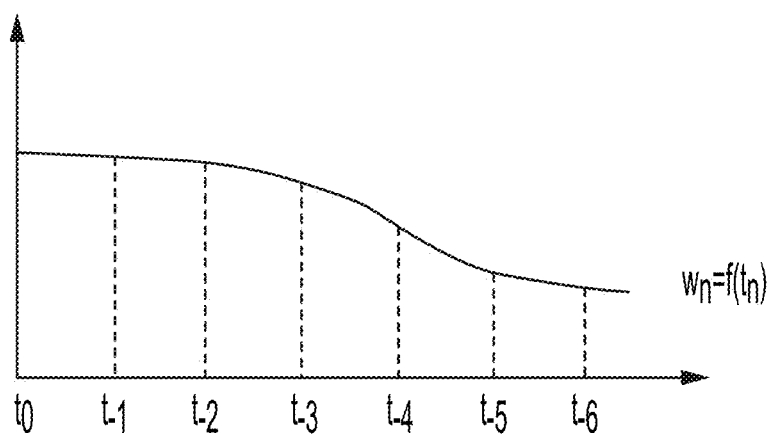

Stationary objects captured by handheld cameras, such as deployed on smart phones, may utilize the non-linear decay-type functional relationship of FIG. 24A. Dynamic object voting, such as for moving objects or moving imagers may rely on no weighted voting or variable weighted voting such that all frames are valued equally, or give recent frames equal voting wait as a current frame. FIG. 24B illustrates such a possible weighting relationship for pixels in masks with anticipated motion. In some embodiments, weighting function selection is based on imager motion. For example, if a camera's accelerometers or positional sensors otherwise are relatively steady over a number of frames then the function of FIG. 24A is applied, whereas if the camera begins to move pixel vote weighting may shift to the function of FIG. 24B for those frames capturing masks concurrent with such motion.

In some embodiments, changes in position of segmented pixels in previous frames are used predict a new position for segmented pixels in subsequent frames. For example, a Kalman filter may track previously the segmented pixels across a series of frames and anticipate where segmented pixels will appear in a current or subsequent frame. A predicted pixel may be given a certain weight on its own, even if the pixel is not segmented at that position in an instant frame.

In some embodiments, only those pixels within a certain range of the previous frame's segmented pixels or bounding box envelope are evaluated and voted on. As stated previously, motions of the imager or noise input to the model's may produce outlier pixels; to limit the number of outliers, only pixels within a pixel drift limit are evaluated. In some embodiments, the pixel drift limit is a threshold tolerance of 5 pixels around the previous frame's segmentation mask. In some embodiments, the pixel drift limit is a threshold tolerance of 10 pixels around the previous frame's segmentation mask. In some embodiments, the pixel drift limit is a threshold tolerance of 15 pixels around the previous frame's segmentation mask. In some embodiments, the pixel drift limit is a threshold tolerance of 100 pixels around the previous frame's segmentation mask.

At 2203, an accumulated pixel segmentation mask is created. In some embodiments, the accumulated pixel segmentation mask is a mask comprising pixels that satisfy a value condition; such conditions may be pixel drift tolerance, aggregated voting, weighted aggregated voting, or gradient change filtering.

In some embodiments, a system operating the steps of method 2200 collects the segmentation masks over the temporal period (e.g. $t_{-2}$, $t_{-1}$, $t_0$) in a circular queue of timestamped masks, and each successive mask is aggregated with preceding ones in the queue, such that each voted pixel is aggregated into a common mask. In some embodiments, a prior frame dilation area constrains the candidate pixels in the accumulated mask. A prior frame dilation area is a region surrounding the pixels of a prior accumulated mask that is larger in area but co-centered with the prior accumulated mask. Pixels in a successive accumulated mask that fall outside of the prior frame dilation area are removed from the successive accumulated mask. In some embodiments, the size of the prior frame dilation area is based on temporal relation or frame rate between frames, such as increased temporal difference between frames of accumulated masks lends to larger prior frame dilations areas. In some embodiments, each successive frame extends the prior frame dilation area by a single pixel outward from the contour of the prior accumulated mask. In some embodiments, the prior frame dilation area is a bounding box envelope or convex hull fit to the prior frame mask.

At block 2204, a bounding box envelope is fit to the accumulated mask. Because this envelope bounding box is based on accumulated pixel values and not merely the segmentation mask of the instant frame, it is more likely to be temporally stable around the target of interest, even given imager position changes in subsequent frames.

FIGS. 25-30 illustrate an embodiment for building and applying an accumulated mask; while ultimately illustrating weighted voting, the figures merely provide a non-limiting example for creating and applying an accumulated mask.

Figure 25:
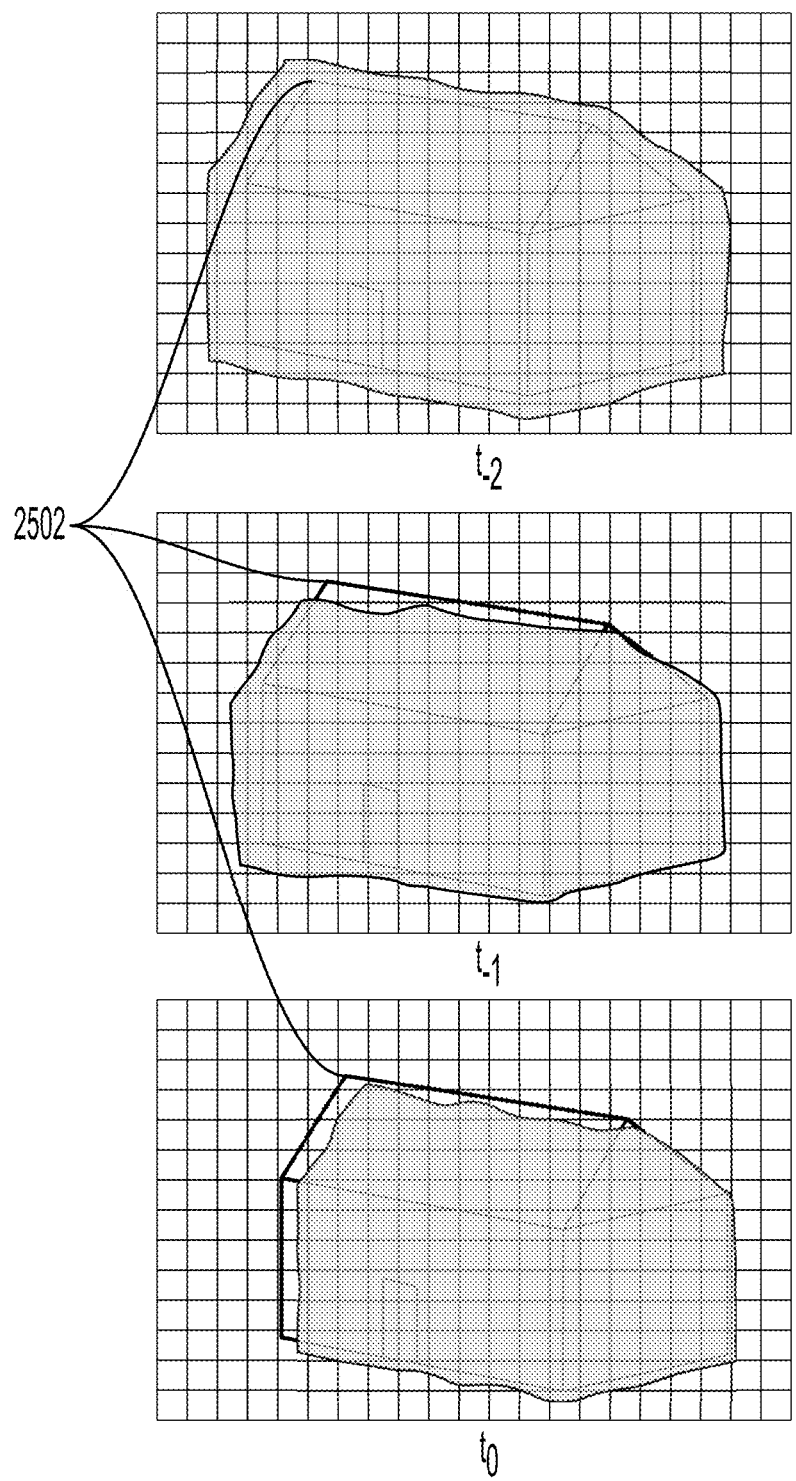
FIG. 25 illustrates an example of segmentation mask noise, according to certain aspects of the present disclosure.

FIG. 25 illustrates a series of frames from $t_{-2}$ to $t_0$, each frame comprising a target object home in a display and an applied segmentation mask (represented by the grayscale overlay) for that classified object in the image. As illustrated, the target object moves slightly within the frame, such as by imager motion, as evidenced by the position change of apex point 2502 in each frame. Additionally, the segmentation mask variably identifies a target object pixel due to non-limiting classification error factors, especially at the object boundaries, such that over time the mask deforms relative to its shape in other frames and appears noisy even in a single frame.

In FIG. 26, the segmented pixels within the display (with exaggerated pixel size for ease of illustration) are identified or voted as denoted with the black box present in each exaggerated pixel for those pixels occupied by a segmented pixel for the target object class.

Figure 27:
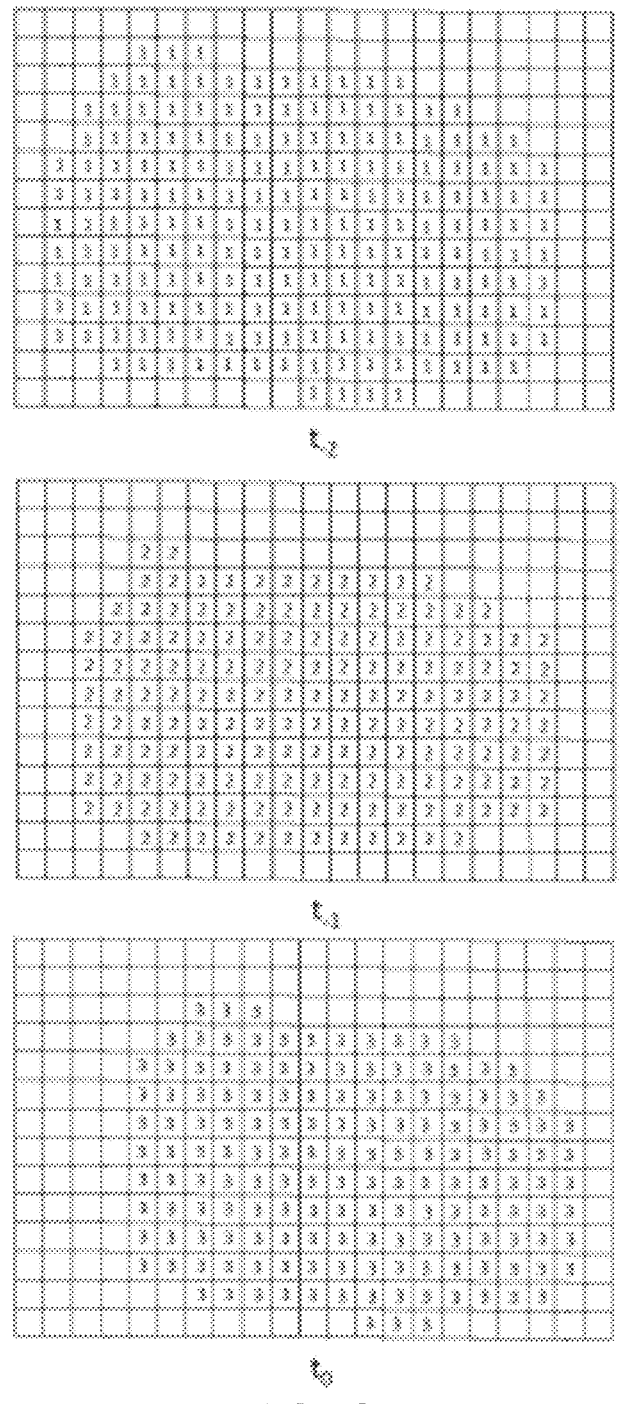
FIG. 27 illustrates an example of pixel weighting, according to certain aspects of the present disclosure.

FIG. 27 illustrates weighting the voted pixels of FIG. 26 according to temporal frame relationship; for ease of illustration a simple weighting is applied for a linear decay of previous frames values. In other words, each voted pixel is weighted one less for each prior frame (or alternatively, each new frame adds a value of one to a voted pixel). Alternative weighting schemes are discussed in FIGS. 24A and 24B.

FIG. 28A illustrates an accumulated segmentation mask. As depicted, the accumulated mask of FIG. 28A is a summation of the weighted values of the voted pixels of the frames in FIG. 29. It will be appreciated that different weighting schemes or voting techniques may produce a different accumulated mask. In some embodiments, the accumulated mask is further refined to reinforce the weighted values. For example, pixels with a weight value below a certain validation or threshold value are removed from the mask. In some embodiments, the threshold pixel value for an accumulated mask is a median value; in some embodiments the threshold pixel value is a simple average value, and in some embodiments the threshold pixel value is a weighted average. A series of potential threshold values are shown in FIG. 28B. It will be appreciated that higher threshold values may increase bounding box jitter as new frames continually must adjust to the most recent pixel value that is more likely to reflect the higher threshold value, and that lower threshold values are more likely to produce stable bounding box envelopes even if such bounding box is more likely to contain pixels that do not belong to the classification in the most current frame. A preferred embodiment of the techniques disclosed herein is the weighted average value.

In some embodiments, a gradient value between pixels is determined and lower-value pixels on the border of large gradient differences are removed from the mask. A large gradient difference may be calculated as a value between the largest and smallest pixel weighted value. Referring again to FIG. 28A, with a highest weighted pixel value of 5 in the accumulated mask and a lowest value of 1, a gradient value related to these values may be applied. For example, using the simple average value of 3 in the accumulated mask of FIG. 28A, when neighboring pixels change value more than 3, the lower value pixel between the two is removed from the mask. Combinations of the above mentioned refinement methods may be applied as well, such as a first filter using gradient elimination and then threshold value filtering.

In some embodiments, stray pixels or small clusters of pixels may be segmented; an accumulated mask may filter out such isolated pixels or clusters, even if those persist over several frames, to reduce noise in the accumulated mask. Filtering may be based on pixel area or proximity; for example a cluster of five isolated pixels in the accumulated mask may be discarded or pixels more than a threshold distance from the majority of pixels in the accumulated mask are discarded. Thresholds for pixel filtering based on size may be based on relative pixel areas of the accumulated mask; in some embodiments pixels or clusters less than five percent of the primary mask pixel count are discarded, in some embodiments pixels or clusters less than ten percent of the primary mask pixel count are discarded. In some embodiments isolated pixels located more than ten percent in pixel length of the primary mask pixel length in that direction (e.g. x-axis or y-axis) are discarded from the accumulated mask. A primary mask may be understood as the mask with the highest number of contiguous pixels in the segmented class.

Figure 29:
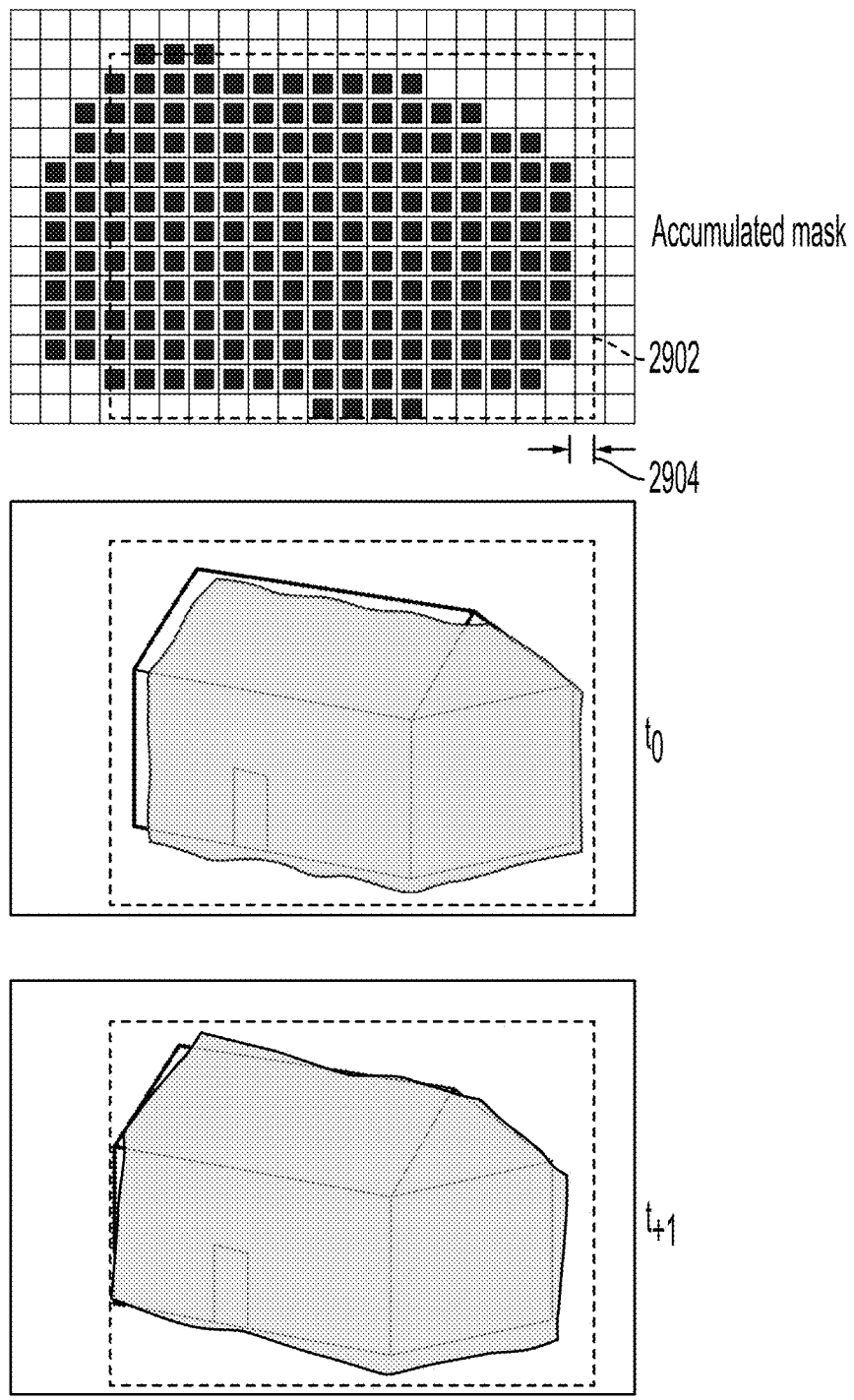
FIG. 29 illustrates an example of accumulated mask rendering and bounding box envelope fitting, according to certain aspects of the present disclosure.

FIG. 29 illustrates an accumulated mask based on weighted average pixel threshold value of FIGS. 28A and 28B. Bounding box envelope 2902 is applied around the accumulated mask; in some embodiments, a buffer portion 2904 is further applied to set the bounding box envelope further out from the pixels comprising the accumulated mask. When bounding box envelope 2902 is applied to the target object and its segmentation mask (exaggerated pixel boundary lines removed for clarity, but scale otherwise equal to that as initially presented in FIG. 25), the bounding box envelope comprises more true pixels of the target object than the associated segmentation mask would otherwise impart. Additionally, using the same bounding box envelope 2902 in a subsequent frame at $t_{+1}$ where the house has again slightly moved within the display and the segmentation mask again has also slightly shifted, the stability of bounding box envelope 2902 is still able to encompass the target house and its pixels without moving position or adjusting in size. It will be appreciated that the change in pixel inputs at $t_{+1}$ will update the values for a new accumulated mask, and it is possible that bounding box envelope generation will adjust for successive frames $t_{+2}$ and onwards.

In some embodiments, active guidance to prompt camera pose changes is performed in parallel to block 2204. Block 2205 may be performed directly from the accumulated mask, or after a bounding box envelope is fit to the accumulated mask. If the accumulated mask comprises segmentation pixels at the display border, instructive prompts may appear on the display in accordance with the techniques described throughout this disclosure. In some embodiments, guidance prompts to adjust a camera position are displayed only if a boundary condition (bounding box envelope or segmentation mask pixel) extends to or beyond the display boundary longer than a timing window. In some embodiments the timing window is one second, in some embodiments the timing window is two seconds; in some embodiments the timing window is an exponential value based on the number of frames used to generate the accumulated mask. This prevents the guidance feedback from issuing constant alerts.

In some embodiments, the guidance provided is that the object is well framed; the lack of instructive prompts may therefore be active guidance itself.

Figure 30:
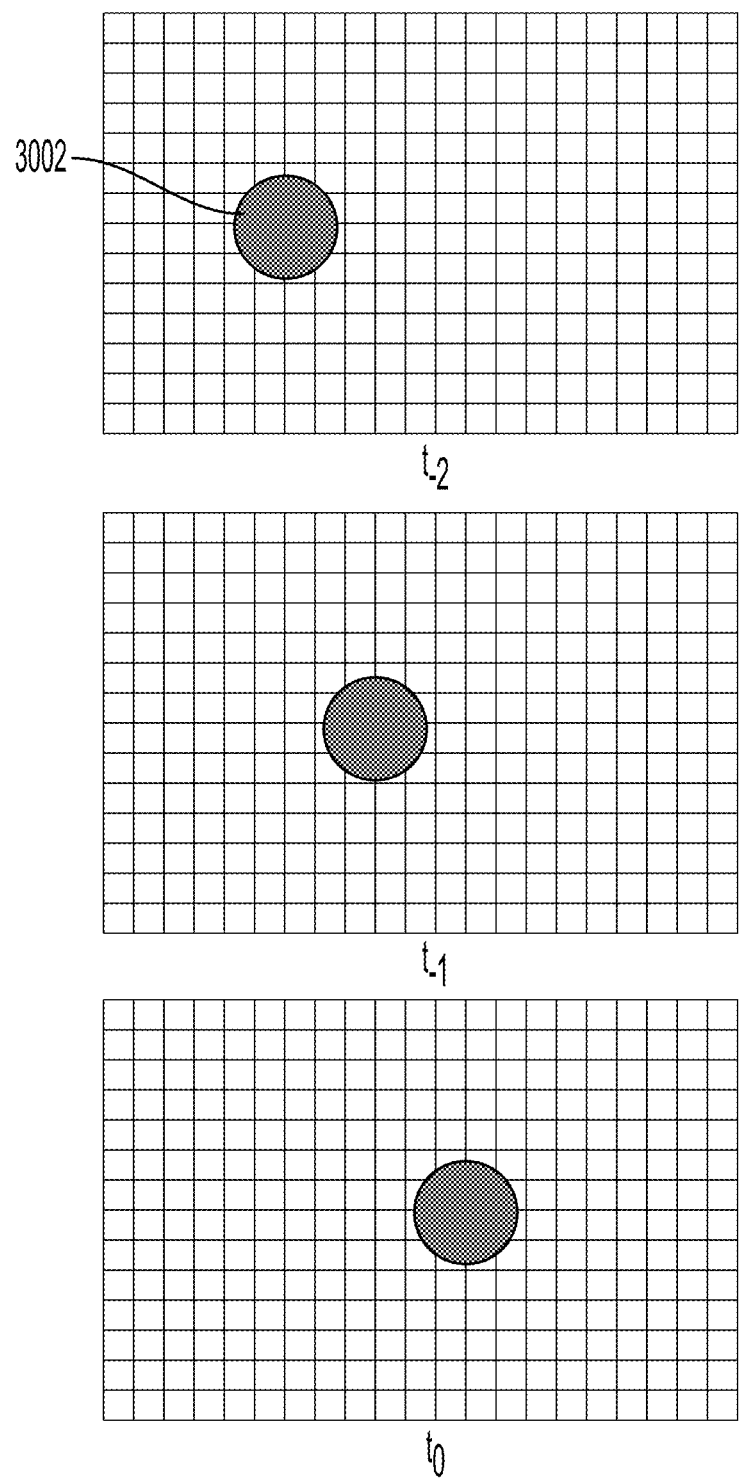
Figure 31:
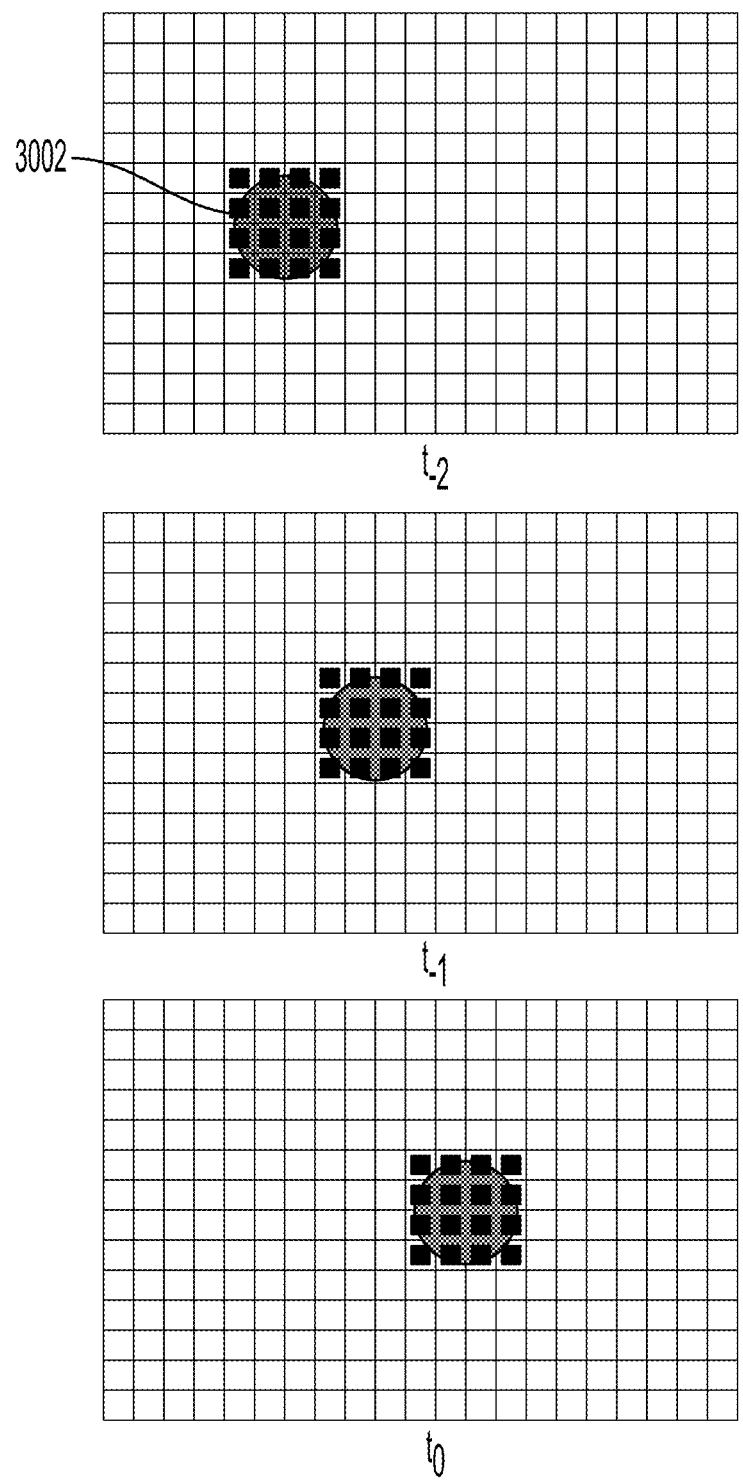
Figure 32:
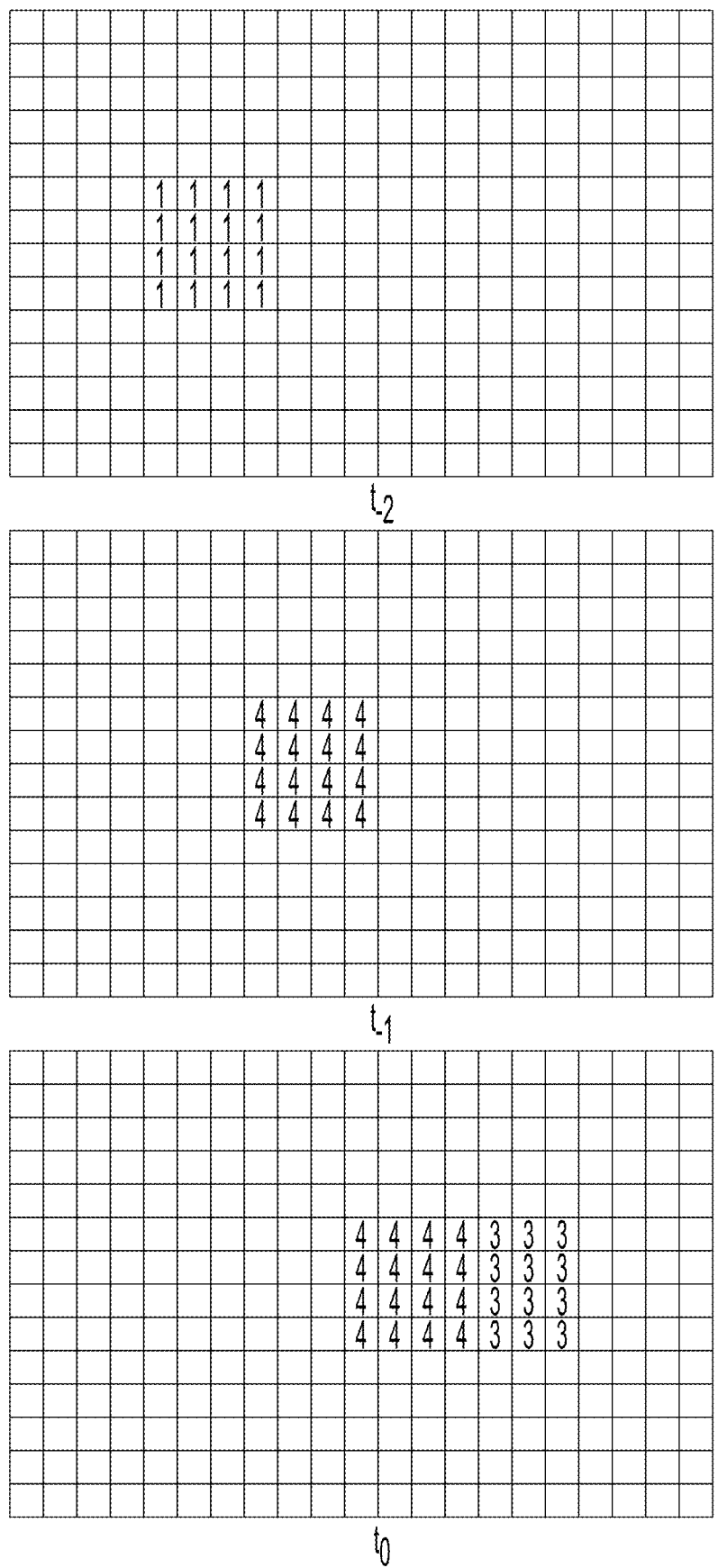

FIG. 30 illustrates the techniques of method 2200 applied to a moving object or moving imager, using a simple shape. Detection that an object is in motion may come from iOS Vision Framework or similar feature tracker. In FIG. 30, object 3002 appears in the display over a plurality of timestamped frames $t_{-2}$, $t_{-1}$ and $t_0$. In FIG. 31 the pixels comprising the object are voted, and a dynamic weighting shown in FIG. 32 using a decay function similar to that in FIG. 24B wherein a prior frame carries similar voting weight as a current frame (i.e. frame $t_{-1}$ is weighted equally as $t_0$ with $t_{-2}$ weighted less than either). Also illustrated in FIG. 32 is predicted weighted vote positions (predicted pixels are weighted value 3, whereas segmented pixels are weighted value 4). Predicted pixel values in an instant frame for future frame value may be determined from pattern recognition or predictive filters otherwise. In some embodiments, the predicted pixel vote values for a subsequent frame are determined in a current frame (as is depicted in FIG. 32 at $t_0$); in some embodiments, the predicted pixel vote for a subsequent frame are applied to an accumulated mask.

Figure 34:
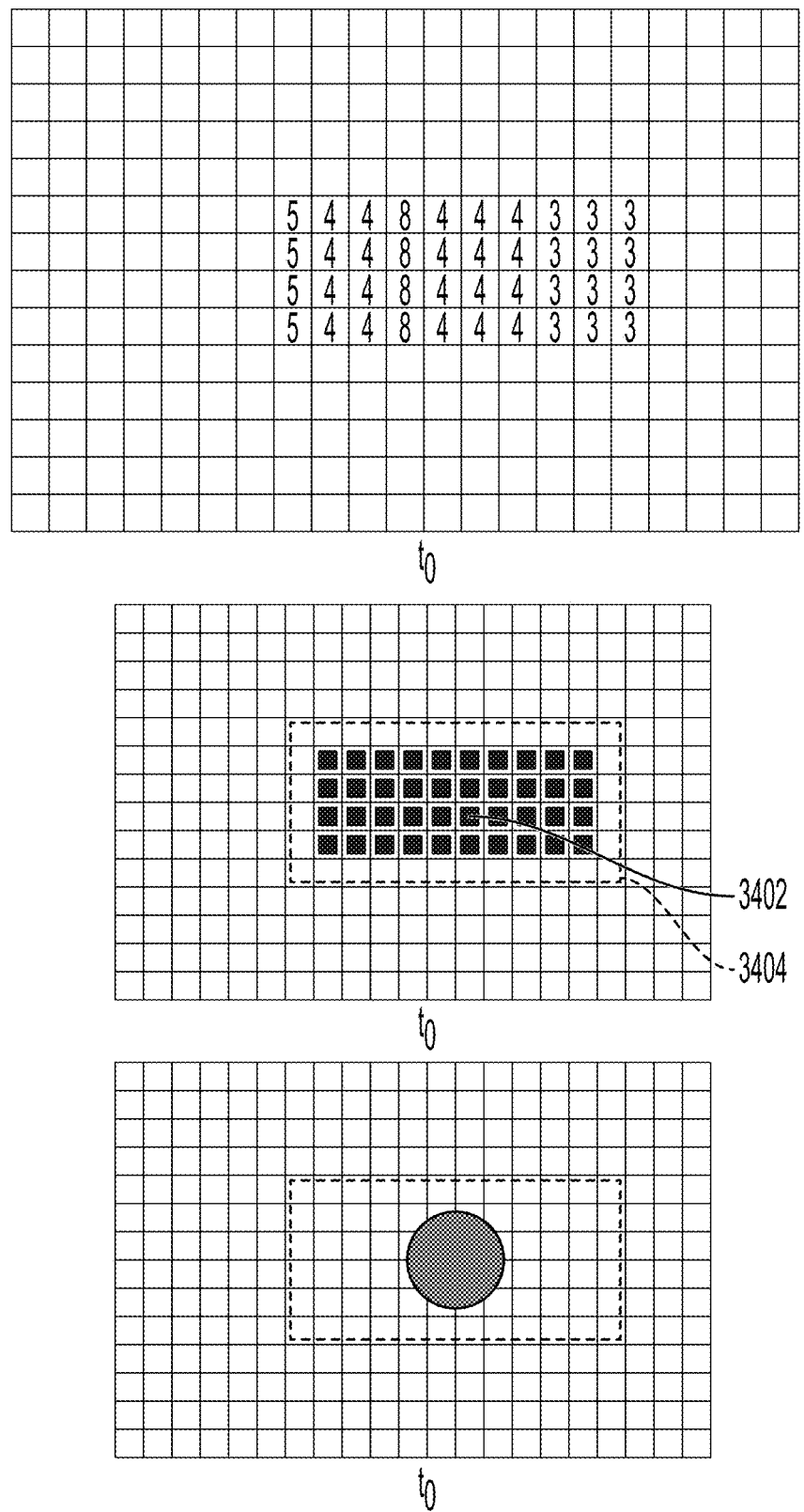

FIG. 33 illustrates aggregated pixel vote values based on the weighted values of FIG. 32, and associated table for various threshold values. FIG. 34 illustrates a filtered aggregated mask, based on a filter using a weighted value threshold of 3 (simply by way of example, and from the table of FIG. 33), with resultant accumulated mask 3402 shown by the array of exaggerated pixels and bounding box envelope 3404 as the dashed line with buffer fit around the accumulated mask. Lastly, object 3002 at frame $t_0$ is depicted with bounding box envelope 3404 fit to it.

Mobile imager platforms, such as a drone equipped with camera(s), may further navigate in response to such envelope positioning or guidance corrections. For example, the length of envelope 3404 relative to that of object 3402, or proximity of an edge of envelope 3404 to a display edge may prompt a change in focal length. Additionally, whereas the display inputs provide two-dimensional analysis, mobile imagers are permitted more degrees of freedom. Navigation or flight path changes to place an axis of the envelope or direction of the object's movement parallel with the drone imager's optical axis, rather than orthogonal to, may provide improved image capture. In other words, the instructive prompt may not only be feedback on quality of framing of an object in the display or corrections for a subsequent frame, but updated three dimensional navigation intermediate to a subsequent frame. Navigation changes may include increasing the distance from the object in a single degree of freedom (e.g. flying at a higher altitude) or adjusting position according to multiple degrees of freedom (e.g. adjusting an angular position to the object).

Figure 35:
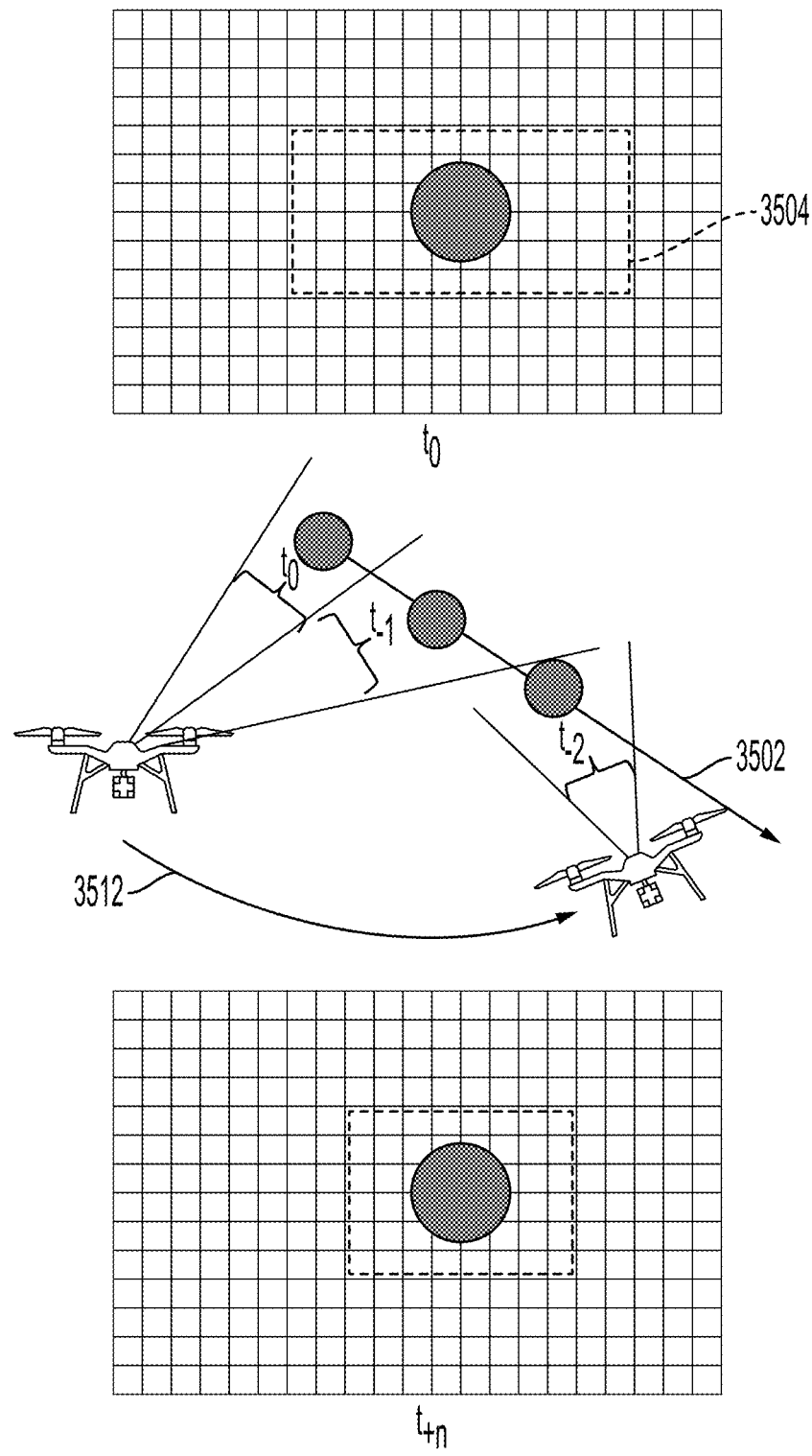

FIG. 35 illustrates an example navigation update to a drone platform. Using the bounding box envelope from FIG. 34, using frame of the imager at $t_{-1}$ and $t_0$, a trajectory of object 3002 may be extracted in the linear direction of the long axis of envelope 3404. The trajectory may be predicted as path 3502 and instructions to position the imager in 3D space by transformation 3512 places the drone in position to capture the object such that trajectory 3502 is more directly in line with the drone optical axis at the transformed position. Such change leads to fewer translation changes of the object 3002 in the display of the drone, thereby tightening the bounding box envelope at shown at $t_{+n}$, a subsequent frame. As the envelope tightens, camera focal length, or the drone's proximity to the target may similarly change to acquire a better quality image (rather than a further away image to ensure incident motion would not place the object out of a following frame).

Figure 36:
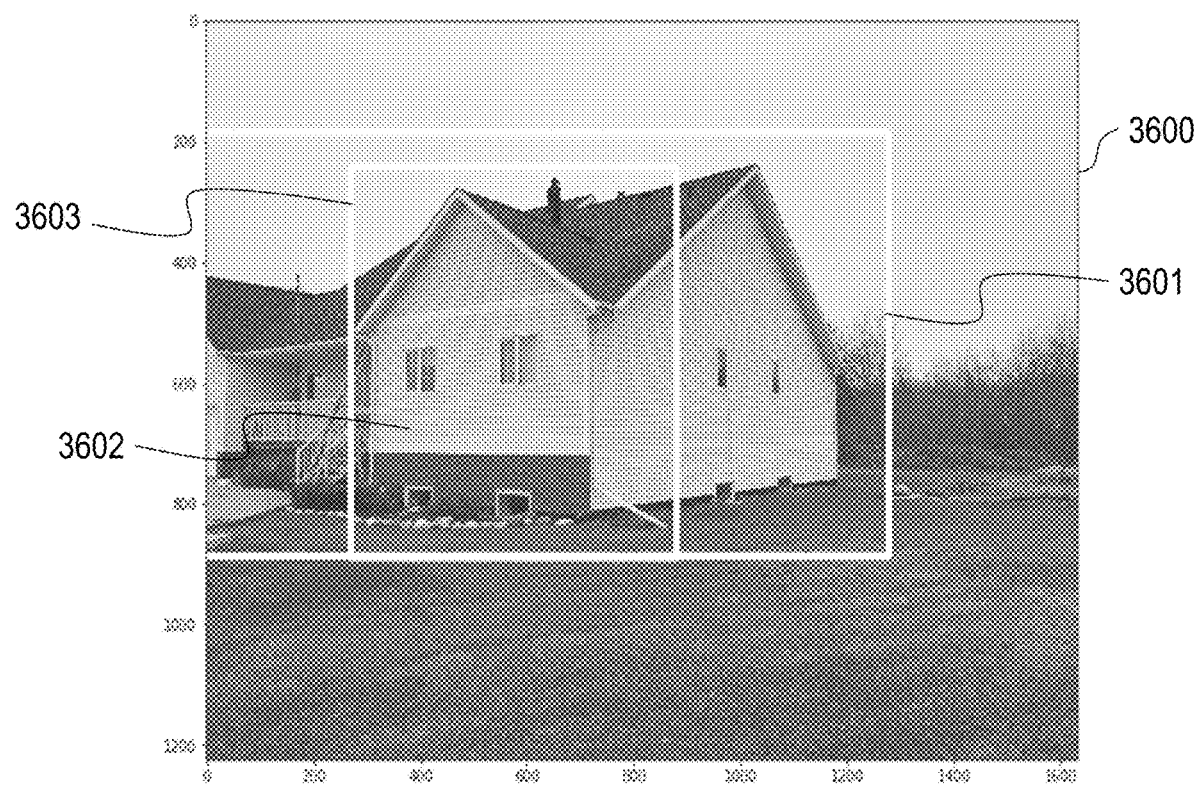
FIG. 36 illustrates multichannel bounding boxes, according to certain aspects of the present disclosure.

FIG. 36 illustrates frame 3600 with portions of house 3602 outside the display borders. As discussed above, a segmentation mask applied to identify pixels associated with house 3602, or bounding box 3601 to envelop such segmentation mask or house 3602 otherwise, would abut the left boundary of frame 3600. This single channel segmentation bounding, single channel meaning applying to a single classification target like house 3602 in FIG. 36, and the display boundary limitations introduced could be addressed using the techniques as described above. In some situations, however, such active guidance to perfectly frame a subject in a display is not possible. Occluding objects, or small distances between the imaging device and the subject (for example, caused by houses that closely border lot lines) may prevent the user from adjusting the imaging device pose to place the entire subject or its bounding box within the field of view.

Subcomponents or subfeatures of a subject may nonetheless fit within a display's limit, such that an image frame would encompass the entirety of such sub-elements; capture of these sub-elements can provide useful information about the subject. Geometric features, three-dimensional data indicative of feature depth, or lines associated with vanishing points can all provide useful information of the overall subject they are associated with, and may be captured in an image frame without the entire subject in said frame. In some implementations, a bounding box, such as 3603 in FIG. 36 can be fit to such a sub-structure of the overall target (e.g., a gable as depicted). Active guidance as described throughout this disclosure may then be applied to this bounding box as necessary for proper framing of the sub-structure within.

Figure 37:
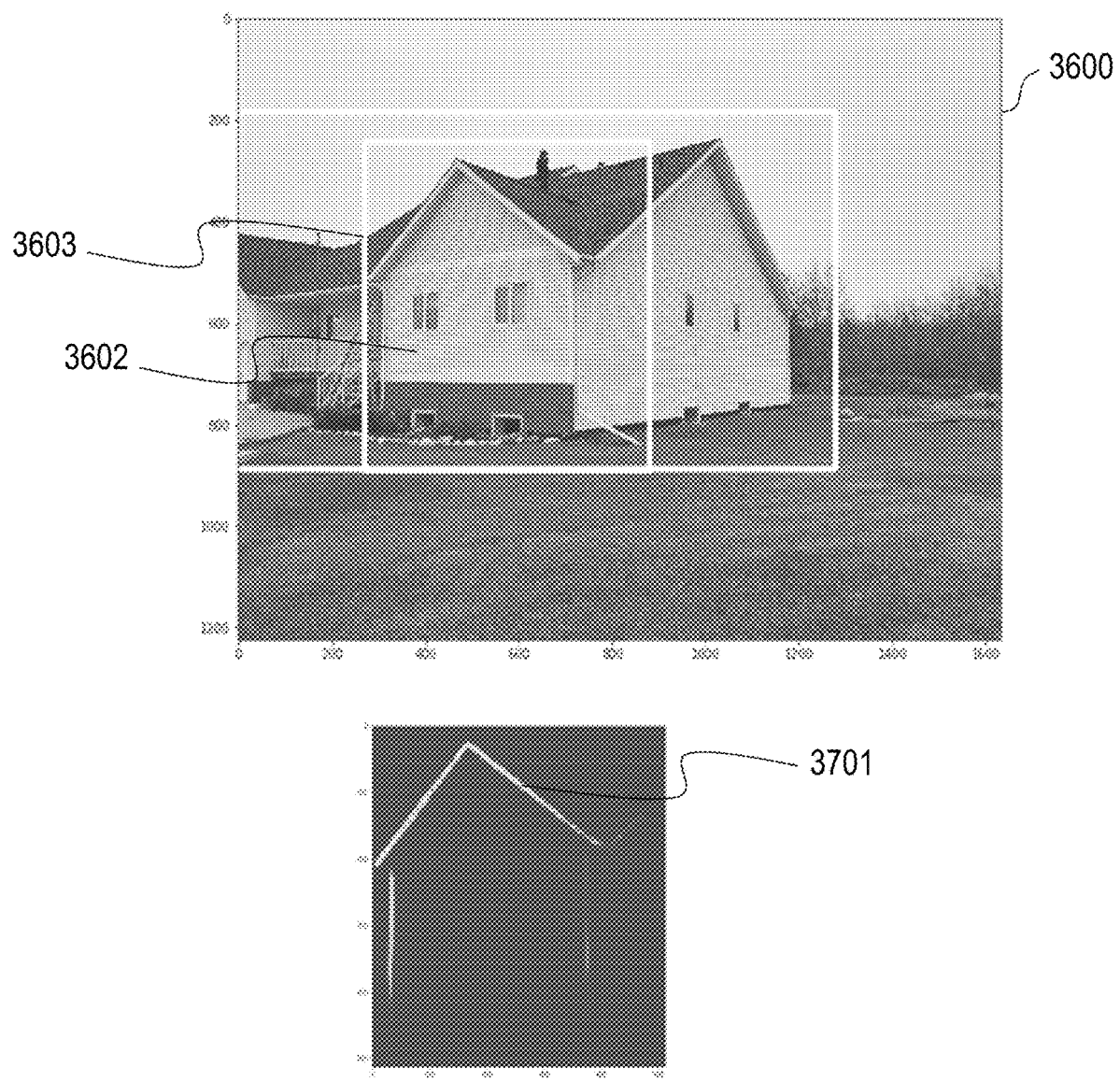
FIG. 37 illustrates a channel output for a substructure, according to certain aspects of the present disclosure.

This sub-structure bounding box represents a multichannel mask cascade operation. Shown in FIG. 37 is segmentation mask 3701 corresponding to features attributable to a gable of house 3602. A bounding box to that encompasses mask 3701 may in turn produce bounding box 3603. Segmentation mask 3701 is one of a plurality of segmentation channels that may be produced from the input RGB image as seen in image frame 3600. A first channel may be segmentation for structure 3801 on the whole, another channel for the gable as in 3701. Some embodiments identify additional channels defining additional features, subcomponents or subfeatures as described further below.

Figure 38:
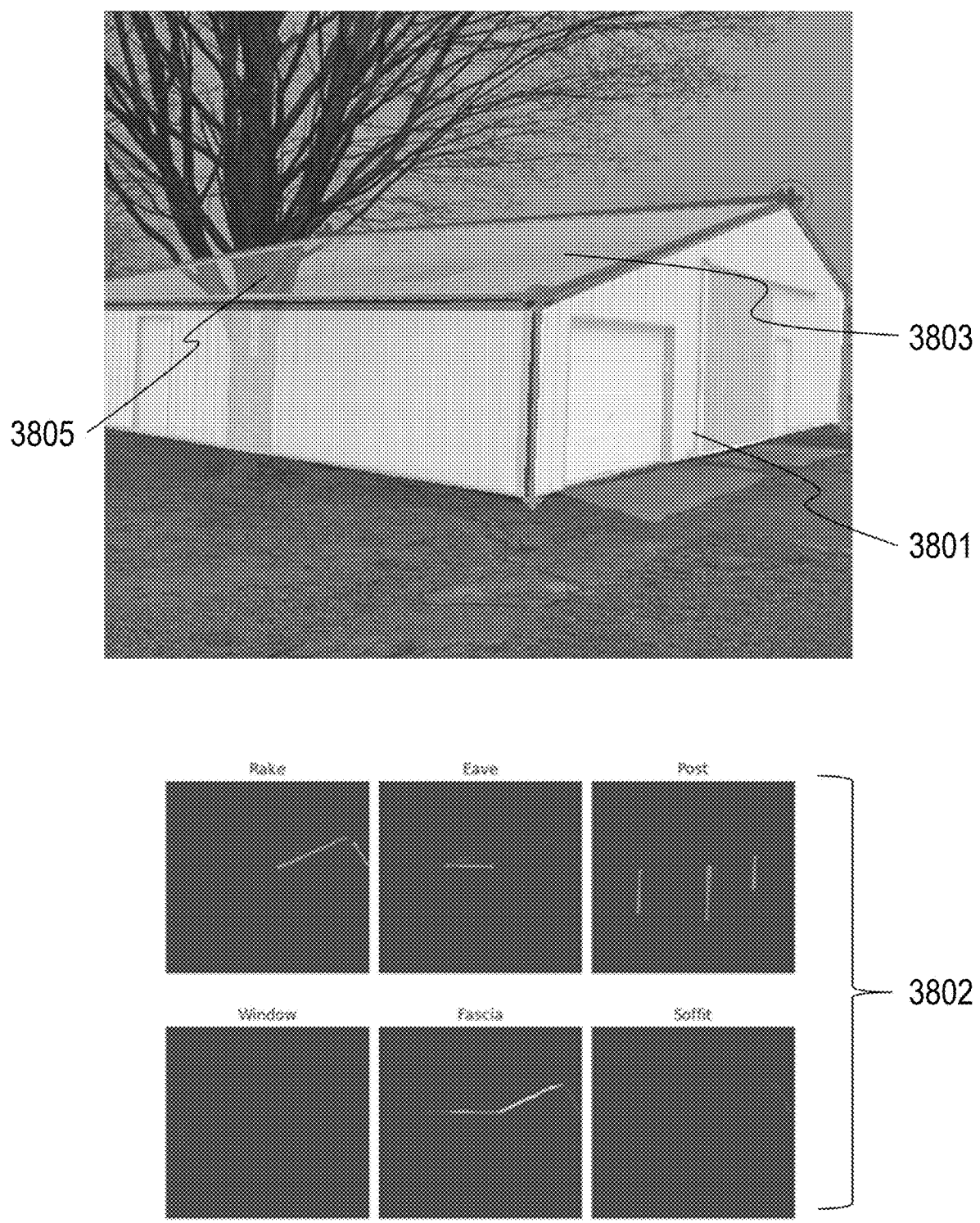
FIG. 38 illustrates a plurality of channels associated with activation maps, according to certain aspects of the present disclosure.

FIG. 38 depicts structure 3801 and a plurality of channels 3802 for sub-elements of structure 3801. In some implementations, a channel represents a classification output indicative of a pixel value for a specific attribute in an image; a segmentation mask for a particular feature may be a type of channel. Among channels 3802 are segmentation masks for rakes (e.g., lines culminating in apexes on roofs), eaves (e.g., lines running along roof edges distal to the roof's ridge), posts (e.g., vertical lines of facades such as at structure corners), fascia (e.g. structural elements following eaves), and soffit (e.g., the surface of a fascia that faces the ground). Many more sub-elements and therefore channels are possible, such as ridge lines, apex points, and surfaces are part of a non-exhaustive list.

In some embodiments, the output as shown in any one channel of channels 3802 may be used for the active guidance or bounding box fitting as described throughout this disclosure. The mask output by a channel may serve as mask 1502, with reference to FIG. 15, and a bounding box fit to it or the mask directly used for framing that content within display boundary. In some embodiments, channel outputs are aggregated. For example, knowing that a substructure, such as a gable, is a geometric or structural representation of subfeatures, such as rakes and posts, a new channel may be built that is a summation of the output of the rake channel and the post channel, resulting in a representation similar to mask 3701 of FIG. 37. Similarly, if there is not already a roof channel from an associated activation map, knowing that roofs are a geometric or structural representation of rakes, eaves, and ridges, those channels may be aggregated to form a roof channel. In some implementations, a cascade of channel creation or selection may be established. While a single channel for a structure on the whole may be a preferred channel, a second channel category may be for sub-structures such as a gable or roof, and a third channel category may be for the foundational elements of sub-structures such as subfeatures like rakes, eaves, posts, fascia, soffits, windows, and so on.

Channel selection to a frameable bounding box or mask (one that fits within a display) may cascade through these categories. In some implementations, a user can select a channel. In some implementations, one or more channels can be selected for the user based on what masks are eligible based on the channel outputs. In some implementations, a channel can be an activation map for data in an image frame (pre- or post-capture) indicating a model's prediction that a pixel in the image frame is attributable to a particular classification of a broader segmentation mask. The activation maps can be, then, an inverse representation, or single slice, of a segmentation mask trained for multiple classifications. By selectively isolating or combining single activation maps, new semantic information, masks, and bounding boxes can be created for sub-structures or subfeatures in the scene within the image frame and guidance prompts provided to optimize framing for those elements (e.g., the sub-structures or the subfeatures).

In some implementations, a neural network model comprises a plurality of layers for classifying pixels as subfeatures within an image. A final convolution layer separates out, into desired channels or subchannels, outputs representing only a single classification of the model's constituent elements. This enables feature representations across the image to influence prediction of subfeatures, while still maintaining a layer optimized for a specific feature. In other words, a joint prediction of multiple classes is enabled by this system (e.g., by server 120 and its components). While the presence of points and lines within an image can be detected, shared feature representations across the network's layers can lend to more specific predictions; for example, two apex points connected by lines can predict or infer a rake more directly with the spatial context of the constituent features. In some implementations, each subchannel in the final layer output is compared during training to a ground truth image of those same classified features and any error in each subchannel is propagated back through the network. This results in a trained model that outputs N channels of segmentation masks corresponding to target subfeatures of the aggregate mask. Merely for illustrative purposes, the six masks depicted among group 3802 reflect a six feature output of such a trained model. Each activation map in these channels is a component of an overall segmentation mask (or as aggregated a segmentation map of constituent segmentation masks).

Figure 39A:
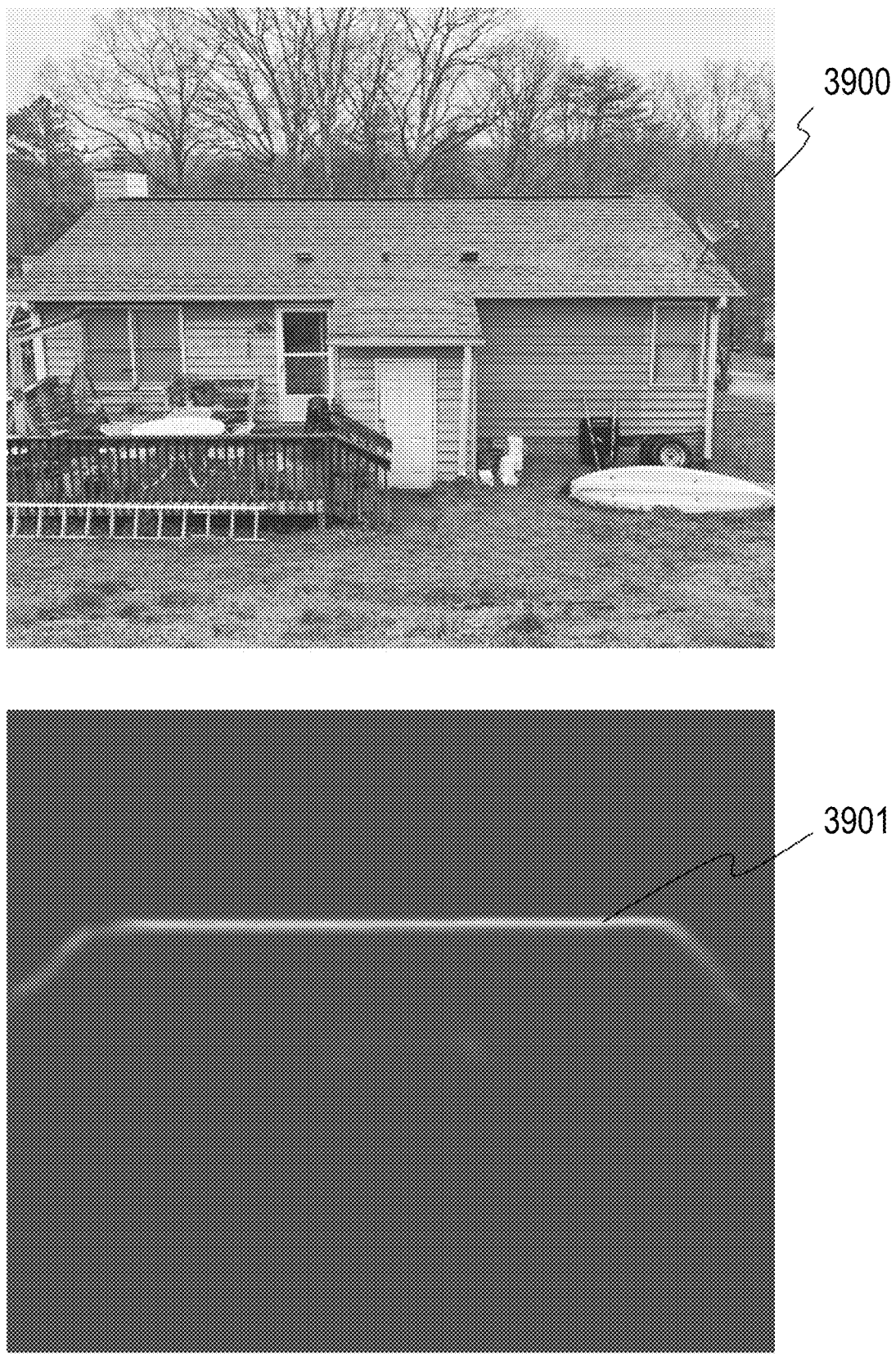
Figure 39B:
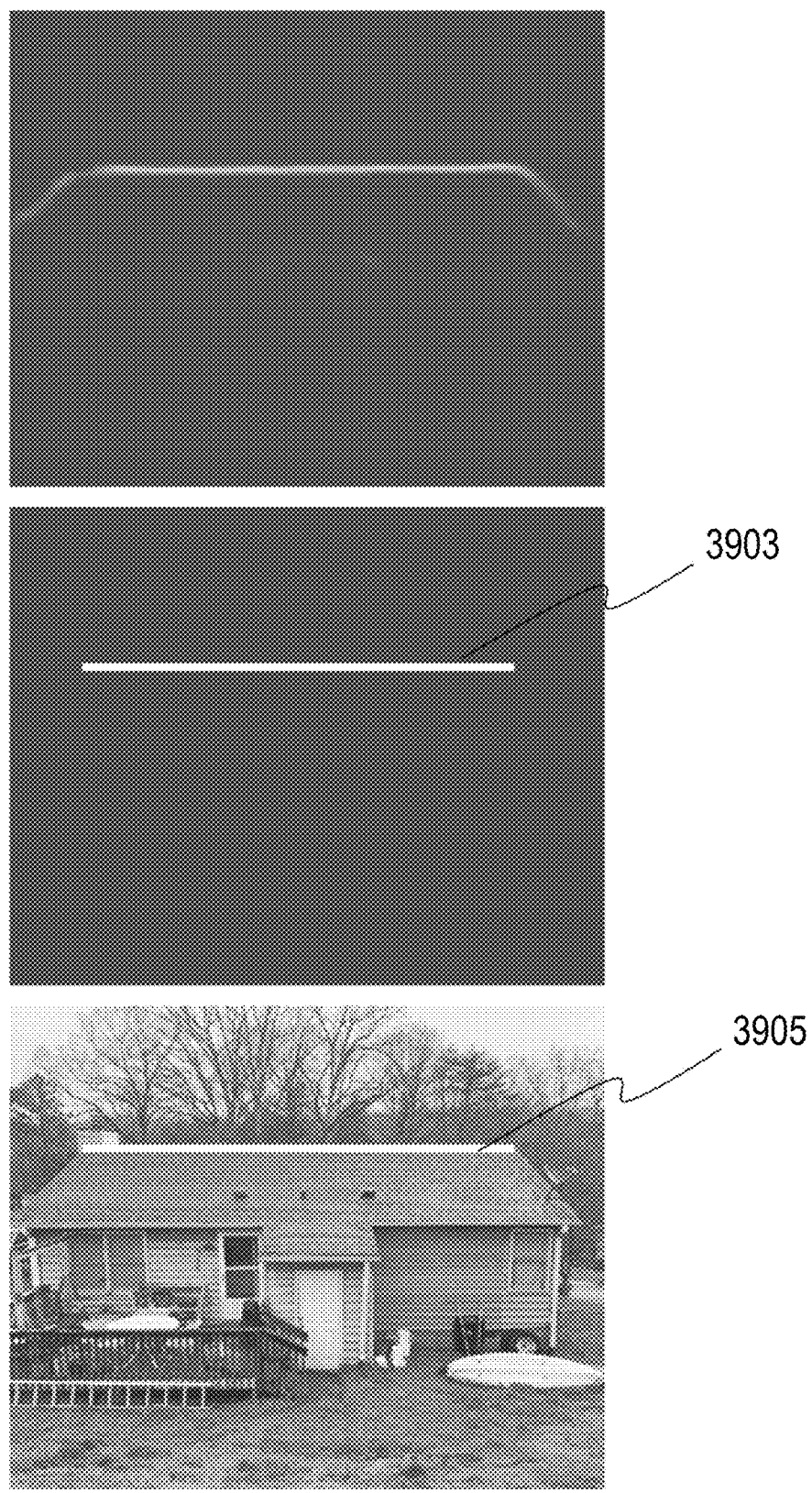

In some implementations, intra-image parameter evaluation system 250 can further refine an activation map output using filtering techniques. Keypoint detection techniques, such as the Harris corner algorithm, line detection techniques, such as Hough transforms, or surface detection techniques, such as concave hull techniques can clean noisy output. Referring to FIG. 39A, activation map 3901 can be one of a plurality of activation maps for image 3900, in this case a ridge line for a roof. As activation map 3901 corresponds to a linear feature, a linear detection technique may be applied to the pixels of 3901, resulting in smoothed linear feature 3903 of FIG. 39B. This linear feature may then be overlaid on image 3900 to depict a clean semantic labeling 3905. As discussed above, these may be grouped with other such activation map outputs or refined representations, and applied to a scene. Grouping logic is configurable for desired sub-structures or subfeatures. For example, a rake activation map combined with a post activation map can produce a gable channel, despite no specific activation map for that type of sub-structure. Referring back to FIG. 38, such configurable channels can create clean overlays indicative of a classification but not prone to noisy pixel prediction or occlusions. Roof overlay 3803 may be created from a refined planar surface activation mask, or by filling in areas bounded by apex points, rakes, eave, and ridge line activation masks. Occluding tree 3805 does not create neighbor masks for the same planar element with such a cumulative channel derived from several activation mask outputs.

Data collection for damage reports especially benefit from such isolated masks. For example, damage types typically occur in associated areas: hail on roofs, or wind on siding. If damage assessment imaging tools were to look for specific damage, segmenting an image frame into targeted areas for closer inspection and guiding an imager to appropriately capture such feature expedites evaluation. A drone piloting about a house to collect images for assessing damage can isolate subfeatures within an image frame associated with a particular category of damage, and guide imager positioning for that specific (sub)feature based on that (sub)feature's activation map channel.

Figure 40B:
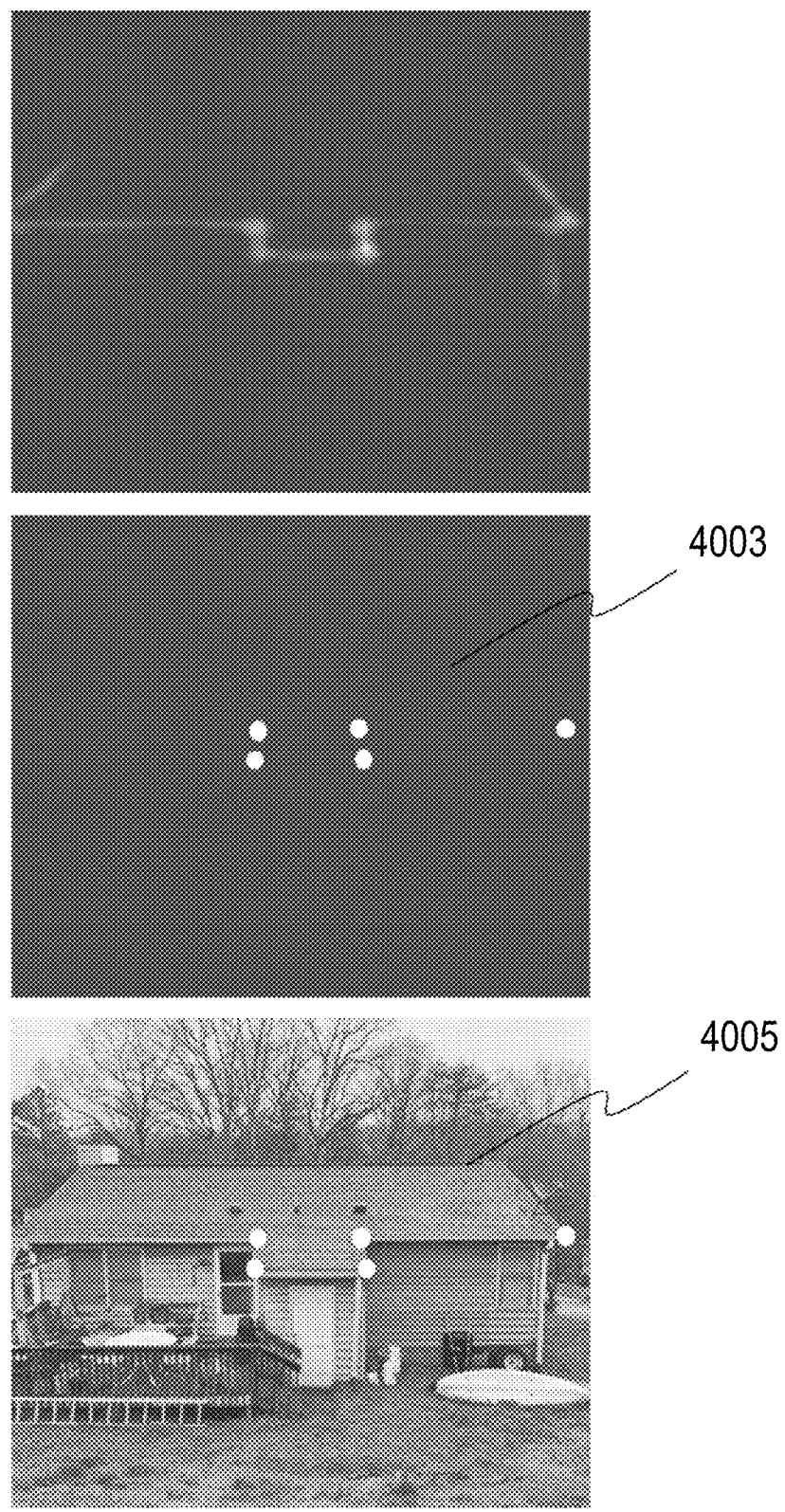

As another illustrative example, FIG. 40A depicts an input image 4000 that is the same as input image 3900 but with activation map 4001 for the fascia of the house. While linear detection techniques operated upon activation map 4001 would produce clean lines to the noisy data depicted in 4001, other techniques such as keypoint detection by Harris corner detection can reveal fascia endpoint channel 4003 that show semantic point labeling 4005. These channels can be applied in building block like fashion to provide clean labeling to an image that overlays a structure, even over occlusions as described above with FIG. 38 and mitigating the presence of occluding tree 3805.

Figure 41A:
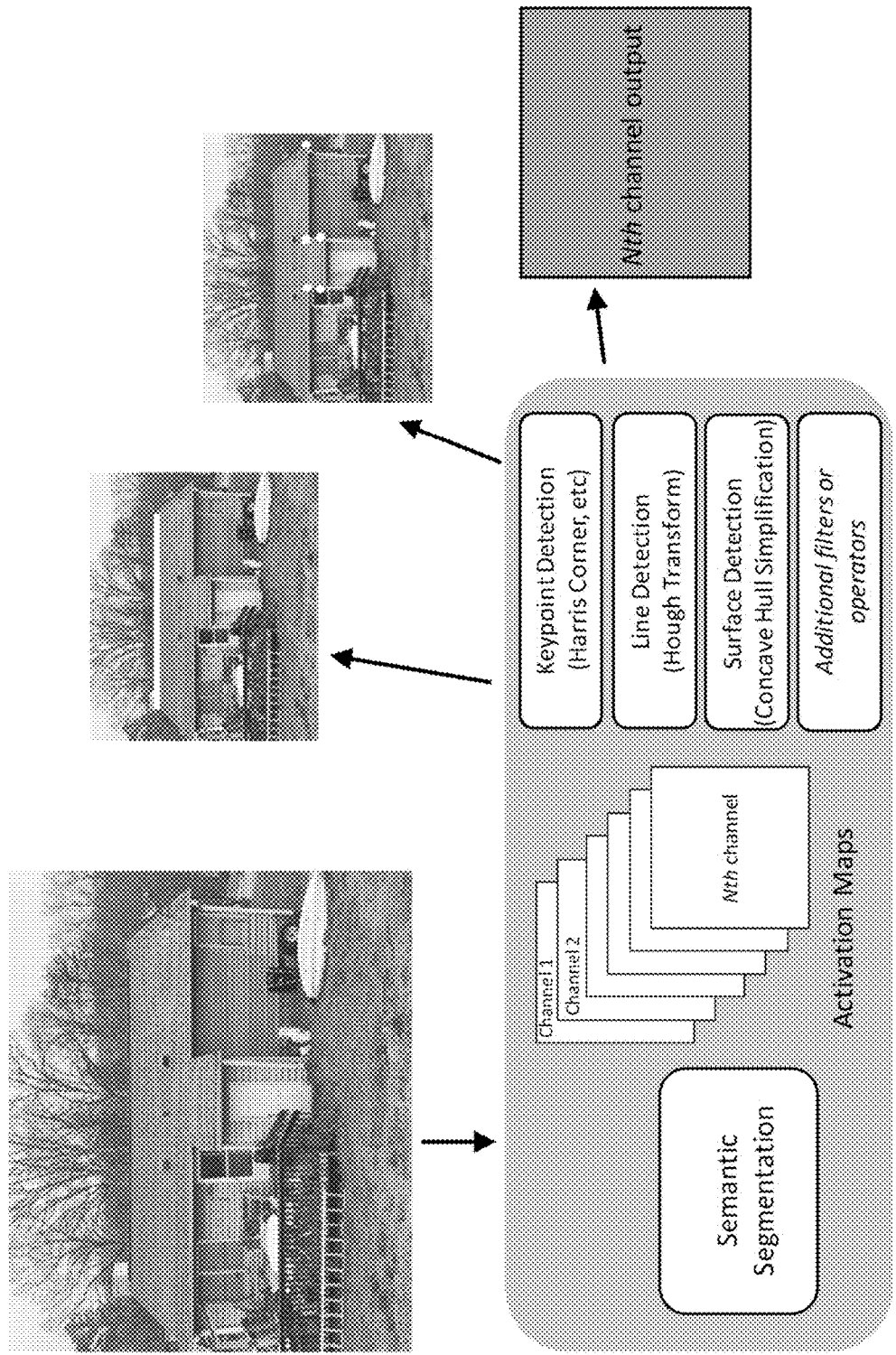
FIGS. 41A-41B illustrate operations for generating channel output for substructure identification, according to certain aspects of the present disclosure.
Figure 41B:
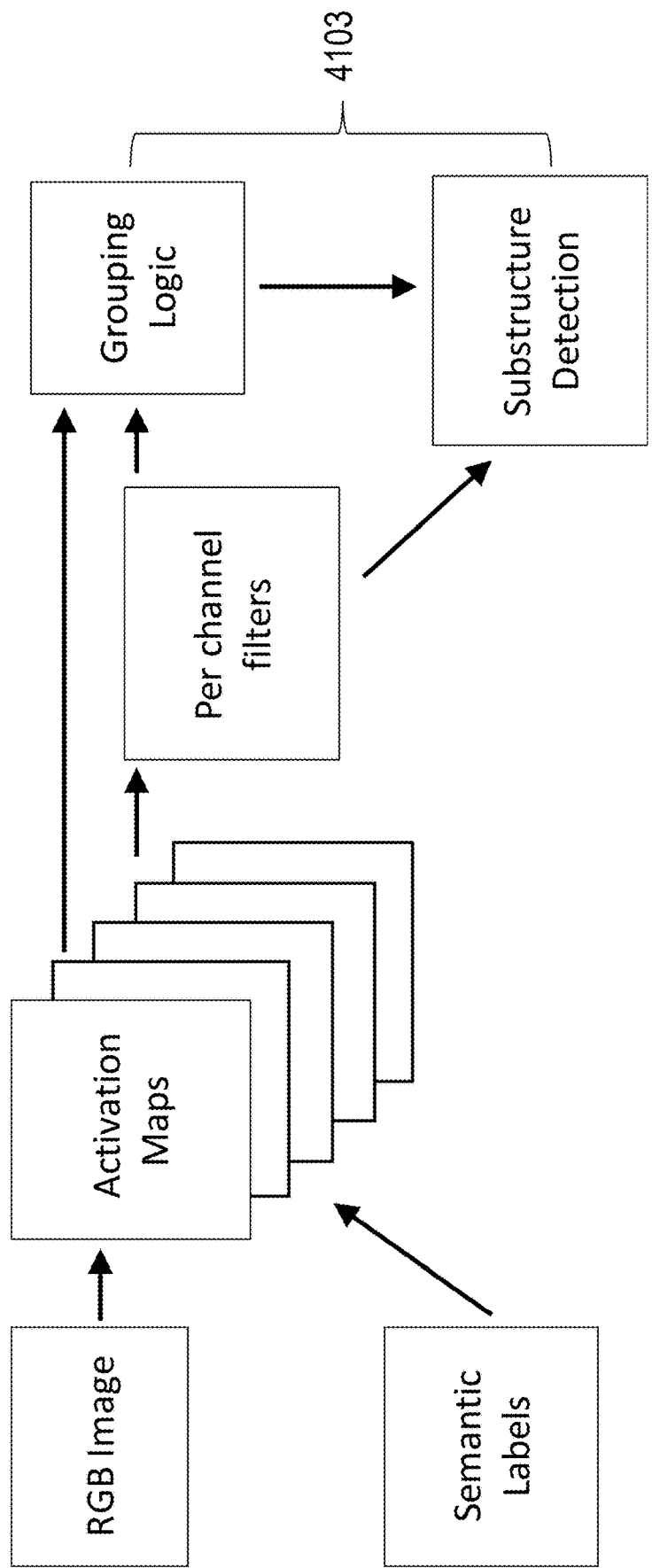

FIG. 41A illustrates this semantic scene understanding output as channels, wherein an input image is segmented for a plurality of N classification channels, and each classification extracted by a respective activation map. The activation map output may be further refined according to computer vision techniques applied as channel operators like keypoint detection, line detection or similar functions, though this step is not required. In some embodiments, a channel operator can aggregate multiple channels. These grouped or aggregates channel outputs create higher order substructure or subfeature channels based on the lower order activation map or channels for the input subject. In some implementations, bounding boxes can be fit to the resultant segmentation mask of lower order constituent channels or higher order aggregate channels as in steps 4103 of FIG. 41B. In some implementations, intermediate bounding boxes may be placed within the image and semantic segmentation performed within the intermediate box performed to identify discrete features such as soffit, fascia, trim and windows.

In some implementations, grouping of features or subfeatures may be configurable or automated. Users may select broad categories for groups (such as gable or roof) or configure unique groups based on use case. As the activation maps represent low order components, configuration of unique groups comprising basic elements, even structurally unrelated elements, can enable more responsive use cases. Automated grouping logic may be done with additional machine learning techniques. Given a set of predicted geometric constraints, such as lines or points generally or classified lines or points (e.g., as output by an activation map), a trained structure RCNN (Region-based Convolutional Neural Network) model can output grouped structures (e.g., primitives) or substructures.

Figure 42:
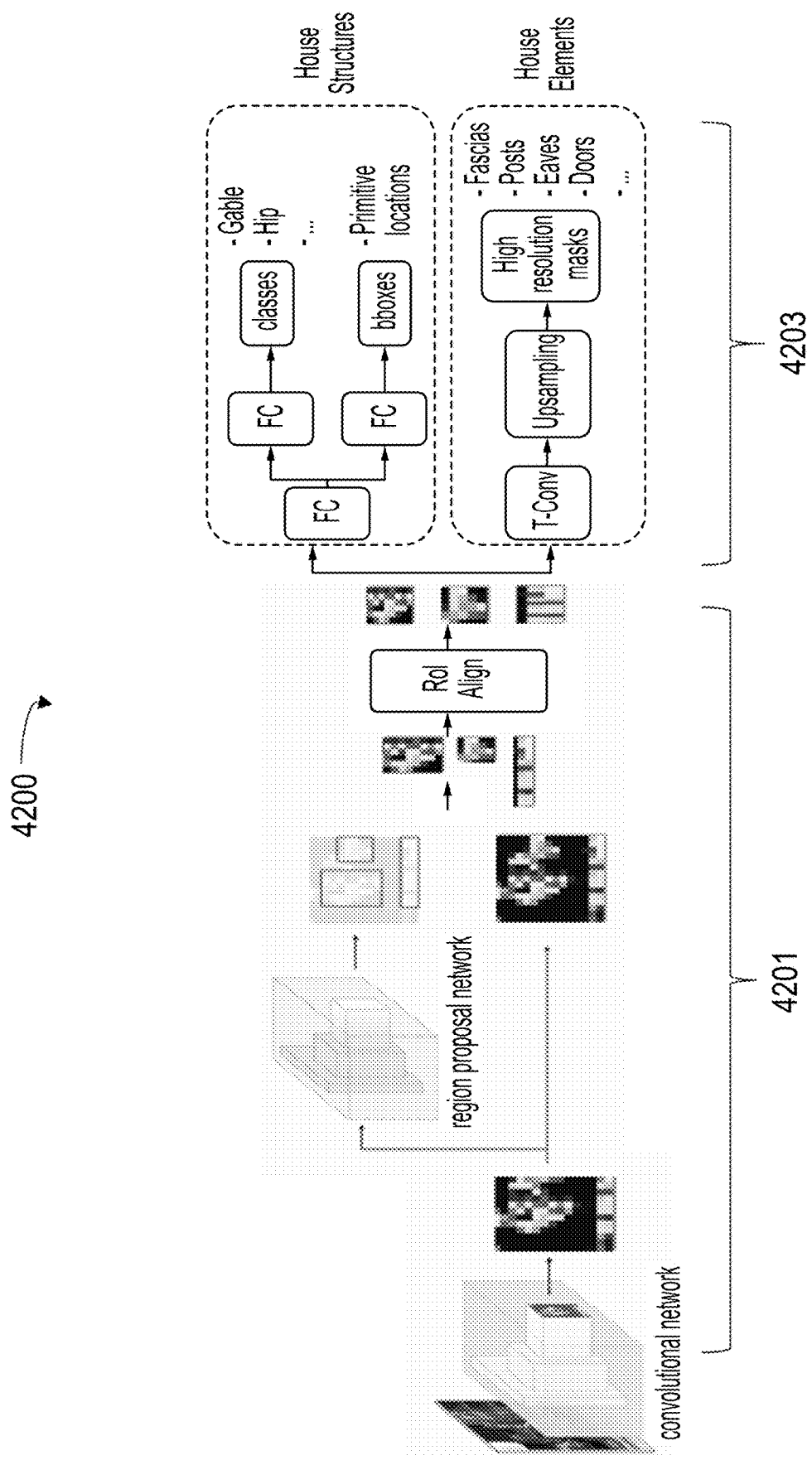
FIGS. 42-43B illustrate grouping operations for identifying substructures, according to certain aspects of the present disclosure.

FIG. 42 illustrates an example of a structure RCNN architecture 4200. Similar in architecture to mask RCNN in the art using early networks heads 4201 for region proposal and alignment to a region of interest, the structure RCNN of FIG. 42 can add additional elements 4203 for more specific capabilities, such as grouping. Whereas traditional mask RCNN may detect individual elements separately, such as sub-components or features and sub-features of a house, the structure RCNN first detects an overall target, such as House Structures (primitives like gables and hips) and then predicts masks for sub-components, such as House Elements (fascias, posts, eaves, rakes, etc.).

Whereas the House Elements head of network 4200 may use a combination of transpose convolution layer and upsampling layer, the House Structures head uses a series of fully connected layers to identify structural groupings within an image. This output may be augmented with the House Elements data, or the activation map data from the previously discussed network, to produce classified data within a distinct group. In other words, the structure RCNN architecture 4200 can discern multiple subcomponents or substructures within a single parent structure to avoid additional steps to group these subcomponents after detection into an overall target.

This avoids fitting a bounding box for all primitives or sub-structures, and distinguishes to which sub-structure any one subfeature may be grouped. Again using the gable detection illustrative use case, structure RCNN can identify a cluster of features first and then assign them as grouped posts to appropriate rakes to identify distinct sub-structures comprising those features, as opposed to predicting all rakes and posts in an image indicate "gable pixels."

Segmentation masks based purely on aggregate activation maps may produce masks and bounding boxes encompassing multiple sub-structures within the image frame; while a gable may be expressed by posts and rakes, it is particular posts and rakes within an image that define any one gable. Without the parsing of sub-structures into respective groups as with the illustrated structure RCNN, active guidance to facilitate framing a particular sub-structure may be as difficult as guidance to capture the entire subject house, as the prompts may attempt to fit all particular pixels for a class of sub-structure rather than simply a single instance.

Figure 43A:
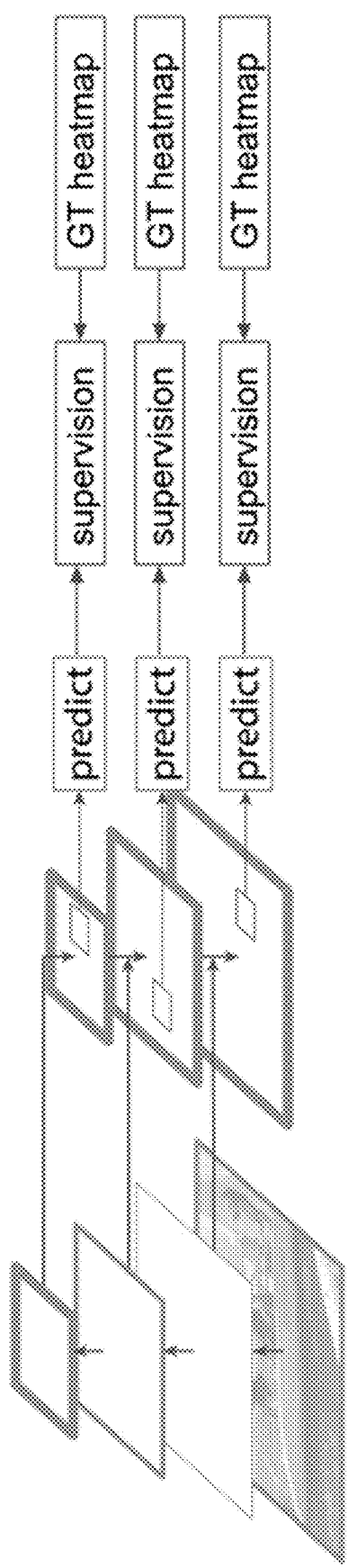
Figure 43B:
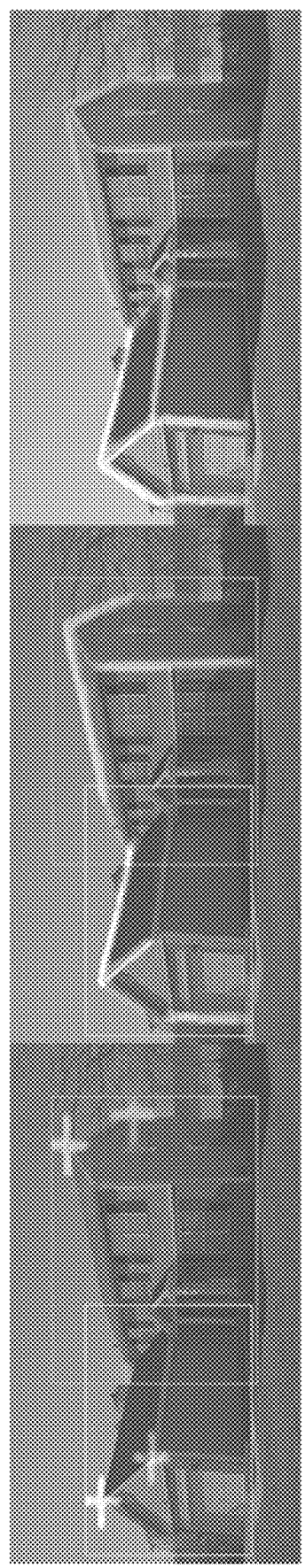

FIG. 43A illustrates a region-specific operation after a grouping is identified within an image, and then segmentation of pixels within the grouping is performed. As a result, regions of sub-structural targets are identified, as in the far left image of FIG. 43B, and in some implementations, a bounding box may be fit to these grouped sub-structural targets already. Submodules may then classify sub-components or subfeatures such as keypoint and lines via segmentation masks of various channels. Lastly, the network also predicts masks for features per-unique-substructure, as in the far right image of FIG. 43B. Features within a unique region or sub-structure may be indexed to that region to distinguish it from similarly classified elements belonging to separate sub-structures.

Figure 44:
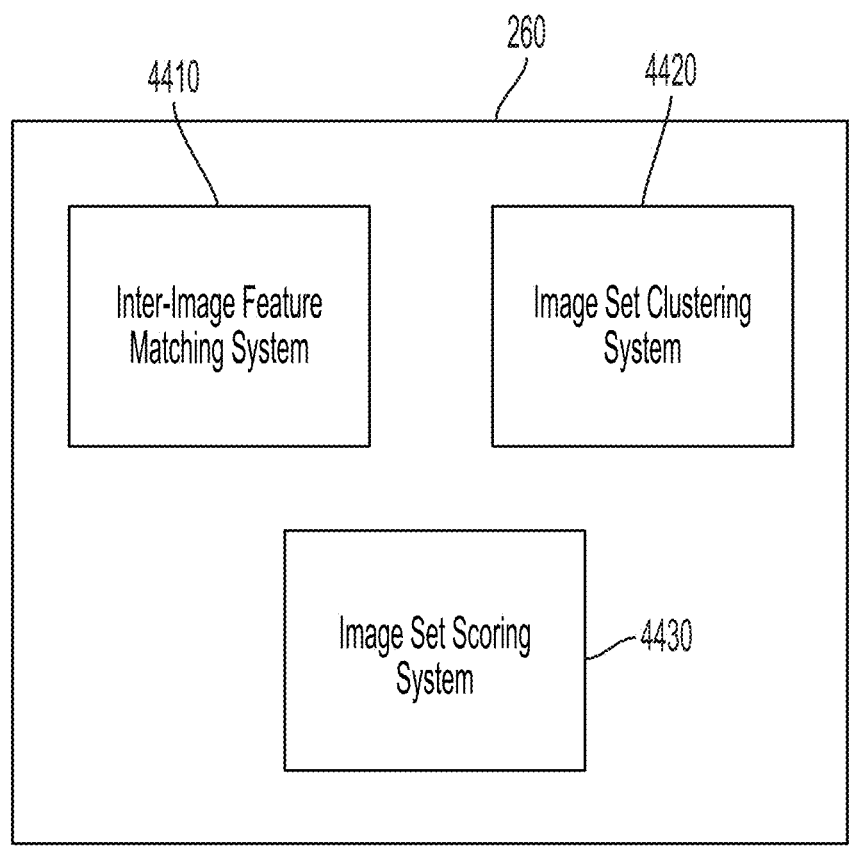
FIG. 44 is a block diagram illustrating an example of a network environment of an inter-image parameter evaluation system, according to certain aspects of the present disclosure.

FIG. 44 is a block diagram illustrating an example of components of inter-image parameter evaluation system 260, according to certain aspects of the present disclosure. In some implementations, inter-image parameter evaluation system 260 can include several components, including inter-image feature matching system 4410, image set clustering system 4420, and image set scoring system 4430. Each of inter-image feature matching system 4410, image set clustering system 4420, and image set scoring system 4430 can communicate with any other component of inter-image parameter evaluation system 260.

Figure 45:
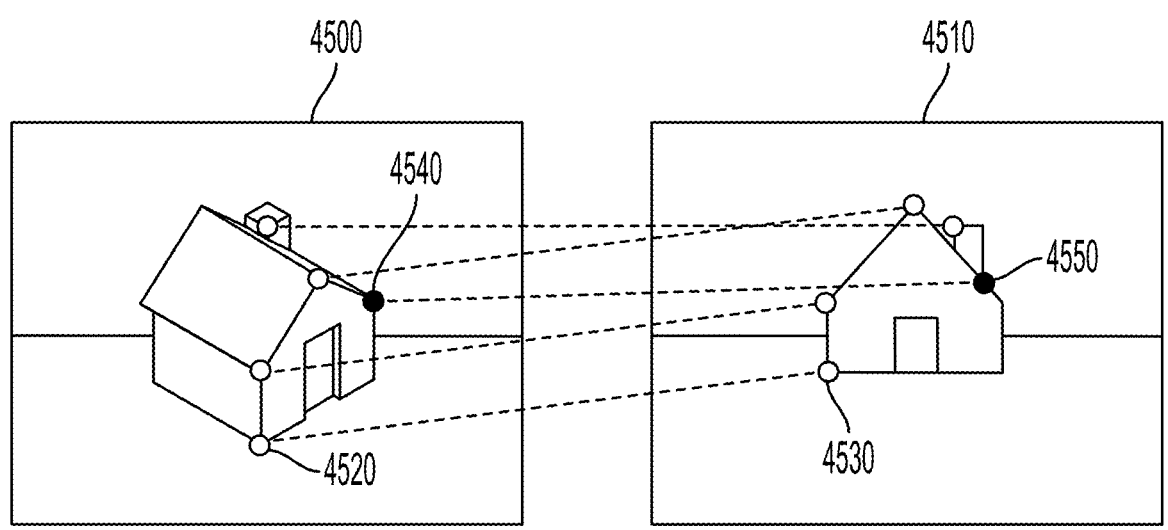
FIG. 45 illustrates examples of feature correspondences between two images captured during an image capture session, according to certain aspects of the present disclosure.

The interactions between the various components of inter-image parameter evaluation system 260 will be described with reference to FIGS. 45-50. Inter-image feature matching system 4410 can be configured to detect feature matches between a pair of images (e.g., a successive pair of images captured during an image capture session). For example, feature matching can include determining an association between a feature detected in the first image of the pair and another feature detected in the second image of the pair. The association between the two detected features can indicate that the two detected features share a common 3D position. As an illustrative example, as illustrated in FIG. 45, image 4500 can be a first image of a successive pair of images captured during an image capture session, and image 4510 can be a second image of the successive pair of images. Image 4500 can represent an angled view of the house, and image 4510 can represent a front view of the same house. Inter-image feature matching system 4410 can detect features within image 4500, such as feature 4520 (e.g., a bottom left corner of a house) and feature 4540 (e.g., a right-side corner of the roof of the house). Likewise, inter-image feature matching system 4410 can detect features within image 4510, such as feature 4530 (e.g., a bottom left corner of the house) and feature 4550 (e.g., a bottom corner of a chimney located on the right side of the roof). Given the features detected in each of images 4500 and 4510, inter-image feature matching system 4410 can perform a feature matching technique that detects a statistical correspondence between, for example, feature 4520 of image 4500 and feature 4530 of image 4510. Non-limiting examples of feature matching techniques include Brute-Force matching, FLANN (Fast Library for Approximate Nearest Neighbors) matching, local feature matching techniques (RoofSIFT-PCA), techniques that evaluate robust estimators (e.g., a Least Median of Squares estimator), and other suitable techniques. Regardless of the feature matching technique used, each feature match may be associated with a confidence score that represents a probability that the match is accurate. For example, the match between feature 4520 and feature 4530 has a higher confidence score than the match between feature 4540 and feature 4550. Both features 4520 and 4530 correspond to the bottom left corner of the house. However, feature 4540 is incorrectly matched with feature 4550 (as indicated by the black circles in FIG. 45) because feature 4540 represents a corner where a rake line meets a fascia line on the right side of the roof, but feature 4550 represents a corner where the bottom of the chimney meets the roof.

Figure 46:
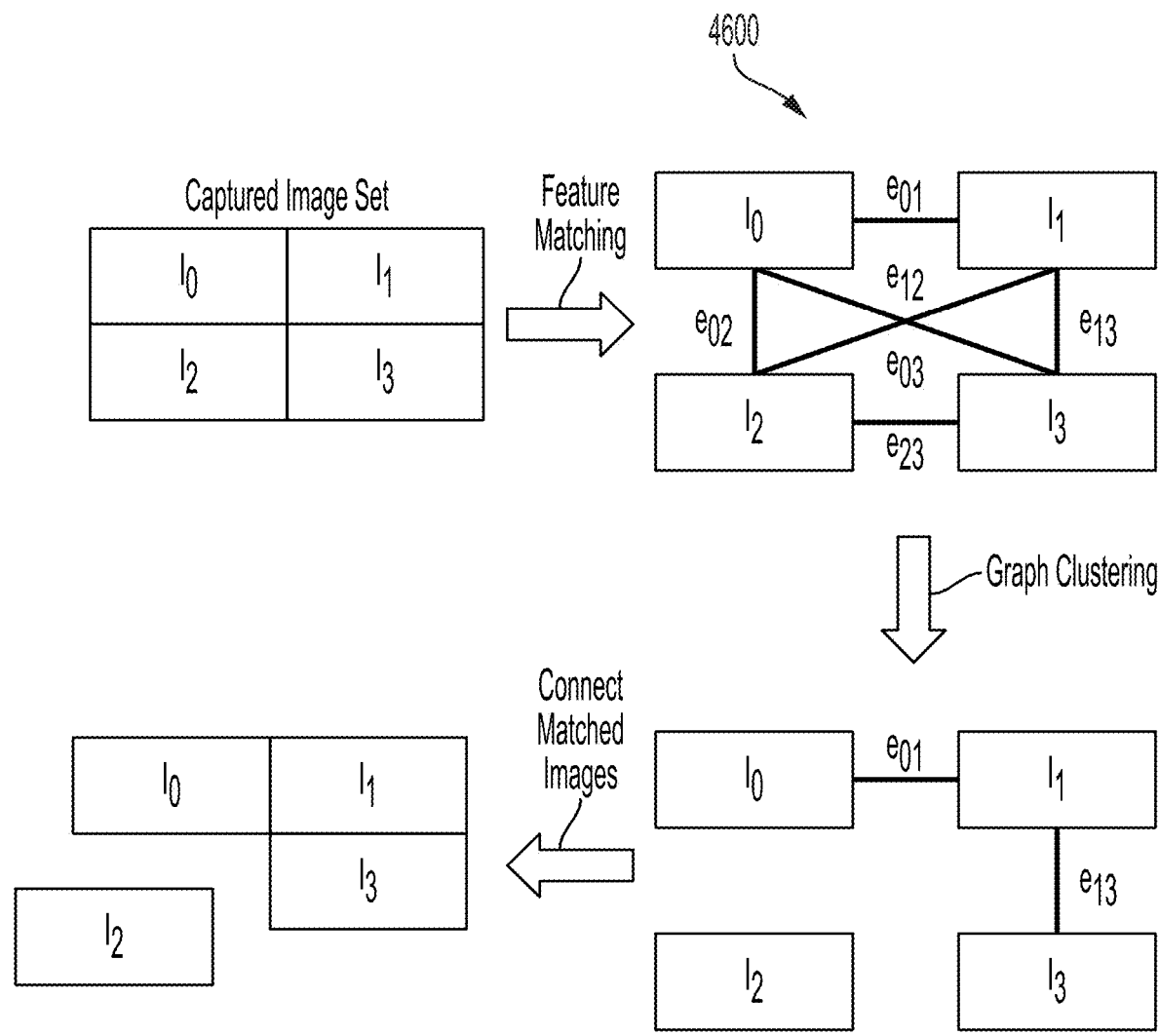
FIG. 46 illustrates an example of a process flow for generating a 3D coverage metric representing a quality of feature correspondences between pairs of images within a set of images, according to certain aspects of the present disclosure.

After inter-image feature matching system 4410 performs feature matching between each pair of images of the competed set of 2D images, inter-image feature matching system 4410 can generate a graph structure 4600, as shown in FIG. 46. The graph structure 4600 can represent the complete set of 2D images captured during an image capture session. The graph structure 4600 can include a plurality of nodes (e.g., $I_0$, $I_1$, $I_2$, and $I_3$), and each node can represent an image of the set of 2D images. If inter-image feature matching system 4410 detects a feature match between two images, then inter-image feature matching system 4410 can associate the two corresponding nodes with an edge (e.g., a node connection, as indicated by $e_{01}$, $e_{02}$, $e_{13}$, and so on). Each edge can be associated with a weight that can represent a degree of shared features between two images. As an illustrative example, for a given pair of images with at least one feature match between the two images, the weight between two nodes of the graph structure 4600 can be determined by identifying the number of feature matches between the two images and weighing each feature match by the confidence of that feature matches, and then combining (e.g., summing) the results into a single value. Inter-image feature matching system 4410 can determine the weight for each edge in graph structure 4600. In some embodiments, a confidence in feature matching is an output of a network predicting the correspondences. A confidence may be further weighted based on feature type. Features attributed to surfaces may be weighted lower, while lines or points, or intersections of lines that form points at corners, may be weighted higher.

Image set clustering system 4420 can be configured to execute a clustering operation on graph structure 4600. In some implementations, the clustering operation can be a spectral clustering technique that clusters the nodes of graph structure 4600 based on the weights of the edges. As illustrated in FIG. 46, the spectral clustering technique can cluster the nodes of graph structure 4600 into two clusters: one cluster can include images $I_0$, $I_1$, and $I_3$, and the other cluster can include image $I_2$. The clustering operation can be performed to prune certain edges, such as the edges that represent feature matches below a threshold number of feature matches, below a threshold confidence, or below a threshold number of associated planes or lines (e.g., indicating a lack a diversity of planes on which the features are detected). Image set clustering system 4420 can connect the images included in each cluster. In some implementations, inter-image feature matching system 4410 can formulate the set of 2D images as a graph neural network. Image set clustering system 4420 can execute any clustering technique on the graph neural network (e.g., Graph2Vec), such as spectral clustering, supervised, semi-supervised, or unsupervised graph clustering, distance-based clustering, clustering based on computed node similarity, or any suitable clustering technique. In some implementations, the clustering parameters or the clustering technique itself can vary depending on one or more factors, such as expected time for generating a 3D model. For example, if weights below a certain threshold are not pruned, then it may take a longer time for 3D model reconstruction system 280 to generate a 3D model, and thus, image set clustering system 4220 can select a cluster technique that prunes edges that are below a threshold.

Image set scoring system 4430 can be configured to generate a 3D coverage metric for the set of 2D images. The 3D coverage metric is a value that represents the degree to which the detected feature correspondences between pairs of images of the set of 2D images are sufficient for allowing 3D model reconstruction system 280 to reconstruct a 3D model of a physical structure. The 3D coverage metric may be inversely proportional to the number of clusters formed after the clustering operation is executed. The existence of multiple clusters indicates the existence of uncovered areas of the physical structure. For example, the formation of two clusters after performing the clustering operation indicates that one or more edges have been pruned as a result of executing the clustering operation. When two or more clusters are formed, the inter-cluster images do not share feature matches that are suitable for 3D reconstruction of the 3D model.

Figure 47:
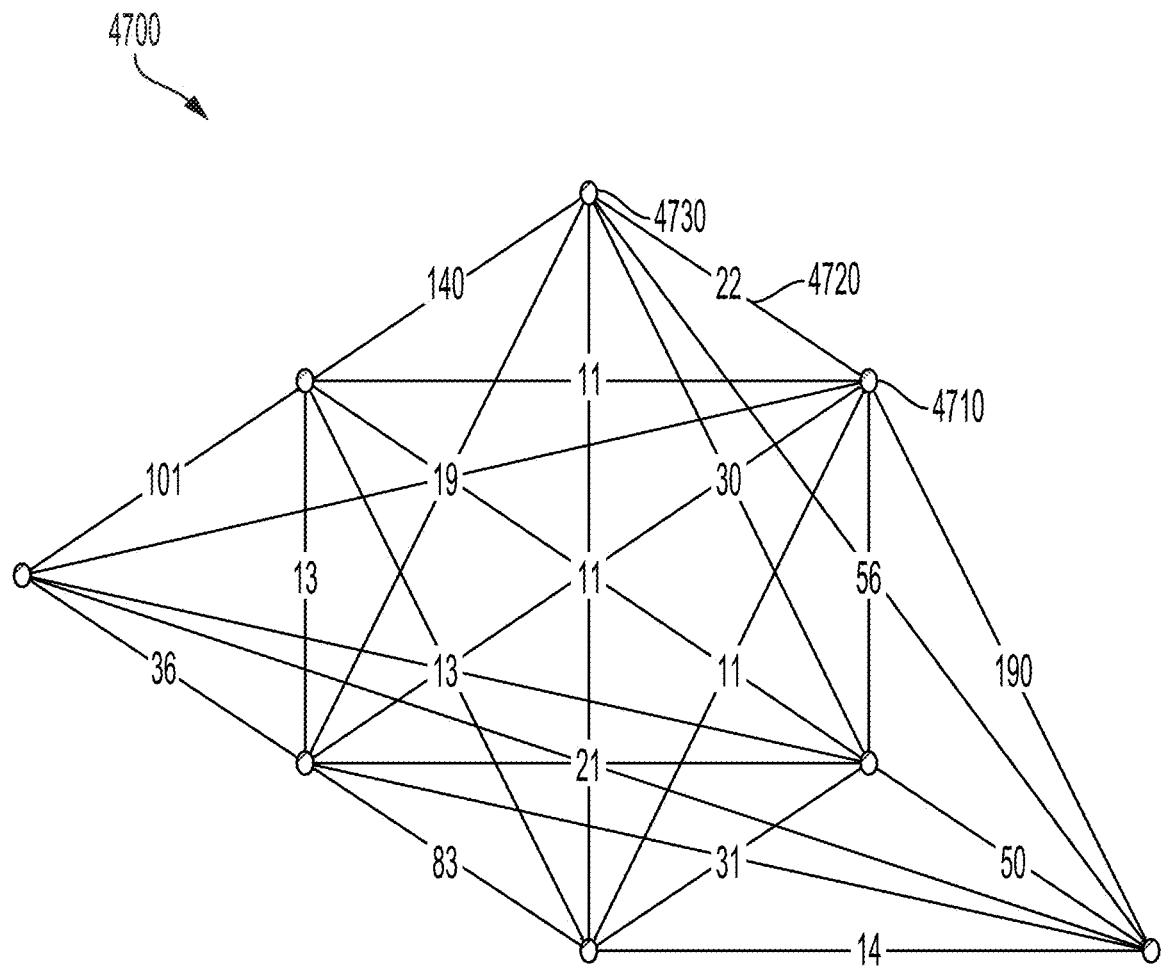
FIG. 47 illustrates an example of a graph structure representing a set of images, according to certain aspects of the present disclosure.
Figure 48:
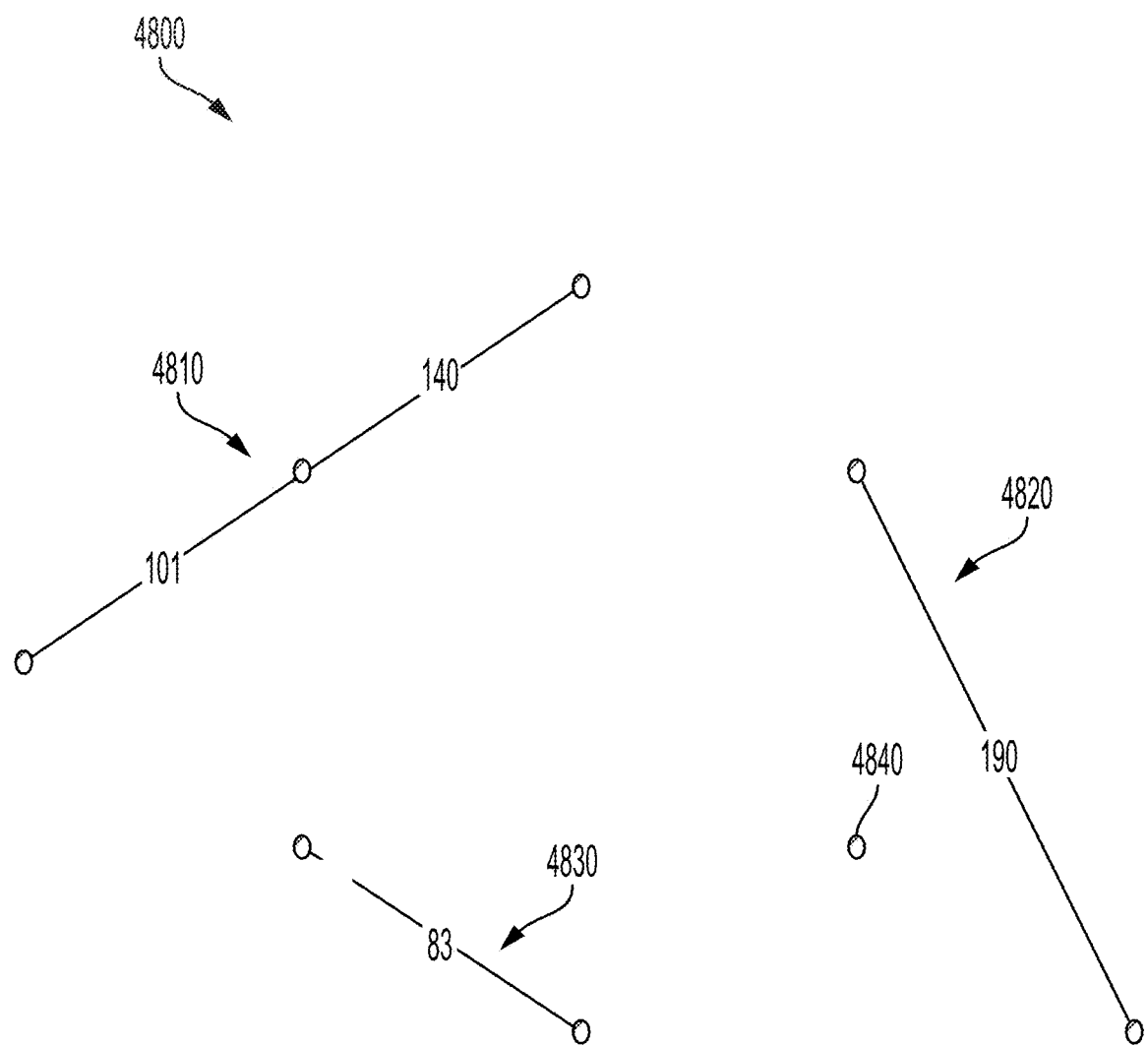
FIG. 48 illustrates an example of multiple clusters of nodes of the graph structure illustrated in FIG. 47, according to certain aspects of the present disclosure.

FIG. 47 illustrates another example of a graph structure generated by inter-image feature matching system 4410. For example, graph structure 4700 includes a plurality of nodes. Each pair of nodes of graph structure 4700, such as node 4710 and node 4730, can be connected by an edge, such as edge 4720, which represents a degree of feature matches between node 4710 and 4730. FIG. 48 illustrates a result of performing a clustering operation on graph structure 4700. For instance, image set clustering system 4420 can be configured to execute a clustering operation, and a result of the clustering operation may be the formation of clusters 4810, 4820, and 4830.

Figure 49:
FIG. 49 illustrates an example of a set of images that capture a residential building from multiple viewpoints, according to certain aspects of the present disclosure.
Figure 50:
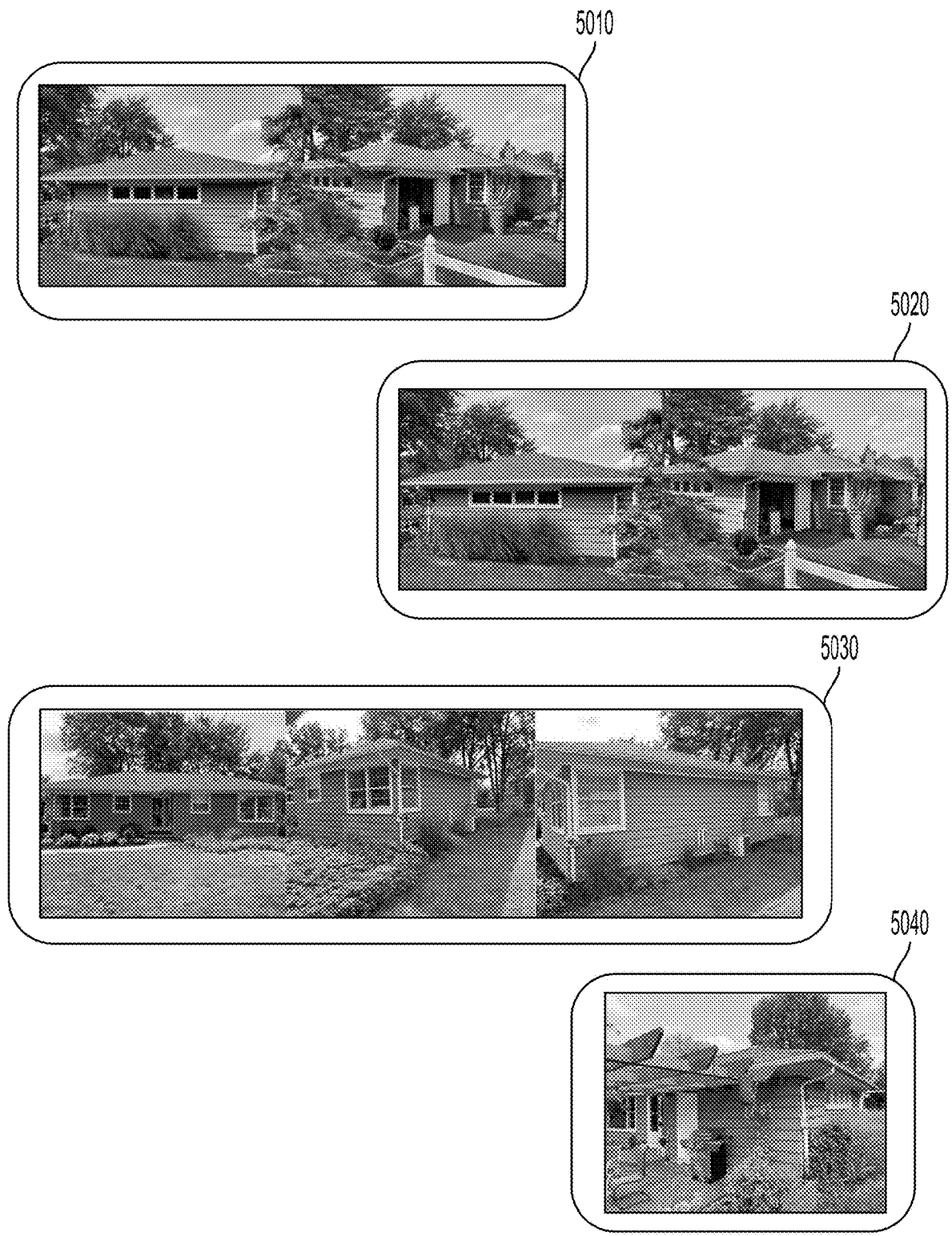
FIG. 50 illustrates an example of multiple clusters of images of the set of images illustrated in FIG. 49, according to certain aspects of the present disclosure.

FIG. 49 illustrates an example of a set of 2D images captured during an image capture session. The set of 2D images can include images 1 through 8, as shown in FIG. 49. Each image of images 1 through 8 can depict a physical structure. Images 1 through 8 can cover the physical structure from various angles. The set of 2D images can be inputted into inter-image parameter evaluation system 260 to generate a 3D coverage metric that represents a degree to which images 1 through 8 are suitable for the purpose of 3D model reconstruction. After the set of 2D images is inputted into inter-image parameter evaluation system 260, then inter-image feature matching system 4410 can detect one or more feature matches between a pair of images. Inter-image feature matching system 4410 can detect feature matches between each pair of images of images 1 through 8. Inter-image feature matching system 4410 can generate a graph structure (not shown) that represents the set of 2D images. Each image is represented by a node of the graph structure. If a pair of images includes at least one feature match, then the graph structure will include an edge between the pair of nodes that represents the pair of images. Each edge within the graph structure can be associated with a weight that represents a degree to which there are features matches between the two images. Image set clustering system 4420 can perform a clustering operation on images 1 through 8. The clustering operation causes four clusters to be formed: cluster 5010, cluster 5020, cluster 5030, and cluster 5040. Image set scoring system 4430 can generate the 3D coverage metric based on the formation of clusters 5010, 5020, 5030, and 5040, as shown in FIG. 50. The larger the number of clusters, the lower the 3D coverage metric will be.

Figure 51:
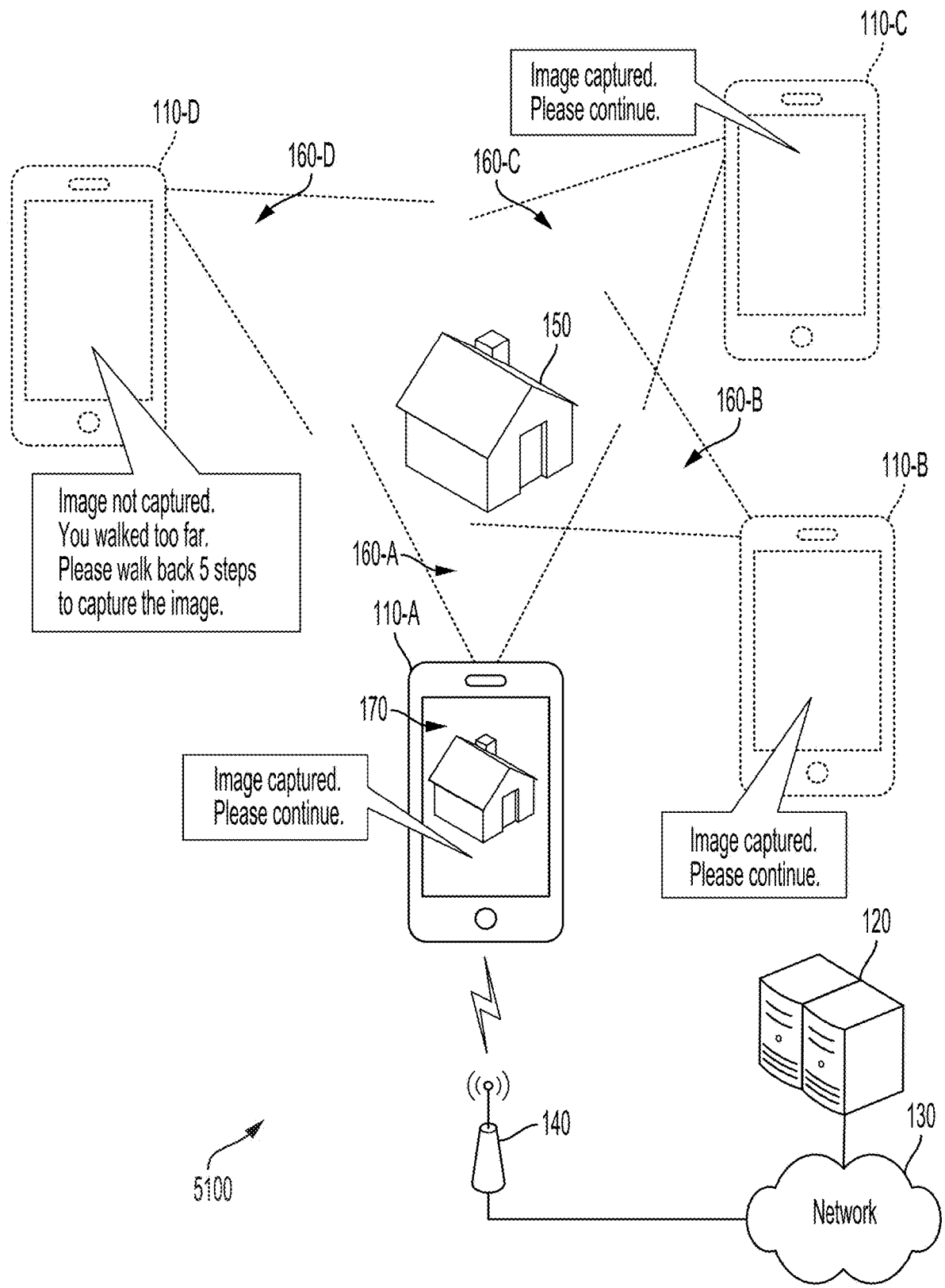
FIG. 51 illustrates an example of a user guidance system, according to certain aspects of the present disclosure.

FIG. 51 is a diagram illustrating an example of user guidance system 270 executing on user device 110 during an image capture session, in which the user is capturing one or more images to complete a set of images for reconstructing a 3D model in a 3D space. Network environment 5100 may be the same as or similar to network 100 illustrated in FIG. 1.

User guidance system 270 can be executed on user device 110 and can determine whether each image captured during the image capture session satisfies a 3D reconstruction condition with respect to a preceding image. As an illustrative example, a user can operate user device 110 by walking to position A (as indicated by 110-A) and capturing an image of house 150. The user may walk to position B (as indicated by 110-B) and capture another image of house 150. Upon capturing the image from position B, user guidance system 270 can execute feature detection and feature matching techniques to determine whether the image captured from position B satisfies a 3D reconstruction condition with respect to the image captured from position A. As illustrated in FIG. 51, user guidance system 270 determines that the image captured from position B satisfies the 3D reconstruction condition with respect to the image captured from position A, and accordingly, generates the feedback notification of "Image captured. Please continue." The user continues to walk to position C (as indicated by 110-C) and captures another image of house 150 from position C. User guidance system 270 determines that the image captured from position C satisfies the 3D reconstruction condition with respect to the image captured from position B, and accordingly, generates the feedback notification of "Image captured. Please continue." Again, the user continues to walk to position D (as indicated by 110-D) and captures another image of house 150 from position D. However, unlike with the images captured from positions B and C, user guidance system 270 determines that the image captured from position D does not satisfy the 3D reconstruction condition with respect to the image captured from position C. Accordingly, user guidance system 270 generates the feedback notification of "Image not captured. You walked too far. Please walk back 5 steps to capture the image." User guidance system 270 can identify a new location towards which the user can walk (e.g., as indicated by the feedback notification "Please walk back 5 steps") using triangulation techniques.

According to certain implementations, user guidance system 270 can automatically generate real-time feedback at the time of image capture while the image capture session is active. The real-time feedback can enable the user to maximize the feature correspondences between image pairs, such as successive images, captured during the image capture session. Maximizing the feature correspondences between images of each pair of images improves the image data provided to 3D model reconstruction system 280 and allows 3D model reconstruction system 280 to reconstruct a 3D model of house 150 using the improved image data included in the set of images.

Figure 52:
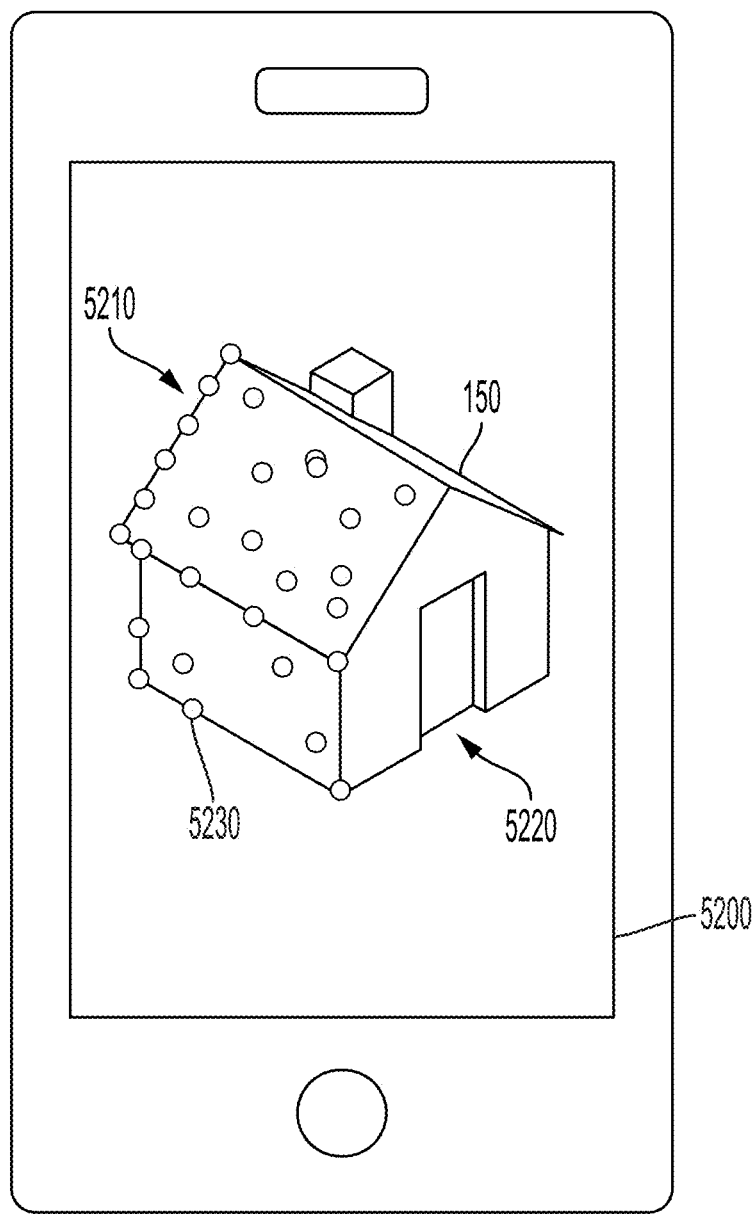
FIG. 52 illustrates another example of a user guidance system, according to certain aspects of the present disclosure.

FIG. 52 illustrates an example of an interface provided by a native application executing on user device 110. As an illustrative example, interface 5200 can display house 150 on the display of user device 110. House 150 may be a target physical structure that a user is capturing at a particular time during the image capture session. In some implementations, instead of generating a feedback notification indicating whether or not an image was successfully captured (as with the illustrative example described with respect to FIG. 51), interface 5200 can display matched features, such as matched feature 5230, to visually indicate to the user any uncovered areas of house 150. For example, interface 5200 can display house 150 as it was captured or is being captured by the user operating a camera of user device 110. Interface 5200 can detect feature matches between a captured image and a preceding image. The feature matches can be presented directly on the visualization of house 150 in interface 5200. Therefore, the displaying of the feature matches visually indicates that area 5210 of house 150 is a sufficiently covered area of house 150 due to the detected feature matches, whereas, area 5220 is an uncovered area of house 150 due to the lack of detected feature matches shown in area 5220 on interface 5200. By viewing interface 5200, the user may quickly understand that area 5220 is an uncovered area of house 150, and that the user needs to capture more images of area 5220 to maximize the feature correspondences associated with house 150. When the entirety of house 150 is covered in detected feature matches, then the image capture session has captured a sufficient amount of image data to allow 3D model reconstruction system 280 to generate a 3D model of house 150.

Figure 53:
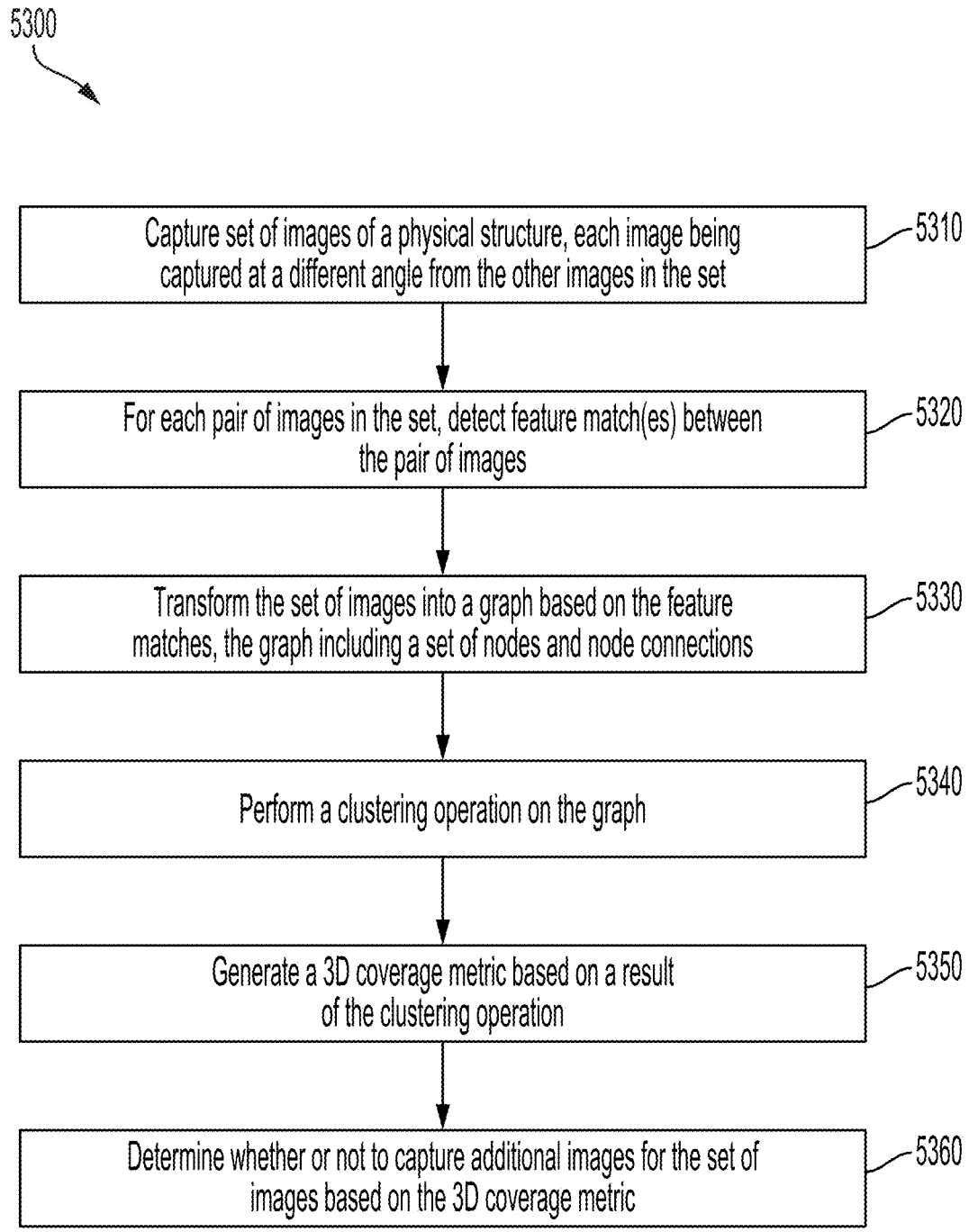
FIG. 53 is a flowchart illustrating an example of a process for generating a 3D coverage metric with respect to a set of images, according to certain aspects of the present disclosure.

FIG. 53 is a flowchart illustrating an example of a process for generating a 3D coverage metric, according to certain aspects of the present disclosure. Process 5300 can be performed by any components described herein, for example, any component described with respect to FIG. 1, 2, or 44. As an illustrative example, process 5300 is described as being performed entirely on user device 110, however, process 5300 can be performed entirely on server 120 instead. Further, process 5300 can be performed to generate a 3D coverage metric, which represents a degree to which a complete set of images of a physical structure is suitable for 3D model reconstruction. Suitability for 3D model reconstruction can be determined based on a degree to which pairs of images included in the complete set of images satisfy a 3D reconstruction condition (e.g., a threshold number of feature matches between the images of the successive pair, a threshold number of different planes or lines on which the feature matches are detected, and other suitable thresholds). Process 5300 can be performed on the complete set of images captured and stored after the image capture session has terminated.

Process 5300 begins at block 5310, where user device 110 can execute a native application to initiate an image capture session, which enables a user to capture a set of images of a physical structure (e.g., using a camera embedded within user device 110). The image capture session stores and evaluates each image after the image is captured. Each image captured during the image capture session can capture the physical structure from a different angle than other images in the set of images. As an illustrative example, a user may walk in a loop around a perimeter of the physical structure and periodically capture images during the image capture session. The set of images can include all of the images that the user captured as the user walked the loop around the perimeter of the physical structure.

At block 5320, the native application executing on user device 110 can detect features in each individual captured image, and then detect feature matches between each pair of images included in the set of images. For example, in one image, the native application can detect a corner point at which a rake line intersects with a fascia line of a roof of the physical structure. In a next-captured image (e.g., the immediately next-captured image or one or more images after the immediately next-captured image), the native application can detect the same corner point, but at a different angle than a preceding image. The native application can execute a feature matching technique (e.g., a FLANN matcher) to associate the corner point in each image as representing the same 3D point.

At block 5330, the native application executing on user device 110 can transform the set of images into a graph structure based on the feature matches detected at block 5320. The graph structure can include a set of nodes, and each node can represent an image. Two nodes can be connected by a node connection (e.g., an edge) when the two images corresponding to the two nodes share at least one feature match between them. Further, each node connection can be assigned a weight, which is determined based on the number and quality (e.g., confidence) of feature matches between the two images.

At block 5340, the native application executing on user device 110 can perform a clustering operation on the graph structure. As an illustrative example, the clustering operation can include spectral clustering of the graph structure. The clustering operation causes one or more node connections between nodes of the graph structure to be pruned. The pruning of a node connection can be based on the weight assigned to the node connection. For example, if the weight is below a threshold value, then the node connection can be pruned or removed, while the two nodes remain. The clustering operation forms one or more clusters of nodes of the graph structure.

At block 5350, the native application executing on user device 110 can generate a 3D coverage metric based on number of clusters formed after performing the clustering operation. For example, the 3D coverage metric can be a value that is inversely proportional to the number of clusters formed after performing the clustering operation. Forming multiple clusters indicates that at least one image of the set of images does not share a sufficient number or quality of feature correspondences with another image of the set of images. Further, when multiple clusters are formed, the number or quality of feature correspondences between two images is not maximized, which reduces the image data reconstruction quality to 3D model reconstruction system 280, thereby hindering reconstruction of the 3D model. If the clustering operation results in the formation of one cluster of images, that one cluster is indicative of sufficient feature matches between pairs of images included in the set of images. Therefore, the 3D coverage metric indicates a high degree of suitability for 3D model reconstruction when the clustering operation forms a single cluster.

At block 5360, the native application executing on user device 110 can determine whether or not to capture additional images to add to the set of images based on the 3D coverage metric. As an illustrative example, if the 3D coverage metric is below a threshold value, then the native application can generate a feedback notification to the user instructing or prompting the user to capture one or more additional images to improve the number of feature correspondences between pairs of images of the set of images.

Figure 54:
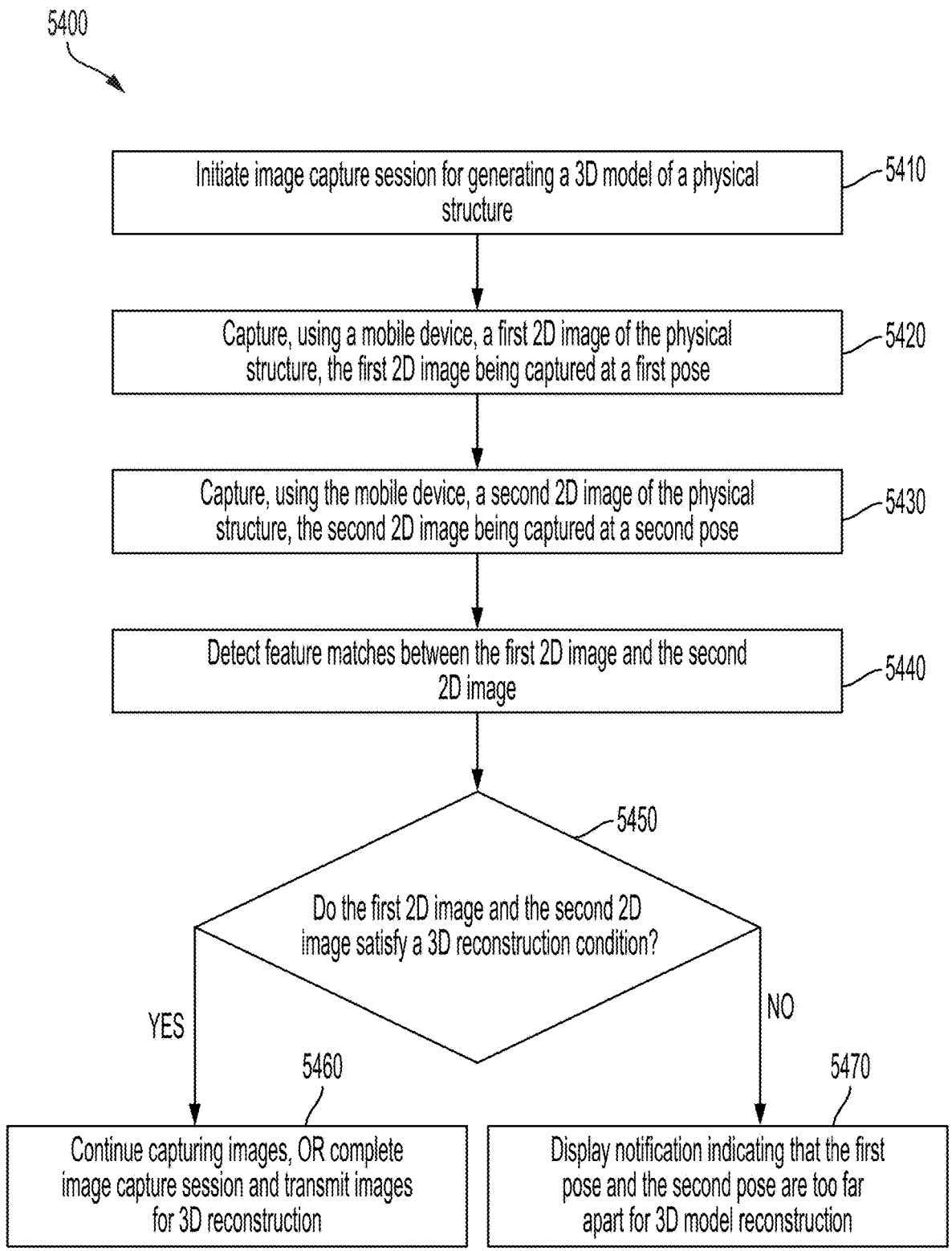
FIG. 54 is a flowchart illustrating an example of a process for guiding a user to capture images that maximize feature correspondences during an image capture session, according to certain aspects of the present disclosure.

FIG. 54 is a flowchart illustrating an example of a process for generating a feedback notifications that guide a user to capture images during an active image capture session. Process 5400 can be performed by any components described herein, for example, any component described with respect to FIG. 1, 2, or 44. As an illustrative example, process 5400 is described as being performed entirely on user device 110, however, process 5400 can be performed entirely on server 120 instead. Further, process 5400 can be performed to generate real-time guidance to a user while the user is capturing images during the image capture session. The guidance can enable the user to capture images that maximize the feature correspondences between the images. Process 5400 can be performed while the image capture session is active (e.g., before the image capture session terminates and the set of images is complete).

Process 5400 begins at block 5410, where user device 110 executes a native application to initiate an image capture session for generating a 3D model of a physical structure. The image capture session enables the user to capture images of the physical structure from various angles. The images captured during the image capture session can be saved locally on user device 110 and potentially can be individually uploaded to server 120.

At block 5420, the native application executing on user device 110 can capture a first 2D image of the physical structure from a first pose. A pose can represent a position and orientation of an object. In some implementations, the user can actively capture the first 2D image, for example, by pressing a trigger button on a camera or selecting a trigger button on a camera application operating on a mobile device. In other implementations, the native application can execute one or more image segmentation techniques to classify pixels within a viewfinder as a physical structure. Upon classifying certain pixels of the viewfinder as relating to a physical structure, the native application can then guide or ensure the proper framing of the physical structure and automatically capture the image (without the user needing to select or press any buttons). At block 5430, the native application executing on user device 110 can capture a second 2D image of the physical structure from a second pose. The second 2D image can be captured at a later time than the first 2D image. Using FIG. 1 as an example, at block 5420, the user captures an image from position A, and then walks to position B. At block 5430, while the user is located at position B, the user captures an image from position B.

At block 5440, the native application executing on user device 110 can detect feature matches between the first 2D image and the second 2D image using feature detection and feature matching techniques, as described above. At block 5450, the native application executing on user device 110 can determine whether the first 2D image and the second 2D image satisfy a 3D reconstruction condition. To illustrate and only as a non-limiting example, the 3D reconstruction condition can be a condition that the number of feature matches be at or above a threshold value. As another illustrative example, the 3D reconstruction condition can be a condition that the feature matches be detected on three or more different planes or lines to ensure planar diversity of feature matches, or captured from a different angular perspective.

If the first 2D image and the second 2D image do not satisfy the 3D reconstruction condition (e.g., "No" branch out of block 5450), then process 5400 proceeds to block 5470. At block 5470, the native application executing on user device 110 displays a notification indicating that the first pose and the second pose are too far apart for 3D reconstruction. Accordingly, the image capture session does not capture and store the second 2D image, and thus, the user has to find another location to recapture the second 2D image. In some implementations, the native application can detect a new location and guide the user to walk towards the new location to recapture the second 2D image. If the first 2D image and the second 2D image do satisfy the 3D construction condition (e.g., "Yes" branch out of block 5450), then process 5400 proceeds to block 5460. At block 5460, the native application causes the image capture session to capture and store the second 2D image and instructs the user to continue on to the next location to capture the next image of the physical structure. In some implementations, the second 2D image may be the last image in the complete set of image, and thus, the native application can terminate the image capture session and transmits the images to server 120 for reconstruction.

The technology as described herein may have also been described, at least in part, in terms of one or more embodiments, none of which is deemed exclusive to the other. Various configurations may omit, substitute, or add various procedures or components as appropriate. For instance, in alternative configurations, the methods may be performed in an order different from that described, or combined with other steps, or omitted altogether. This disclosure is further non-limiting and the examples and embodiments described herein does not limit the scope of the invention.

It is further understood that modifications and changes to the disclosures herein are suggested to persons skilled in the art, and are included within the scope of this description and the appended claims.

What is claimed is:

1. A computer-implemented method, comprising:
capturing a set of pixels representing a scene visible to an image capturing device including a display, the set of pixels including a plurality of border pixels, and each border pixel of the plurality of border pixels being located at or within a defined range of a boundary of the set of pixels;
detecting a physical structure depicted within the set of pixels, the physical structure being represented by a subset of the set of pixels;
generating a segmentation mask associated with the physical structure depicted within the set of pixels, the segmentation mask including one or more segmentation pixels, wherein the segmentation mask comprises an irregular shape that conforms to contours of the subset of the set of pixels;
determining a pixel value for each border pixel of the plurality of border pixels;
generating an indicator based on the pixel value of one or more border pixels of the plurality of border pixels by:
determining a number of the one or more border pixels with pixel values indicating overlap with the one or more segmentation pixels; and generating the indicator based on whether the number of the one or more border pixels with pixel values indicating overlap with the one or more segmentation pixels exceeds a threshold percentage of the plurality of border pixels; and presenting the indicator, the indicator representing an instruction for framing the physical structure within the display.

2. The computer-implemented method of claim 1, wherein determining the pixel value for each border pixel further comprises:

detecting that the one or more border pixels of the plurality of border pixels includes a segmentation pixel of the one or more segmentation pixels, and wherein the plurality of border pixels includes:

one or more left edge border pixels located at a left edge of the set of pixels;

one or more or more top edge border pixels located at a top edge of the set of pixels;

one or more right edge border pixels located at a right edge of the set of pixels; and one or more bottom edge border pixels located at a bottom edge of the set of pixels.

3. The computer-implemented method of claim 2, wherein:

when a left edge border pixel of the one or more left edge border pixels includes a segmentation pixel, the instruction represented by the indicator instructs a user viewing the display to move the image capturing device in a leftward direction;

when a top edge border pixel of the one or more top edge border pixels includes a segmentation pixel, the instruction represented by the indicator instructs the user viewing the display to move the image capturing device in an upward direction;

when a right edge border pixel of the one or more right edge border pixels includes a segmentation pixel, the instruction represented by the indicator instructs the user viewing the display to move the image capturing device in a rightward direction; and when a bottom edge border pixel of the one or more bottom edge border pixels includes a segmentation pixel, the instruction represented by the indicator instructs the user viewing the display to move the image capturing device in a downward direction.

4. The computer-implemented method of claim 2, wherein:

when each of a left edge border pixel, a top edge border pixel, a right edge border pixel, and a bottom edge border pixel includes a segmentation pixel, the instruction represented by the indicator instructs a user viewing the display to move backward.

5. The computer-implemented method of claim 2, wherein when none of the one or more left edge border pixels, the one or more top edge border pixels, the one or more right edge border pixels, and the one or more bottom edge border pixels includes a segmentation pixel, the instruction represented by the indicator instructs a user viewing the display to zoom in to frame the physical structure.

6. The computer-implemented method of claim 1, wherein the plurality of border pixels comprises a border having a pixel width determined by a width of the set of pixels.

7. The computer-implemented method of claim 1, wherein presenting the indicator comprises:

displaying the indicator on the display of the image capturing device; or audibly presenting the indicator to a user operating the image capturing device.

8. The computer-implemented method of claim 1, wherein the border pixels comprise fields storing image information and a field to store the pixel value indicating whether a border pixel intersects with the segmentation mask.

9. A computer-program product tangibly embodied in a non-transitory machine-readable storage medium, including instructions configured to cause a data processing apparatus to perform operation including:

capturing a set of pixels representing a scene visible to an image capturing device including a display, the set of pixels including a plurality of border pixels, and each border pixel of the plurality of border pixels being located at or within a defined range of a boundary of the set of pixels;

detecting a physical structure depicted within the set of pixels, the physical structure being represented by a subset of the set of pixels;

generating a segmentation mask associated with the physical structure depicted within the set of pixels, the segmentation mask including one or more segmentation pixels, wherein the segmentation mask comprises an irregular shape that conforms to contours of the subset of the set of pixels;

determining a pixel value for each border pixel of the plurality of border pixels;

generating an indicator based on the pixel value of one or more border pixels of the plurality of border pixels by:

determining a number of the one or more border pixels with pixel values indicating overlap with the one or more segmentation pixels; and generating the indicator based on whether the number of the one or more border pixels with pixel values indicating overlap with the one or more segmentation pixels exceeds a threshold percentage of the plurality of border pixels; and presenting the indicator, the indicator representing an instruction for framing the physical structure within the display.

10. The computer-program product of claim 9, wherein the threshold percentage is a function of a related pixel dimension of the segmentation mask.

11. The computer-program product of claim 9, wherein the threshold percentage comprises a predetermined number of consecutive border pixels in the plurality of border pixels that overlap with the one or more segmentation pixels.

12. The computer-program product of claim 9, wherein the defined range of the boundary of the set of pixels comprises between 2 and 10 pixels from the boundary of the set of pixels, such that the plurality of border pixels have a width of between 2 and 10 pixels around the boundary of the set of pixels.

13. The computer-program product of claim 9, wherein the segmentation mask is generated by a classifier trained to identify physical structures in sets of pixels.

14. The computer-program product of claim 9, further comprising:

generating a bounding box around the segmentation mask, such that all of the one or more segmentation pixels fit inside of the bounding box, and the bounding box includes a buffer region such that the bounding box does not tangentially touch any of the one or more segmentation pixels; and presenting the bounding box and the set of pixels with the indicator.

15. The computer-program product of claim 9, further comprising:
denoising the segmentation mask by smoothing a boundary of the segmentation mask.

16. The computer-program product of claim 15, wherein denoising the segmentation mask comprises combining a plurality of segmentation masks from a plurality of frames of the scene that include the physical structure.

17. The computer-program product of claim 16, wherein combining the plurality of segmentation masks from the plurality of frames comprises pixel voting using pixels from the plurality of frames.

18. The computer-program product of claim 17, wherein the pixel voting is weighted based on a motion of the image capturing device when capturing each of the plurality of frames.

\* \* \* \* \*